(12) United States Patent
Leonard

(10) Patent No.: US 7,758,327 B2
(45) Date of Patent: Jul. 20, 2010

(54) METHOD AND APPARATUS FOR ELECTRIC TREATMENT OF SUBSTRATES

(76) Inventor: William K. Leonard, 1149 River Ridge Rd., River Falls, WI (US) 54022

( * ) Notice: Subject to any disclaimer, the term of this patent is extended or adjusted under 35 U.S.C. 154(b) by 0 days.

(21) Appl. No.: 12/455,577

(22) Filed: Jun. 3, 2009

(65) Prior Publication Data

US 2009/0272269 A1    Nov. 5, 2009

Related U.S. Application Data

(62) Division of application No. 11/432,895, filed on May 12, 2006, now Pat. No. 7,553,440.

(60) Provisional application No. 60/680,270, filed on May 12, 2005.

(51) Int. Cl.
*B29C 59/10* (2006.01)
(52) U.S. Cl. ............... 425/93; 55/DIG. 5; 55/DIG. 39; 96/69; 118/58; 118/68; 118/423; 118/621; 425/174.8 E
(58) Field of Classification Search ............ 425/93, 425/174, 174.8 R, 174.8 E; 118/58, 68, 423, 118/621; 55/524, 527, 528, DIG. 5, DIG. 33, 55/DIG. 35, DIG. 39, DIG. 43, DIG. 45; 95/57–59; 96/15, 69; 264/413, 484, DIG. 48; 442/82, 88; 29/886; 307/400

See application file for complete search history.

(56) References Cited

U.S. PATENT DOCUMENTS

| 878,273 | A | 2/1908 | Chapman |
|---|---|---|---|
| 983,536 | A | 2/1911 | Chapman |
| 2,980,933 | A | 4/1961 | Schwartz et al. |
| 3,634,726 | A | 1/1972 | Pierre et al. |
| 3,671,806 | A | 6/1972 | Whitmore |
| 3,757,164 | A | 9/1973 | Binkowski |
| 4,213,167 | A | 7/1980 | Cumming et al. |
| 4,213,168 | A | 7/1980 | Garbett |
| 4,215,682 | A | 8/1980 | Kubik et al. |
| 4,216,518 | A | 8/1980 | Simons |
| 4,363,070 | A | 12/1982 | Kisler |
| 4,375,718 | A | 3/1983 | Wadsworth |
| 4,454,621 | A | 6/1984 | Testone |
| 4,473,863 | A | 9/1984 | Magee |
| RE32,171 | E | 6/1986 | van Turnhout |
| 4,676,807 | A | 6/1987 | Miller et al. |
| 4,729,057 | A | 3/1988 | Halleck |

(Continued)

FOREIGN PATENT DOCUMENTS

EP    447166 A2 *   9/1991

OTHER PUBLICATIONS

Sydney Ross, Variation with Temperature of Surface Tension of Lubricating Oils, National Advisory Committee for Aeronautics, Feb. 1950, Washington.

*Primary Examiner*—Richard L Chiesa
(74) *Attorney, Agent, or Firm*—Skinner and Associates

(57) ABSTRACT

Methods and apparatus for hydrodischarging and hydrocharging substrates and articles to produce enhanced ability to avoid attraction of contaminants or improved capability of removing contaminants from fluids are disclosed. In another form the method involves removal of electric charges or neutralization of charge on or within substrates. Also disclosed are methods of making using electret substrates and articles for removing particulates and mists from fluid streams.

38 Claims, 17 Drawing Sheets

U.S. PATENT DOCUMENTS

| | | | |
|---|---|---|---|
| 4,831,488 A | 5/1989 | Playe | |
| 4,872,083 A | 10/1989 | Blitshteyn | |
| 4,874,399 A * | 10/1989 | Reed et al. | 95/57 |
| 4,951,172 A | 8/1990 | Steinman et al. | |
| 5,017,876 A | 5/1991 | Wright et al. | |
| 5,041,941 A | 8/1991 | Carter et al. | |
| 5,112,677 A * | 5/1992 | Tani et al. | 442/60 |
| 5,411,576 A | 5/1995 | Jones et al. | |
| 5,421,901 A | 6/1995 | Whitney et al. | |
| 5,425,813 A | 6/1995 | Ernst et al. | |
| 5,432,454 A | 7/1995 | Durkin | |
| 5,496,507 A | 3/1996 | Angadjivand et al. | |
| 5,505,995 A | 4/1996 | Leonard | |
| 5,645,627 A | 7/1997 | Lifshutz et al. | |
| 5,930,105 A | 7/1999 | Pitel et al. | |
| 5,930,857 A | 8/1999 | Ramos et al. | |
| 5,935,303 A | 8/1999 | Kimura | |
| 6,176,245 B1 | 1/2001 | Takahashi et al. | |
| 6,214,094 B1 * | 4/2001 | Rousseau et al. | 96/15 |
| 6,238,466 B1 | 5/2001 | Rousseau et al. | |
| 6,375,886 B1 | 4/2002 | Angadjivand et al. | |
| 6,406,657 B1 | 6/2002 | Eitzman et al. | |
| 6,419,871 B1 * | 7/2002 | Ogale | 264/423 |
| 6,432,175 B1 * | 8/2002 | Jones et al. | 96/15 |
| 6,454,986 B1 | 9/2002 | Eitzman et al. | |
| 6,562,112 B2 * | 5/2003 | Jones et al. | 96/15 |
| 6,573,205 B1 * | 6/2003 | Myers et al. | 442/414 |
| 6,660,210 B2 | 12/2003 | Jones et al. | |
| 6,737,113 B2 | 5/2004 | Leonard et al. | |
| 6,743,464 B1 | 6/2004 | Insley et al. | |
| 6,783,574 B1 | 8/2004 | Angadjivand et al. | |
| 6,802,315 B2 | 10/2004 | Gahan et al. | |
| 6,808,551 B2 * | 10/2004 | Jones et al. | 95/59 |
| 6,824,718 B2 | 11/2004 | Eitzman et al. | |
| 6,926,961 B2 * | 8/2005 | Roth | 428/364 |
| 7,553,440 B2 * | 6/2009 | Leonard | 264/413 |
| 2002/0190434 A1 * | 12/2002 | Eitzman et al. | 264/340 |
| 2003/0039815 A1 * | 2/2003 | Roth | 428/292.1 |
| 2003/0054716 A1 | 3/2003 | Chou et al. | |
| 2004/0023577 A1 | 2/2004 | Horiguchi et al. | |
| 2004/0065196 A1 * | 4/2004 | Jones et al. | 95/57 |

* cited by examiner

METHOD AND APPARATUS FOR ELECTRIC TREATMENT OF SUBSTRATES

CROSS-REFERENCE TO RELATED APPLICATIONS, IF ANY

This application is a divisional of U.S. application Ser. No. 11/432,895, filed on May 12, 2006 (issued as U.S Pat. No. 7,553,440), which application claims the benefit under 35 U.S.C. §119(e) of U.S. Provisional Patent Application Ser. No. 60/680,270, filed May 12, 2005, which are hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field

The invention concerns improved methods and apparatus for hydrodischarging and hydrocharging substrates and articles to produce enhanced ability to avoid attraction of contaminants or improved capability to removing contaminants from fluids. The field of the invention relates to electret substrates and of filtration media. Additionally, the inventions relate to controlling electrostatic charge on substrates and cleaning substrates. The invention concerns the modification of electrical charge properties of substrate. The invention concerns in one form electret enhanced filter media made of substrate, and fibers such as blown microfibers. The invention concerns improved methods of making electret substrates and articles for removing particulates and mists from gas streams. In another form the invention concerns the removal of electric charges or neutralization of charge on or within substrates.

2. Background Information

The addition of electric charge to a substrate is quite useful. It is known that substrates including polymer materials may be semi-permanently electrically charged, or for brevity, charged. When charged, such polymers are known as "electrets". Electrets have significant commercial value. For instance, the electric field produced by the electret can be used to attract other materials, such as dust particles. This attractive or "inductive" property exhibited by electrets substrates enables filters to be constructed having the ability to capture sub-micron particles when the pore sizes are many times larger.

The removal of electric charge from a substrate is also quite useful. Often it is required in the manufacture of substrate intermediates for many products to prevent dust contamination. Objects, including humans, very often acquire a sizable electrostatic charge which may have a magnitude of several thousand volts or more. Charging of non-conductive objects may be caused in many ways including frictional contact. Induction and discharges from other objects may impart charge to ungrounded conductors. Sizable charge accumulations can be highly undesirable for a number of reasons in the processing of dielectric materials and semiconductors. Sudden discharges even when not harmful are distinctly unpleasant to people. Electrostatic charge can also interfere with the operation of electrical devices including integrated circuits. Very important is that charge also attracts contamination.

The substrates include for example plastic films, paper, nonwovens, fabric materials, dielectric materials, and non-conductive materials. These are commonly used as the base of construction for a wide variety of greatly differing products. Some examples include photosensitized film, photographic print paper, magnetic recording tapes, adhesive tapes, pressure-sensitive paper, packaging materials, signage, filters, wrapping materials, electronic substrates, optical films, and cleaning products.

Prior art often requires the use of complex or hazardous processes for neutralization of static charges on a web or substrate, for the electrostatic modification of substrates, and for the production of charge species on or in the substrate. All of the known methods have various limitations and problems which restrict their utility or economics. These are discussed delineated in the following review.

Hydrocharging for the Production of Electrets

Electrets are dielectric objects that exhibit a lasting electric charge or a charge that is at least quasi-permanent. The charged nature of the electret enhances the electret's ability to attract and retain aerosol particles, and contaminants such as dust, dirt, and fibers that are present in fluids. Electrets have been found to be useful in a variety of applications including air filters, furnace filters, respiratory filters, face masks, and electro-acoustic devices, headphones, and electrostatic recorders. Commonly, nonwoven or fabric substrates are used in filtration. Electrets are especially useful for collecting micron and submicron size particles or aerosols on or within media whose pores or void spaces are much larger.

Nonwoven fibrous filter webs have been made from polyolefins using melt-blowing apparatus of the type described in Wente, Van A., Superfine Thermoplastic Fibers, Industrial and Engineering Chemistry, v. 48, n. 8, pp. -1342-1346 (August 1956). Such melt-blown microfiber webs are in widespread use for filtering contaminants, e.g., as face masks, furnace filters, and respirators. Melt-blown microfibers are commonly referred to as blown microfibers.

It is known that the filtration qualities of a blown microfiber web can be improved by a factor of two or more by making it an electret substrate. In one method the melt-blown fibers are bombarded with electrically charged particles such as electrons or ions as they issue from the die orifices. Similarly, the web can be made an electret by exposure to an electric corona after it is collected. While blown polypropylene microfibers are especially useful, other polymers may also be used including, for example, polyolefins, polycarbonates and polyhalocarbons. Most commercially useful are those materials that have appropriate volume resistivities under expected environmental conditions.

Filters for removing particulate contaminants from air and fluids are also made from other types of media. Examples include spunbond nonwoven media, woven fabric media, structured films, porous films and fibrillated films. U.S. Pat. RE32,171 to van Turnhout teaches that electret filtration enhancement can be provided by electrostatically charging a film before it is fibrillated. However, the method uses high voltage charging which adds manufacturing expense and electrical hazards.

Hydrocharging is generally considered a process for preparing electret items and substrates without the use of high voltages, but it presently has deficiencies. It employs a liquid as a charging agent. Angadjivand et al. in U.S. Pat. No. 5,496,507 teach impinging water upon a nonwoven web with jets or droplets, then drying the web to create an electret media.

While the technique has been described by some as a method of triboelectic charging, the details of the electrification process are not fully explained.

Hereinafter "hydrocharging" refers to the contacting of a substrate with a liquid to create an electret. While the Angadjivand et al. hydrocharging process develops filtration enhancing properties, the degree of treatment is deficient and pre-charging the web by corona charging prior to hydrotreatment is necessary for the best results. This teaching still requires the capital investment and the operating cost of corona generating devices along with their high voltages. More effective processes are sought.

Further improvements in hydrocharging are taught by Eitzman et al. in U.S. Pat. Nos. 6,406,657 and 6,824,718. They teach the multiple steps of wetting with a wetting liquid, followed by saturation with an aqueous polar liquid, followed by drying. Wetting liquids with surface tensions below the surface energy of the fiber are taught for the wetting step. But even so, air is trapped in the web and the use of mechanical means to help in the removal of trapped gas is taught. The use of an aqueous polar saturation liquid with a surface tension higher than and preferably 10 dynes per centimeter higher than the surface energy of the fibrous web is required after the wetting step. Careful formulation and control of both wetting liquid and the aqueous polar saturation liquid formulations are required for the process to function. The organic solvent isopropyl alcohol is the wetting agent of the examples. As such, the process uses an expensive and hazardous chemical to achieve results.

Eitzman et al. in U.S. Pat. No. 6,454,986 teach the use of flammable polar organic solvents by themselves to create electret media. This still has the disadvantages of high costs, and explosion and fire hazards associated with the solvent. Surface tensions of 10 dynes per centimeter higher than the surface energy of the fibrous web are preferred. Wetting is not complete. A partial remedy of this problem using various mechanical agitation means are taught to aid wetting. These add cost and complexity and have limited success.

Horiguchi and Takeda in USPTO Publication Number 20040023577 expound a method of hydrocharging by sucking water through a fibrous substrate followed by drying. The efficiency of the process is deficient. They note the electret quality is improved by repeating the suction process multiple times before drying. The teaching recommends use of a wetting solvent in the water. Elimination of repeating steps is desired to reduce process cost and complexity. Elimination of cost and hazard of the wetting solvent would be a cost saving. Wetting problems are still present even with the wetting solvent.

The process of depositing liquid from a vapor onto a dielectric article prior to drying is taught in U.S. Pat. No. 6,743,464 to Insley et al. Here, the method utilizes the complicated process of first creating a controlled environment using a closed vessel containing a liquid and a gas phase, and second, manipulating a thermodynamic state function such as pressure to cause molecules of the liquid component present in the gas to condense as liquid drops upon the article. This condensed liquid on the article is then dried. The gas phase contains noncondensible air diluting the molecules of the liquid species present in the gas phase. The complexity of this method is a disadvantage. Additionally, condensation must take place, no means of removing trapped air in the article is provided and no method of treatment of a continuous web is taught. The method does not teach a means of complete and total wetting of substantially all surfaces in pits, voids, pores and internal spaces of the substrate.

Improved and simplified hydrocharging methods are needed that do not use costly or hazardous materials, do not require high voltage electrical auxiliary treatment and do not require special chemical formulations. Methods that do not use polluting chemicals are sought. Methods that act with the improved efficiency are needed. Methods that produce improved contacting of all surfaces in pits, voids, pores and internal spaces of the substrate and improved methods for treating continuous webs are needed. Methods that remove greater amounts of air from the surfaces and pores of the media would result in the more complete treatment of all the potentially functional surfaces of the substrates.

Electret Surface Contamination

An additional problem for electret media is contamination. Oily contamination from a gas stream being filtered is noted as being highly detrimental to the efficacy of filtration products in U.S. Pat. Nos. 5,411,576 and 6,802,315. Much effort has been devoted to producing oil mist tolerant electret media. However, other sources of contamination have been unrecognized. One is the problem of surface contamination of the electret media during manufacturing, which has not been recognized and addressed.

The processes necessary for the forming of the substrates, and the processing and handling of the substrates may contaminate the active surfaces. In the production of fibers and films, high temperatures are used. The materials are extruded in a molten state. Thin films, very fine fibers, and especially melt blown and spun bond fibers are extruded from melts and are most easily produced when the melt viscosity is as low as possible. Low melt viscosity is achieved at extremely high temperatures. Often these temperatures exceed the thermal stability of the materials extruded. At high processing temperatures thermal degradation forms oil-like low molecular weight contaminants. The oil-like liquid degradation products produced commonly cover the surfaces of fume hoods over these melt process lines. Smoke and fumes are often observed rising from molten polymers being extruded, milled, or melt spun. These then may condense on, or be adsorbed by the functional surfaces of the electret substrates or precursor substrates produced.

The process equipment used for transporting, forming, collecting and extruding substrate materials uses hydraulic and lubricating oils along with other liquids which are electret contaminating species. These will often contaminate filter media. Oil and decomposition contaminants tend to spread and cover the active surfaces of many common polymers used for filters. This is especially true of the polyolefin polymers. Such contamination can diminish either the initial or long term performance of electrets.

Here it has been found that any liquids that spread on the substrate or substrate functional surfaces are detrimental. Still other harmful contaminants include species that modify the wetting characteristics of liquid, collected on the electret and cause liquid to spread on the substrate surfaces.

The problem of counteracting contamination from the forming methods remains unsolved and generally unrecognized.

Electret Substrates for Filtering Liquid Mists

The filtration properties of nonwoven and fabric polymeric fibrous webs can be improved by transforming the web into an electret. Electrets are effective in enhancing initial liquid aerosol particle capture in filters. But with time or aging, liquid aerosols tend to cause electret filters to lose their enhanced filtering efficiency. This subsection deals with the art of preparing improved aerosol filter media.

Numerous methods have been developed to compensate for loss of filtering efficiency with time or aging in the presence of mists. One method includes increasing the amount of the nonwoven polymeric web in the electret filter by adding layers of web or increasing the thickness of the electret filter. The additional web, however, increases the breathing resistance of the filter, adds weight and bulk to the filter, and increases the cost of the filter. Another method for improving an electret filter's resistance to oily aerosols includes forming the electret filter from resins that include melt processable fluorochemical additives, such as fluorochemical oxazolidinones, fluorochemical piperazines, and perfluorinated alkanes.

A method of improving the performance of an electret is taught by Jones, et al. in U.S. Pat. No. 5,472,482. It teaches placing a performance enhancing fluorochemical additive into the polymer melt, extruding the blend in the form of a microfiber web, and then charging the web. These additives are referred to as "charge additives." U.S. Pat. No. 5,645,627 also teaches the use of charge additives. The charge additives can increase the level of charge on the electret and can improve the filtering performance of the electret.

The charge additives have been found by experimentation. Charge additives within the mass of polymer must be melt processable, i.e., suffer substantially no degradation under the melt processing conditions used to form microfibers of a nonwoven web or the fibers and films of electret substrates. This limits possible candidate additives.

The improved performance in the additive patents is only demonstrated with one, and only one, aerosol liquid mist. This unduly limits useful candidate additives. Tests are only made with dioctylphthalate (DOP) in air at standard conditions. The test is hereinafter referred to as the "DOP challenge". No information is provided for filtering other liquid aerosols in other gases and at other conditions.

In U.S. Pat. No. 5,935,303, an improved filter is taught which uses a resinous material containing a perfluoroalkyl acrylate adhering to the fibrous substrate in a filter. This improvement is again only tested against a DOP challenge. No information is provided for filtering other aerosols and mists.

In U.S. Pat. No. 6,213,122, a method of making an electret with improved DOP filtering performance by including the step surface fluorination is taught. Fluorination is a costly and sometimes a very hazardous step. Again, the electret is only tested against the DOP challenge.

In U.S. Pat. No. 6,238,466, an electret article with improved oily mist performance is disclosed where the formulation includes a charge additive and passes a thermally stimulated discharge current (TSDC) test. However, again the electret is only tested against the DOP challenge.

U.S. Pat. No. 6,214,094 teaches electret articles using charge additives to produce improved DOP challenge performance. Here too, the electret is only tested against the DOP challenge.

U.S. Pat. No. 6,802,315 discloses electret articles using vapor condensed coatings with fluorine contents that give improved results. Here too, the electret is only tested against the DOP challenge.

U.S. Pat. No. 6,237,595 teaches electret DOP filtering performance may be predicted by measuring extractable hydrocarbons.

U.S. Pat. No. 6,261,342 teaches electret DOP filtering performance may be predicted by a thermally stimulated discharge current (TSDC) spectrum.

USPTO Publication Number 20030054716 teaches treating porous substrates with a solvent composition which includes a charge additive for enhancing performance for the DOP challenge. However, these solvents are expensive and usually dangerous.

None of the prior art teaches how to improve the performance of electrets for liquid mists other than DOP. None of the prior art teaches how to improve the performance of an electret filtration process for a specific liquid in gas mist challenge other than DOP. The DOP testing criteria limits the number and type of chemicals that may be used as charge additives and is therefore, unduly restrictive.

A method of making an electret for a target liquid contaminant in a target gas at target conditions is needed.

Electret Improvement by Surface Treatments

The filtration properties of electret webs can be improved by applying surface modifying chemicals to the surfaces that interface with the fluid being filtered. Chou et al. in U.S. Patent Application Publication 20030054716 teaches the swelling of an electret filter substrate polymer with a solution containing a filtration enhancing additive. Upon evaporation of the solvent, additives are left behind within the polymer and on its surface. While this is an efficacious process, it has the disadvantage of requiring the use of costly and often dangerous solvents along with the costly step of drying the solvent from the substrate. Additionally, using solvents may be environmentally harmful. Evaporation and loss of the solvents by drying consumes these expensive materials.

In U.S. Pat. No. 6,802,315, it is taught to produce electret media using vapor condensed coatings on the surfaces of the fibers. Improved filtration properties are achieved. Here, the range of surface coating compositions is limited to coating precursor monomers that may be evaporated. The process can be costly.

Other patents teach chemical modification with reactive plasma or gaseous reactants. In U.S. Pat. No. 6,660,210, surface fluorination is used to produce modified and improved electret performance. This process limits surface modification to only fluorination and substrates that may be fluorinated. Fluorination usually involves hazardous chemicals and expensive equipment.

New and more flexible methods of applying surface modifying chemicals and filtration modifying species are needed to overcome the limitations of known methods.

Electrostatic Neutralization and Control

This subsection of art deals with the field of reducing and neutralizing electrostatic charge on dielectric and other materials.

One may speak of surface modification in terms of the energy expended per unit area of modified surface. On the low energy extreme, it is desirable to neutralize static charge on substrates. Surface and volume charge on a dielectric material can exist as a net or monopole charge and/or as dipoles of charge in isolated regions. Accumulation of such charge can occur in a wide number of circumstances and with a wide range of dielectric material forms such as thin films, webs, sheets, fibers and threads. These may be made of paper, plastic, textiles, etc. Static charge is generally always present to some degree and nearly impossible to avoid. In sheet or web transporting, it is well known that electrical charges can build up on non-conductive materials. In industry the presence of charges is detrimental in at least three different ways. They may create safety hazard problems. They may interfere with product or process functions, or they may contribute to surface contamination.

Regardless of the form of the material, the accumulation of net charge on a dielectric material presents potential electrostatic hazards that often need to be eliminated or significantly reduced. For example, reduction or elimination of net charge is important during operation in hazardous environments, such as with a charged web moving in proximity to explosive vapors. Charge densities may spontaneously generate electrostatic discharges and ignite the flammable vapors. Electric discharges from substrates especially at web winding stations can produce arcing discharges that are hazardous to operating personnel. Neutralizing charges on sheets or webs is also necessary to facilitate trouble free passage and directing of web or sheets through processing equipment, especially in the stacking and collating processes. This is often referred to as the elimination of static cling.

Control of substrate surface charge is important in the process of coating a continuously traveling web support with compositions such as photographic emulsions, magnetic coating compositions, functional coatings for liquid crystal display screens, flexible electronic substrates, and many others. Particulate and mist contaminants are attracted to and are held on substrates by charges. It is important to minimize this in the production of photographic light-sensitive products, printing plates, pressure-sensitive copying papers, light emitting diodes, electronic substrate precursors, light display screens, optical products, etc. Clean substrates are essential in the manufacture of electronic and optical surfaces. Contaminants are a prime source of product defects even for those manufactured in so-called clean rooms. In the manufacture of many of today's sophisticated new products with optical or electronic functionality, the presence of even very small differences in charge or uniformity of charge may create defects in the deposition of materials or the localized functionality of the product. Such situations are not unique to those products where a plastic or paper material is employed, but similarly apply to those products where a glass plate, semiconductor wafer or ceramic substrate is employed. An example is a glass base plate for a liquid crystal display or the like. The need for improved neutralization of charge is growing ever more demanding and important.

In general, handling webs of dielectric materials generates static electric charge in the material. It is well known and referred to as the triboelectric effect. When two members are moved relative to each other, the frictional contact between the surfaces generates a static electric charge on the surfaces. The separation of two surfaces in intimate contact will also generate charges. For example, the simple process of web movement around a roller without slippage will generate electrostatic charging. In web processing industries, static charge causes difficulties as described above. The processes of roll formation, slitting, coating, functionalizing or laminating are troubled by static charge.

Troublesome electrostatic charges on charge retaining materials may be grouped into two categories. One category is that of polarization charges or dipoles, and the other is free surface charges. Polarization charges are bound to a definite site in a solid, whereas free surface charges are not. Free surface charges on a moving web are frequently reduced by a grounded brush-like device such as that described in U.S. Pat. No. 3,757,164 to Binkowski.

Polarization charges in a web are commonly controlled by subjecting the web to a corona-generated electrostatic field having a particular magnitude and polarity. It is often necessary to deal with both categories of charges. Often with polarization charges or dipoles, there are combinations of both positive and negative charges.

Much effort over the last fifty years has been expended in providing clouds of positive and negative ions which are attracted to the respective oppositely charged areas on a substrate. U.S. Pat. No. 983,536 discloses a static neutralizing device wherein an insulated conductor with large surface area is positioned over a moving web of dielectric material and is impressed with a high AC voltage.

U.S. Pat. No. 3,364,726 discloses a static neutralizing device wherein an insulated fine wire electrode is impressed with AC voltages at various frequencies ranging from 300 to 2000 Hertz, depending upon the speed of the web material to be neutralized. The fine wire electrode is required to be positioned very near to the moving web, and there is also a requirement for a conductive metallic ground bar to be positioned nearby. This type of device creates a cloud of both positively and negatively charge species which are attracted to oppositely charge regions on the web. AC ionizers leave a frequency signature of charge on a moving substrate that can cause non-uniformities and are incapable of reducing substrate charge to near zero values.

Kisler in U.S. Pat. No. 4,363,070 teaches the use of a brush-like device of conductive filaments powered by an AC potential to provide the charged active species. Many wire and needle devices and improvements to them, the methods of using them, and the methods of controlling them have been invented. These include the teachings of Halleck in U.S. Pat. No. 4,729,057, Durkin in U.S. Pat. No. 5,432,454, Pitel et al. in U.S. Pat. No. 5,930,105, Wright et al. in U.S. Pat. No. 5,017,876, Steinman et al. in U.S. Pat. No. 4,951,172, Blitshteyn in U.S. Pat. No. 4,872,083, Halleck in U.S. Pat. No. 4,729,057, and Simons in U.S. Pat. No. 4,216,518. However, brush dischargers are only effective when the charge density is high, and they only reduce charge levels from high to lower values. Residual charge remains on the substrate.

All known methods of neutralizing charges suffer from additional defects. If both positive and negative charges are present in the same charge-retaining substrate and if positive and negative charges are to be neutralized by having their charge levels reduced to zero, then the application of a DC-type electrostatic field having either a positive or a negative polarity will not reduce the charge level to zero.

Any device employing a corona producing wire will suffer from wire contamination and produce non-uniform treatment along the wire. Multiple needle devices become non-uniformly dirty with time and produce non-uniform treatment. Also, devices producing coronas may produce ozone gas which is a hazardous material. Conductive devices rubbing upon a substrate may scratch and produce defective products. More importantly, while many of these devices are effective in reducing electric field strengths from tens of thousands of volts per centimeter to thousands, this is simply not sufficient for today's products. Improved performance is desired with field intensities reduced to near zero or to below 10 volts per millimeter and below 1 volt per millimeter.

Improved static removal methods are needed to overcome the deficiencies of the known art.

Substrate Cleaning

Particulate contamination of substrates is responsible for huge volumes of scrap product, especially in the photographic, electronic and optical industries. Static charge on the substrate attracts particles and holds them tenaciously to the surface. Removal of static charge and web cleaning are both essential for defect reduction in manufacturing.

Takahashi et al. in U.S. Pat. No. 6,176,245 teach a series of apparatus for cleaning and charge removal: a first apparatus for the application and a second for the partial removal of a cleaning organic solvent mixture. The second generates static electric charge during the removal step. This charging is diminished by the immediate application of an under coat solution containing an organic solvent and resin composition which when dried, produces a coating for some functional purpose such as a protective coating, a magnetic coating, etc. This operation uses expensive and hazardous solvents, two separate application devices, and leaves a functional coating on the substrate.

Many methods for removing particles from the surface of a web are known including air knives, suction cleaning systems, wipes, and particle transfer rollers. In non-contact web cleaners, air at high velocity is passed over the surface of the web to remove particles. It is also common to attempt neutralization of web surface charge prior to cleaning to reduce the attractive forces between particles and the web. Unfortunately, complete neutralization is difficult and not achieved. U.S. Pat. Nos. 2,980,933, 4,213,167, 5,421,901 and 4,454,621 disclose devices for employing air streams and modification of the electrostatic charge on the web and/or particles. The results are often not satisfactory, and the use of tacky surface, contact cleaning systems have attempted to produce improvements. Tacky contacting surfaces produce detrimental static charging by contact. Non-contacting methods are less effective than the contact methods.

A particle removal roller typically has an adhesive or tacky surface to which particles from the web surface adhere upon contact. As the particles accumulate on the roll, the roll becomes contaminated and must be cleaned periodically to restore and renew its effectiveness. Contacting the web with a roll or mechanical wipes produces static charging which is counter productive as this charging will attract more particles from the environment. U.S. Pat. No. 5,930,857 teaches improvements to the contact roll method as do many other patents noted in its prior art description. Still, the contact cleaning apparatus may also scratch the substrate surface further degrading quality.

Ernst et al. in U.S. Pat. No. 5,425,813 teach the wet cleaning of a cleaning contact roll while it is disengaged from performing the web cleaning function. Here, a cleaning solution of alcohol and water is used to wet fabric wipes which clean the contact roll. The contact roll requires drying before reengagement with the web. This design requires at least two complete systems to provide continuous web cleaning of a running web.

Improved cleaning methods are needed to overcome the deficiencies of the known art.

BRIEF SUMMARY

Improved Hydrocharging for Production of Electrets

One object of the present invention is to solve the problems of the prior art and provide a manufacturing method and apparatus for producing electret articles and media by improved liquid hydrotreatments. The invention produces electret articles at low cost with minimum pollution and minimum hazard and allows processing of continuous web. The prior art has difficulty contacting all the article or substrate surfaces, internal surfaces, pore surfaces and surfaces of voids with the treatment liquid. This invention overcomes these deficiencies.

A prime embodiment of the invention is a method and apparatus comprising using a combination of functional liquid and functional gas and replacing or flushing the gas from the surfaces, pores, internal volumes and voids of a substrate using the functional liquid followed by a drying step. Upon drying an electret substrate material is formed. The use of a functional gas maximizes the contact of substrate surfaces with functional liquid. It is a further teaching to enhance the mobility of the fluids used in the method of electret formation by using low Capillary Number processing conditions. An advantage of this method is that the complicated or incomplete wetting steps used in prior art are eliminated.

A prime embodiment of the invention is a method and apparatus comprising flushing the air from the surface and voids of a substrate and air trapped within a substrate. Flushing uses a functional gas, and it is followed by the replacement of the functional gas on and in the article with a functional liquid. This is followed by a drying step. Upon drying an electret substrate material is formed.

Another teaching of this invention is to create electret substrate using contacting liquids that are deaerated and degassed so as to remove dissolved and entrained noncondensible gases from the process liquid.

An additional embodiment of this invention is a simplified method of producing electret dielectric polymer fibers by extruding molten polymer fibers into pure steam, replacing the steam with pure water then following this with a drying step.

Still another teaching of this invention is the improved method and apparatus for making an electret comprising cleaning contaminants from the substrate and charging the substrate. Preferred methods and apparatus employ flushing with hot fluids.

Still another teaching of this invention is the method and apparatus for making an electret comprising cleaning contaminants from the substrate and charging the substrate.

Still another teaching of this invention is the method and apparatus for testing a precursor substrate or electret substrate for contamination.

Still another embodiment is the method of direct extrusion of molten polymer into a functional liquid followed by a drying step.

Still another embodiment is the method of direct extrusion of molten polymer into a functional gas followed by contacting with a functional liquid and a drying step.

An additional embodiment of this invention is a method and apparatus for making an electret substrate using functional gas and functional liquid, applying electrostatic charging and a drying the liquid.

Another embodiment of this invention includes the use of a charge additive as a constituent of a function fluid composition.

Another invention of this teaching is a method of making an electret substrate, media filter or article for a target liquid mist challenge, using a substrate that is not wet by the mist in the gas at the conditions of the challenge. It is a further teaching to use functional fluids and remove functional liquid by drying. It is a still further teaching of this invention to modify the filtration media by a means to achieve nonwetting by the specific mist.

The article for filtering a specific mist challenge is a teaching.

Another embodiment of this invention is the method and apparatus of hydrocharging using electrostatically charged functional liquids. This liquid is deposited on the substrate which is electrically isolated. The liquid is electrically charged to an elevated potential. The liquid is dried while maintaining the wet substrate electrically isolated from electrical ground and maintaining a conductive path from the charge applying position to the drying zone through low conductivity liquid.

It is another teaching of this invention to modify the surfaces of a filter media by appending particles to the surfaces. These may be particles of a different material, particles of an additive or particles containing additives, discrete particles or islands of particles or areas of a differing solid material to form a modified electret substrate, or electret precursor substrate.

Still another teaching of this invention is that the surface of an electret substrate or a precursor substrate may be modified by adsorption of an additive from a fluid to form a new functional electret. Adsorption is the process of physical or bonding attachment of additive molecules, colloidal particles, aggregations, latex particles, dissolved species, colloidal phases, or dispersed phases from a fluid onto a solid surface from a dilute concentration.

In other aspects, the invention features a filter or a respirator or a filtration article that includes an electret produced according to the methods of this invention.

An additional embodiment of this invention is to contact the substrate with solid particles followed by removal of attached particles by their phase change to a gas.

Additional embodiments of this invention are devices for implementing the methods of this invention.

Electrostatic Neutralization and Control and Cleaning

The invention teaches a method and apparatus for charge neutralization and its reduction on a substrate by treatment with semiconductive or conductive, grounded fluids for the cases where the liquid is wetting and nonwetting. It additionally teaches the simultaneous cleaning of the substrate with the conductive fluid.

Summary of Aspects

In one aspect, the invention provides a method of making an electret, comprising the steps of:
  a. providing a substrate;
  b. removing a first gas from the substrate with a functional, second, gas;
  c. adding at least one functional liquid to the substrate; and
  d. removing the functional liquid from the substrate.

In another aspect, the invention provides a method of making an electret, comprising the steps of:
  a. providing a substrate selected from the group consisting of a sheet, a piece part, an article, free particles, free fibers, and webs; and
  b. hydrocharging the substrate by:
    i. removing air from the substrate by immersing the substrate in boiling water;
    ii. removing the substrate from the boiling water; and
    iii. removing at least some portion of the water from the substrate by drying.

In yet another aspect, the invention provides an apparatus for making an electret, comprising:
  a. a gas applicator for applying a second, functional gas to the substrate to remove a first gas from the substrate;
  b. a liquid applicator operatively connected to the gas applicator for applying at least one, functional liquid to the substrate; and
  c. a dryer operatively connected to the liquid applicator for removing the functional liquid from the substrate.

In still another aspect, the invention provides a method of making an electret, comprising the steps of:
  a. providing at least one functional fluid;
  b. forming a substrate directly in the functional fluid; and
  c. removing a functional liquid from the substrate.

In a further aspect, the invention provides an apparatus for making an electret, comprising:
  a. a body of a predetermined volume of at least one functional fluid;
  b. a forming system having an output disposed in the body of fluid for forming a substrate directly into the body of fluid;
  c. a means to remove the formed substrate from the body of fluid; and
  d. a means, operatively connected to receive formed substrate, for removing the fluid from the substrate.

In still a further aspect, the invention provides a method of making an electret comprising the steps of:
  a. providing a substrate in a noncondensible gas;
  b. replacing the noncondensible gas with a functional liquid;
  c. selecting the functional liquid or the operating conditions so that the noncondensible gas is functional with respect to the functional liquid; and
  d. removing the functional liquid.

In yet a further aspect, the invention provides a method of controlling charge on a substrate, comprising the steps of:
  a. moving a substrate;
  b. applying at least one grounded liquid to at least one side of the moving substrate;
  c. removing the liquid from the substrate; and
  d. maintaining an electrically conductive path between a ground and the liquid until it is removed.

Another aspect of the invention is an apparatus for controlling charge on a substrate, comprising:
  a. a substrate mover for moving the substrate at a predetermined speed;
  b. a liquid applicator operatively connected to the mover for applying at least one liquid to one side of the substrate, the applicator being grounded; and
  c. a liquid remover operatively connected to the liquid applicator for removing the liquid from the substrate.

A further aspect of the invention is a method of modifying an electret substrate, comprising the steps of:
  a. providing an electret substrate; and
  b. supplying an additive to the substrate by contacting the substrate with a medium, whereby the electret substrate is modified by adsorbing species from the medium.

And, another aspect of the invention is an electret, comprising:
  a. a substrate; and
  b. a charge on the substrate, the charge being created by:
    (i.) removing a first gas from the substrate with a functional, second, gas;
    (ii.) adding at least one functional liquid to the substrate; and
    (iii.) removing the functional liquid from the substrate.

Further objectives and advantages of my invention will become apparent from consideration of the drawings and the detailed description.

DETAILED DESCRIPTION

Definition of Terms

Figure 1:
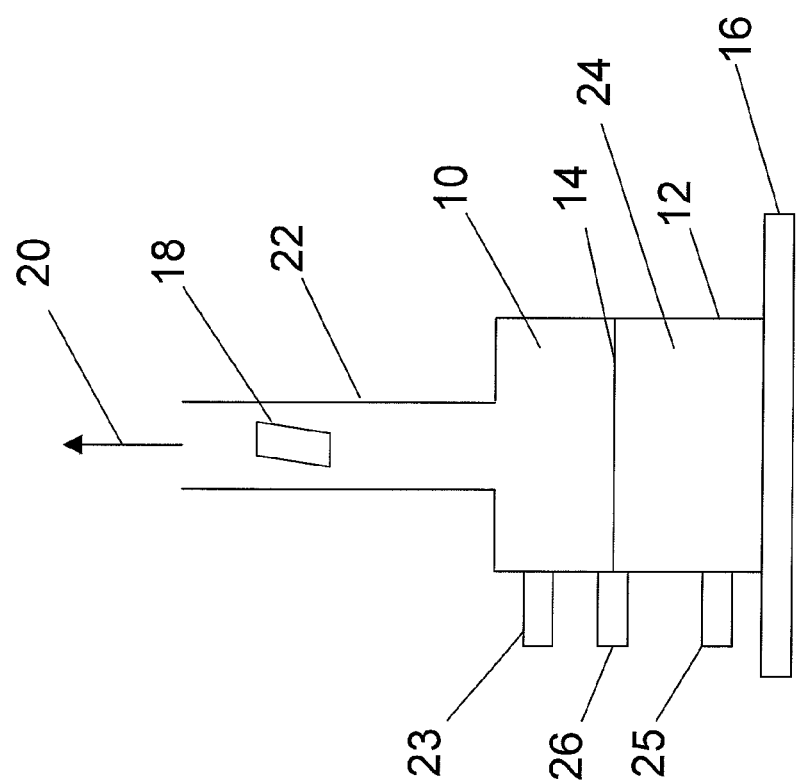
FIG. 1 illustrates an embodiment of an apparatus for manufacturing an electret using an embodiment of the method of making an electret of the invention.

An electret can be prepared according to the invention. One form of an electret media or substrate or article consists of a solid dielectric material with surfaces. On those surfaces are regions where an electric field exists. Ideally, a great many regions exist on the surface of the material, and they persist for long times. The presence of an electric force attracts and holds particulates and droplets contaminating a fluid passing in proximity of the surface. Thus electret media are highly desirable for filters.

To avoid confusion created by differing common and scientific usage, the following terms are defined for this document:

As used herein:

"gas" refers to the gaseous state of matter;

"liquid" refers to the liquid state of matter;

"flushing" means the physical removal of material from a given volume by displacement with another material. An example would be the displacement of gas from a beaker by filling it with liquid. In a similar manner air in a tube may be flushed from it by flowing a stream of another fluid through it until no substantial trace of the air remains.

"fluid" refers to material that flows and may be a liquid, a gas, a solid particulate collection, a fluidized particle suspension or a multiphase mixture;

"dihydrogen oxide" refers to the chemical compound whose molecules are composed of two hydrogen atoms combined with one oxygen atom;

"water" refers to the liquid form of dihydrogen oxide;

"functional liquid" refers to a charge imparting liquid which does not wet the target substrate or device and which when evaporated from a substrate produces an electret in the area which was contacted by the liquid;

"pure water" refers to water produce by distillation, deionization, reverse osmosis, or other purification means and is characterized by having an electrical conductivity less than 10 micro-Siemens per centimeter;

"aqueous liquid" refers to a liquid mixture containing at least 10 percent water by volume;

"functional gas" means a gas which is highly soluble in or absorbable into or onto a liquid, or condenses onto a liquid;

a gas is said to be a "gas functional with respect to a liquid" if it is highly soluble in or absorbable into or onto the liquid, or condenses onto the liquid and this pair of fluids is a "functional gas-liquid pair".

"polar liquid" means a liquid that has a dipole moment of at least about 0.5 Debye and that has a dielectric constant of at least about 10;

"dielectric material" means a material in which an electric field gives rise to no net flow of electric charge but only to a displacement of charge;

"nonconductive" means possessing an electrical conductivity of less than about 100 picoSeimens per meter at the use temperature;

"noncondensable gas" means a gas such as air, nitrogen, inert gases or oxygen that can not be condensed to a liquid without cooling below −50 degrees centigrade at a pressure of one atmosphere;

"condensable gas" refers to a gas that may be condensed to a liquid by cooling to temperatures above −50 degrees centigrade at a pressure of one atmosphere;

"steam" refers substantially pure dihydrogen oxide gas undiluted by any noncondensable gas such as air. Steam at a temperature above the boiling point temperature of water for the pressure at which the steam exists is said to be "superheated";

"ground" refers to an electrical ground which has substantial ability to absorb electrical current;

"standard conditions" refer to as normal room conditions of 18 to 20 degrees Celsius and 1 atmosphere pressure;

"pure gas" means a gas of a specified molecular species substantially free of any other species;

"absorb" means to suck up, engulf wholly, take in or incorporate;

"volatile component" refers to species that may be evaporated into a passing stream of gas;

"charge additive" means a material added to the electret target substrate or article for the purpose of enhancing a quality of the electret;

"nonwetting liquid" refers to a liquid that forms a static or retreating contact angle of at least 45 degrees with a specified solid surface. A perfect wetting liquid will have a zero contact angle with a solid and tend to spontaneously spread upon that solid surface; and for a porous substrate "nonwetting liquid" refers to a liquid that does not absorb into the substrate;

"precursor substrate" is a substrate which may be processed to become an electret substrate.

The Principle of Creation of an Electret Region by Improved Hydrocharging

Through research and study the inventor has learned that an electret region on a substrate may be created by hydrocharging. Hydrocharging is best accomplished by developing a field of liquid drops of a first and sometimes a second functional liquid upon the surface of an electrically non-conductive solid or a dielectric solid. The drops should be of a material that has a conductivity below $5 \times 10^9$ picoSeimens per meter. Furthermore, the drops should not wet the surface.

Each drop is surrounded by a three phase contact line. This hinders any electrically charged species in the drop from moving beyond the drop area and becoming neutralized. This also prevents the charged species in and on the drop from contacting those of another drop. This hinders neutralization. The contact line prevents a charge species from exiting from the liquid phase without overcoming, in a thermodynamic sense, an energy barrier. Movement of charged liquid across the contact line and across the liquid interface is resisted by a higher energy barrier if the contact angle of the drop with the solid is high. Therefore, high liquid contact angle is desired to produce non-spreading drops on a surface. Also, high surface tension is desirable to resist formation of new wetted surface area. Note that a high surface tension does not guarantee a high contact angle, but for a given solid and gas combination, raising the surface tension of the contacting liquid generally moves conditions toward achieving a higher contact angle.

High surface tensions will hinder wetting of the substrate but are desirable for electret charge generation. The preferred nonwetting functioning liquids are polar or aqueous, and they are pure or mixtures. Functioning liquids of this invention may contain filtration enhancing additives.

The developing of a surface covered by a functional liquid into an electret surface requires some amount of drying or evaporation of the liquid. The exact mechanisms of charge production on the substrate are not known. It may be that any drops formed during the liquid removal step have a high probability of containing an unbalanced electrical charge. When the drop dries, the charge is concentrated into a smaller area. Upon complete drying, the charge or its image is transferred to or left behind on the surface or in the substrate. This concentrated charge may be injected into trapping levels for charge carriers or in adequately deep potential wells for ions and dipole molecules.

The teaching of this invention includes methods for covering the entire dielectric solid surface with a liquid that does not want to wet it. This includes the substrate surface in any voids, pits, pores and the like that are normally filled with trapped gas.

A wetting liquid is not desired for creation of an electret during drying, but it is desirable to achieve contact with all media surfaces for treatment. This contradiction in properties for a hydrocharging liquid is one basis of prior art deficiencies.

A deficiency of prior art using fibrous web and hydrocharging liquids arises because it is difficult to obtaining complete contact of all the fiber surface areas when using an economical functional liquid such as water. This is especially true when trying to contact all surfaces of the bulk of a substrate of substantial thickness where the great percentage of the fibers are not immediately adjacent to an exposed face. Water commonly does not wet the fiber or substrate produced from polyolefins and many other organics. Many electret precursor materials intentionally contain extremely low energy surface compositions, commonly fluorochemicls, that prevent wetting. Achieving complete contacting of low energy and fluorochemical low energy modified substrates is nearly impossible to achieve with water without the teachings of this invention.

Complete contacting is further complicated with porous media. Even when lower surface tension liquids are used or the tension of water is lowered to achieve wetting of the media, these still do not completely contact the substrate. Air is trapped in dead end pits, voids, pores, and regions. Air trapped within the media prevents total exposure of all surfaces to the liquid prior to drying.

Impingement of the substrate with a nonwetting liquid such as pure water, or sucking liquid through or into contact with substrate requires expenditure of energy but still leaves many areas uncovered. Condensing nonwetting liquid from a gas phase that contains air or noncondensible gases also does not allow total treatment of all surfaces. Droplets nucleate directly on the surface without creating complete coverage. This invention overcomes the prior art deficiencies.

An efficacious field of drops is created by first displacing a noncondensible first gas usually air from the target's solid surfaces. This is followed by replacing the first gas, with a second gas which is a functional gas, and then replacing the functional gas with a functional liquid where the gas functionally is with respect to the liquid. Liquid films should cover substantially all the surfaces and then be allowed or be forced to break down to form drops. Any surface left uncovered will lack the drop treatment. It is the teaching of this invention that the second gas be soluble in the nonwetting functional liquid. It is an alternative teaching of this invention that the second gas be absorbable by the nonwetting functional liquid or condense on the liquid and most preferred, the second gas be produced by boiling the nonwetting functional liquid.

A key requirement of this invention is removing gas or air from the target surface and covering the surface with a nonwetting functional liquid. This is an important step in treating all surfaces of the substrate for conversion to an electret. Cloth fabrics, nonwoven substrates, and fibrous mats, particulate mats and porous media are all characterized as having a length, a width and a thickness. Removing air from the inside of the thickness of a substrate and contacting all of the surface area of the internal media structure with functional liquid is particularly difficult.

First Embodiment and Detailed Mechanisms

In the first embodiment of the invention, an electret of this invention is created by a multistep process. First is the replacement of substantially all the air or noncondensible gases on the target surface regions on and within a substrate with a functioning liquid. This includes the gas in voids, pits, pores and the like on, in or connected to the target surface so that the liquid covers all surfaces within the fabric or substrate.

A second step is the removal or displacement of some portion of the liquid to create contact areas or sub regions within the target surface regions. These sub-regions are enclosed by single or multiple three phase contact lines, separating liquid covered and uncovered areas. An example of this is the spontaneous breakdown of a continuous covering layer of liquid into a distribution of drops surrounded by previously covered, but now uncovered areas on a target substrate surface. Note that a drop on the surface of a plane has one contact line surrounding it, and a small fiber passing through a drop of a larger diameter has a subregion covered by the drop confined by two contact lines. One will be present where the fiber enters the drop, and one will be present where it exits from the drop.

The third step is the complete removal of the remaining liquid by a process that includes a drying step. The drying step is driven to completion with the liquid being evaporated from the solid. Electret surfaces will be present after drying. A high density of contact subregions per unit surface area will create a good electret surface, especially for collecting and trapping particles from a fluid stream. Best results are obtained with low surface and bulk electrical conductivity of the liquid. This inhibits charge migration during and after the process. Liquid with a conductivity less than $5 \times 10^9$ picoSeimens per meter is preferred. Pure water is preferred for the liquid. Distilled or deionized water are preferred forms of water.

It is also a teaching of this invention to use the step of freezing the liquid on the subregions on the surfaces. The frozen liquid may be removed with or without reforming a liquid phase. The frozen liquid may be removed by the process of freeze drying or sublimation.

If most single drops of liquid upon a surface contain a net charge, and the population of drops contains a near neutral charge, then some drops may have a net positive and some may have a net negative charge. This of course is not true if charged liquid is placed upon the substrate that is electrically isolated from ground. The evaporation of the functional liquid from the drops concentrates any net drop charge into a smaller and smaller area. Total removal of the water leaves behind locally charged substrate.

Here again, it is important that the liquid does not wet the solid, and a preferred contact angle is greater than 90 degrees as this will generally result in a greatest population density of drops upon the surface. Angles greater than 90 degrees have larger volume to solid surface contact area ratios which is believed to benefit electret production.

When a thin layer of nonwetting liquid coats a plane surface or a cylinder (fiber), the well known fluid dynamic Rayleigh instability results, and the continuous film or sheet breaks up into drops. The process is driven by surface tension which produces a force to minimize the liquid surface area. The speed of the process is controlled by the ratio surface tension driving forces to viscous flow retarding forces. Here, a high ratio of liquid surface tension to liquid viscosity is important in improving the process of break up of a covering film into drops. To this end, the use of water at or near its boiling point is preferred where the viscosity is 6.33 times lower than at its freezing point.

The Problem: Removal of Air from Porous Substrates

Covering the surface of a solid sheet with a nonwetting liquid is accomplished by submersion. With porous substrates, simple submersion does not treat all internal surfaces. The process challenge is to treat the total media surface area with a nonwetting functional liquid required for creation of an electret. Key to creation of a most effective electret substrate is to first cover completely the solid surfaces with films of the charge producing functional liquid. Anything less than complete coverage will limit the total extent of electrification of the substrate. This total coverage is most difficult with fibrous, porous fabrics or porous media in general, because air is easily trapped within them and is difficult to displace with liquid.

The displacement of gas is only partially accomplished by known prior art. This invention teaches substantially total removal of all air or gas from all substrate external and internal surfaces followed by coverage with a functional liquid.

Prior art teaches the use of a wetting liquid with a low surface tension composition followed by substituting with a nonwetting liquid. It will create three phase wetting lines that will tend to spread across the substrate surface. However, air will still be trapped in voids, pits and multiple irregularities in and on the substrate leaving surface untreated. This is especially true with fibrous substrates of measurable thickness. Pockets of air tend to be trapped within the thickness of the media.

Even if the contact angle of a treatment liquid is near zero, air will still be trapped in dead ended voids and pits in the substrate leaving surface areas untreated. The surface area within these unwetted regions is often quite substantial for cloth-like fabrics and porous media of substantial thickness. As the surface tension of the liquid used is raised, the wetting process becomes less and less efficient and the degree of coverage of the substrate surfaces is lower and lower.

Additionally, any method of creating an electret by starting with a wetting liquid requires a transition in the wetting properties of the liquid treatments, from wetting nonwetting, after the partial coverage of the substrate occurs. This is because the retraction or drainage of wetting drops leaves behind thin liquid films of which allow charge mobility. Thus, the transition of liquid properties from wetting to nonwetting is needed during processing with a wetting liquid, and this adds complexity.

Without special methods, any emersion in a wetting or nonwetting liquid always traps gas in the voids and pores and internal substrate regions. Complete coverage of all surfaces and filling of all voids and all pores with liquid is best accomplished by removing the air and replacing it with a functional gas, and then replacing the functional gas with a functional liquid. Here again, this means the gas functionality is with respect to the functional liquid employed.

Condensing a nonwetting liquid onto a substrate from a gas phase containing noncondensible air does not produce complete liquid coverage of the surface. The nonwetting liquid will deposit as drops leaving some areas, especially voids and pores untouched by liquid. Complete coverage of the target surface with functional liquid is desired.

Removal of Gas from Porous Substrates—Problem Solution

This invention teaches a method for total coverage of porous substrates and complete coverage of all their surfaces with nonwetting water or other functional liquids. It teaches methods of filling the pits, voids and pores with functional liquid.

The process requires the first step of replacing the air from the surface and the voids of the substrate with a functional fluid composed of molecules that are absorbed by the nonwetting liquid. The fluid is displaced or replaced from the substrate by the flushing action of a flow or contact with a nonwetting functional liquid. The preferred fluid is one that is absorbed into the functional liquid or reacts with the functional liquid in any manner where it becomes incorporated in the functional liquid, leaving substantially no gas phase behind. A preferred fluid is absorbed into or onto the functional liquid.

The exact details of the process are not totally clear since part of the process takes place at microscopic and submicroscopic dimensions which are not observable. In general, it is believed that a gas is preferred for flushing air from a substrate. A gas has very high mobility, is infinitely miscible with another gas, has very low viscosity and as a consequence, is ideal for flushing air and replacing air from a volume.

Functional gases are identifiable as those that are much more soluble in a functional fluid than air. A soluble functional gas in a volume will dissolve in or absorb on a functional liquid and can be removed from the volume by contacting it with the functional liquid. For example, carbon dioxide gas has a solubility in units of moles per mole of liquid of twenty nine times greater than air at 60 degrees Celsius. A functional gas such as carbon dioxide generally is not present in the functional liquid at a saturation level, whereas air generally saturates the liquid if special precautions are not used.

Flushing the functional gas from the substrate with a sufficient volume of functional liquid will leave, in the beginning of the process only, a small amount of gas behind in the pits and voids of the substrate. The remaining gas will be bubbles in the fabric and attached to the substrate fiber surfaces. The gas in the bubbles will rapidly dissolve in, absorb in, or react with an unsaturated functional liquid. Again it happens when the gas is a functional gas with respect to this liquid. The bubbles will collapse and disappear. This leaves all surfaces covered with the nonwetting functional liquid.

Surprisingly, it has been found that the functional gas flushing step may be eliminated if replacement and flushing of the air within the substrate is accomplished with a liquid in which air is rapidly absorbed. Such a liquid is a functional liquid from which air has been removed, leaving it unsaturated with air. This liquid preparation makes air a functional gas with respect to the liquid. Preferred is a functional liquid which has a dissolved air contact as low as practicable and at least below fifty percent of its saturation value. Many ways are available for providing liquid substantially free of dissolved air.

Functional liquid with an air content below the saturation level for the temperature and pressure at which the liquid flushing and gas replacement takes place may be formed in many ways. More preferred is liquid with a dissolved air concentration ninety percent below its saturation level. In all these cases a liquid has been specially chosen so as to make the air have gas functionality with respect to the liquid. That is to say we have made the air and liquid here a functional gas-liquid combination.

Most preferred is a liquid with a low dissolved air content and a high capacity to absorb air. This is best described as a liquid having a large difference between the equilibrium solubility and the actual amount of dissolved gas per unit volume of the liquid at the flushing conditions. Most preferred is a functional liquid which has a dissolved air content below fifty percent of its saturation value, and an air saturation value of at least 0.015 moles of solute per mole of functional liquid.

In this situation, the method includes the steps of providing a substrate containing a preferred functional gas, replacing or flushing the gas from the substrate with a functional liquid which is not saturated with the gas, and drying the liquid. Here again, the gas functionality is with respect to this liquid. Preferred is a liquid substantially free of entrained or dissolved gas. It is also a teaching that the flushing with liquid may take place in two steps. The first is with liquid which has a relatively high capacity to absorb the gas. This is followed by a liquid that has a lower capacity.

This invention is further illustrated by the following example. Air in an electret precursor fabric is flushed from the fabric with the functional liquid, pure water, with a dissolved air content below its saturation level for the temperature and pressure of the flushing step. This water may be produced in many ways. Vacuum distillation performed at a temperature above the temperature of the flushing process will produce the low dissolved air content water. This water is then stored and provided to the flushing without exposing it to air. Following liquid replacement of the gas, the fabric is transformed to an electret by drying.

A functional gas may also be one that when absorbed by a first functional liquid, forms a second functional liquid mixture. It may also be one that forms a second functional liquid upon contact with the first functional liquid. A functional gas, when dissolved in a first functional liquid, forms a second functional liquid mixture. A functional gas, when transformed to a liquid and mixed with a first functional liquid, forms a second functional liquid mixture.

The removal of functional gas in the substrate leaves solid surfaces covered by the nonwetting functional liquid, even though it would not by itself spontaneously wet the substrate if place upon a portion of its surface.

The functional gas is flushed or displaced from the substrate through the application or flow of the functional liquid. Any trapped volume of gas present during the initial phase of the liquid flushing step will subsequently be absorbed by, and become part of, the composition of the functional liquid. The incorporation of the functional gas into the functional liquid, as noted before, essentially forms a functional liquid mixture with a slightly different composition. In the case where steam is the functional gas, any trapped gas bubbles will be absorbed by the water. Water that is not boiling has the ability to totally absorb the steam. This eliminates all trapped volumes of the functional gas. When contacted with an excess of liquid in this manner, total coverage of the surfaces of the substrate with nonwetting liquid is accomplished.

Illustrative Details of a First Embodiment

A simple application of this method of treatment is illustrated in FIG. 1. Vessel 12 is supported and cooled by heat sink element 16. A functional liquid 24, pure water, is present in the vessel. The liquid is pumped into the vessel through pipe 25 and exits through pipe 26.

A functional gas is used for processing. This functional gas is a gas that when contacted by the water in the vessel, will be absorbed by it. Functional gas is present in the vessel volume gas space 10 above pure water 24. Functional gas is introduced from a source not shown by pipe 23. Its continuous introduction causes it to flow out through the neck 22 of vessel 12 and exit through its open top, as indicated by the arrow 20. Substrate fabric 18, which is to be converted into an electret and is not wet by pure water, is placed in the flowing stream of functional gas exiting from the vessel neck. The fabric may be, for example, made from material like melt blown polypropylene microfibers. After a sufficient period of time, the flowing functional gas will flush all air from the surfaces and the volumes in and around the fabric.

After flushing with the functional gas, the fabric 18 is plunged into the water 24 and held there. The submersion process flushes functional gas from the fabric, and any remaining functional gas trapped within the fabric is absorbed by the water. All surfaces of the fibers of the fabric and the spaces between them will be covered with water when this occurs. All spaces between the fibers will be filled with water. This provides coverage of the substrates fibers with the functional liquid including voids, pits, internal spaces, pores, and porous areas within the fabric. Removal of the wet fabric from the vessel and drying creates an electret article.

The method of this invention may also be preformed with the apparatus of FIG. 1, modified to provide transport of a continuous web into the neck 22, through the gas space 10 into the water 24, out of the water, and back out of the neck 22, and then on to a drying station. This is easily accomplished through the use of web bearing idler rolls, fluid directing and transport devices such as those described below.

Figure 2:
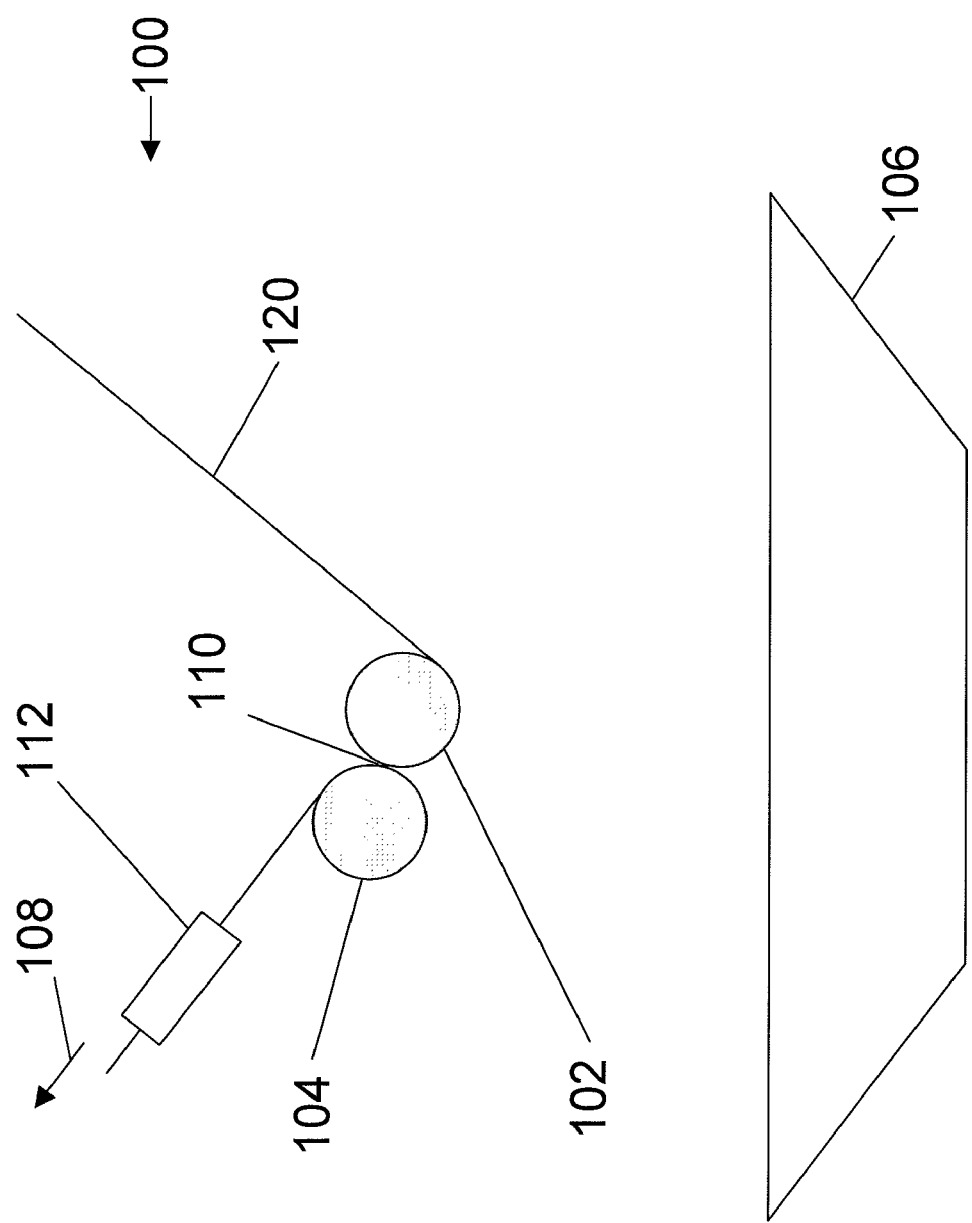
FIG. 2 illustrates an alternative embodiment of the apparatus, including contactors.
Figure 3:
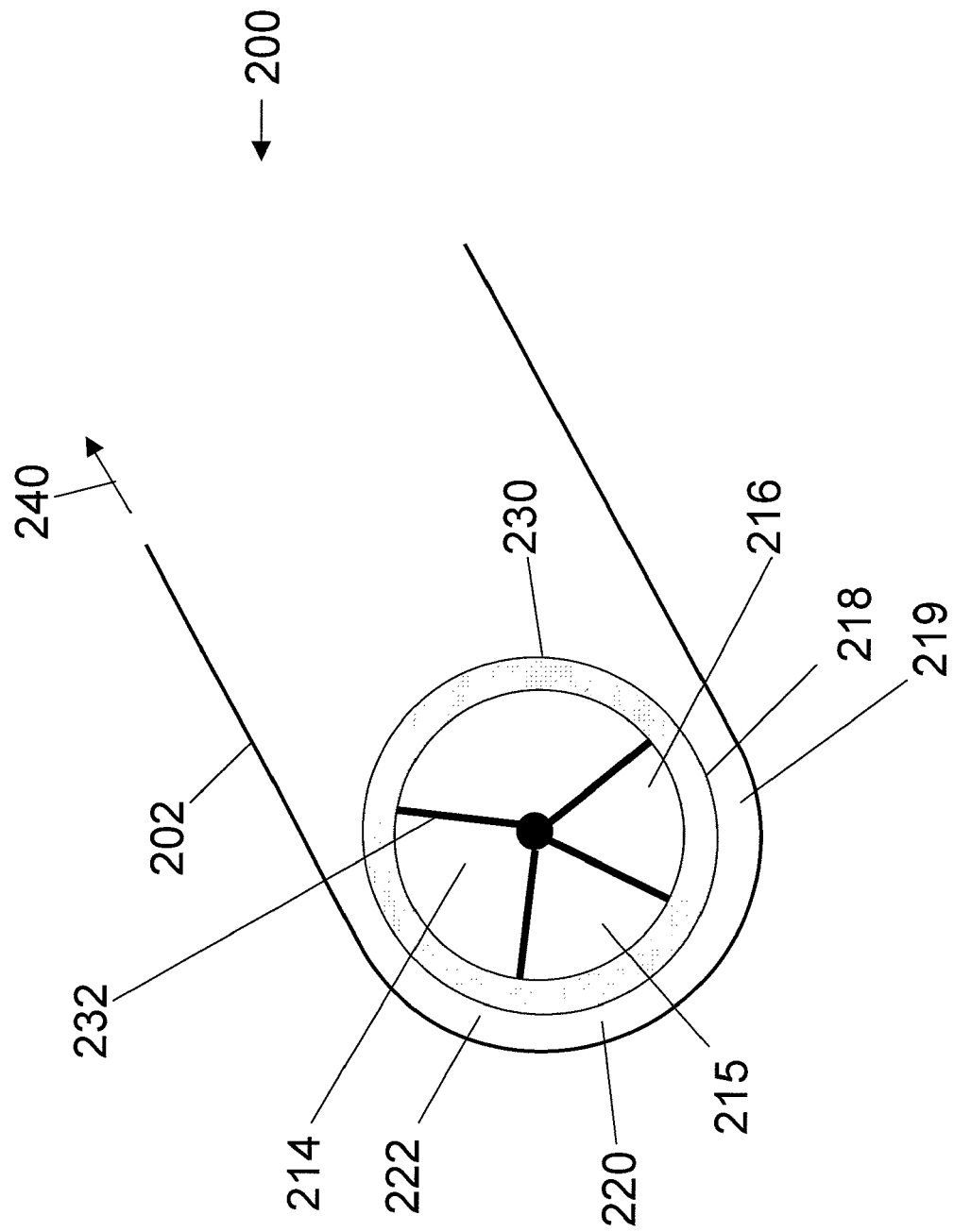
FIG. 3 illustrates a further embodiment of the apparatus including a single contactor for applying a functional fluid.

The method of this invention is further understood by referring to FIG. 2 which illustrates a different continuous contacting apparatus in a treatment station 100 of this invention, for cleaning and conversion of the substrate to an electret. At this station, a web 120 of a nonwoven substrate is brought into contact with a dispensing device 102. Here a functional gas is dispensed into, on and through the nonwoven to flush and displace air from the substrate. Additionally, it is the purpose of the gas to heat the substrate. The heated gas is produced by a means not shown. The gas is ducted to the dispenser 102 by process lines that are not shown. Details of one form of dispenser combining the functions of 102 and 104 are illustrated in FIG. 3.

From device 102 the web passes onto a water applying device 104. It is preferred that the two contactors 102 and 104 be positioned adjacent to each other so as to minimize the distance between them. It is preferred that the functional liquid is also heated. During application, the hot functional liquid is force on and into the substrate. The functional gas is absorbable by the functional liquid. The functional liquid displaces the functional gas and absorbs any gas not physically displaced. Excess functional liquid may be applied and the overflow will drip into catch pan 106.

The heated functional liquid provides cleaning of the substrate which is another teaching of this invention. Additional heating is preferred by using a heated functional gas.

Although liquid and gaseous dihydrogen oxide are the most preferred fluids, many other functional fluids may be used to create an electret substrate. These include both polar and aqueous fluids. The functional gas may also include gases that are very soluble in the liquid being used or gases that will be highly absorbed by the functional liquid in any manner. Functional gas may be produced by evaporation from a liquid. Many useful combinations of functional gas and functional liquid may be used. These include, but are not limited, to examples such as hot air and cold water substantially free of dissolved air, acetone gas and water, and carbon dioxide gas and water. In every case, the functional liquid is required to have the ability to absorb the functional gas and still function as functional liquid, with the absorbed gas present. If the liquid does not function as a functional liquid with the absorbed gas present, it is a teaching to employ a method of removal of the gas between the gas absorption step and the drying step.

An alternative teaching is to flush the non-functional liquid from the substrate with a functional liquid following the gas absorption step. There is also the case of replacing the gas in a substrate with a functional liquid that is not saturated with the gas and will absorb the gas, thus avoiding the flushing one gas with another.

In the process of flushing air from the substrate, the volumes of functional gas used are large enough to strip substantially all the air from the substrate. The volume will necessarily depend upon such substrate characteristics as the bulk density, porosity, mass per unit area, transit speed, surface characteristics, etc. Superheated steam is a preferred gas. The volume of functional liquid used will also depend upon these variables. It is often preferred that the liquid be heated.

Steam and water are inexpensive functional fluids for the process. Even if the water is at a temperature near its boiling point before contacting the substrate, the steam is absorbed by the water. Surprisingly, water at its boiling point at the temperature and pressure of treatment, will absorb steam in this process, leaving all surfaces covered by nonwetting water. It is thought that bubbles of steam will not remain in equilibrium with the water because of surface tension effects.

Upon passing from the functional liquid applicator 104, functional liquid may be mechanically removed from the web 120 by devices not shown. These include gas jets to blow liquid from the totally covered web. Gravitational drainage, centrifugal removal, suction nozzles to suck functional liquid from the web, squeeze rolls to squeeze functional liquid from the web, sonic or ultrasonic vibration devices to vibrate functional liquid from the web, or other means to remove excess functional liquid from the web without requiring evaporation, are a teaching. This step is not required, but is preferred to reduce the energy required in removing functional liquid during the drying step.

The gas in a blowing removal of functional liquid step may be a thermodynamically saturate gaseous species that would be liquid at the standard conditions, or a superheated gaseous species that would be liquid at the standard conditions. In many cases, steam or superheated steam will be the preferred gas for blowing gas jets. This blowing step will clean volatile contaminants from the substrate. Examples of which are oil, melt processing degradation components or other contaminant residues from the manufacture of the substrate.

The use of a heated gas in the blowing liquid removal step is preferred because it preheats the web prior to the removal of the remaining functional liquid by drying. From the functional applicator 104, the web travels to a drier 112, where the remaining liquid is removed by evaporation. Many methods of drying are known to those skilled in the art. Surprisingly, it is found that drops of functional liquid will exist and persist on an electret substrate precursor in the presence of steam or superheated stream. Superheated steam may be used as the heated gas in a drying oven. This use provides further cleaning of the substrate.

In transporting the web from the liquid application station to and through the drying step, it is preferred not to touch the web with grounded, conductive substrate transporting structures such as idler rolls. Rolls used to facilitate the directing and movement of the web through the processing station should be electrically isolated from electrical ground.

Two separate applicator devices are shown in FIG. 2. These may be of various constructions familiar to those skilled in the art of liquid and gas application to webs. The sequential process may also be accomplished in a single device combining both processes. The liquid applicator may be a roll applicator, a die applicator, a flow bar or employ any of the coating methods and devices known. Examples of coating processes are described in the book "Liquid Film Coating" edited by S. F. Kistler and P. M. Schweizer, Chapman & Hall, New York, 1997, ISBN0412064812.

FIG. 3 illustrates a functional fluid applicator device 200 which sequentially contacts a porous or nonwoven web with functional gas to displace air from the web, contacts the web with a functional liquid to displace the functional gas from the web, and then blows liquid from the web prior to drying. Functional gas, functional liquid, and a blowing gas are brought into contact with web 202 traveling in a direction indicated by arrow 240 at applicator device 200.

The functional gas is flowed to chamber 216 and passes through wall 218, into the space 219 between the web 202 and contactor 230 and adjacent to chamber 216. It is preferred that contactor 230 be constructed from a porous metal material. A functional gas is supplied to space 219 at a rate sufficient to allow web 202 to pass around contactor 230 without excessive friction. A rate sufficient to fully support web 202 spaced off contactor 230 and prevent touching is desired. A rate sufficient to force and flush air from the substrate, its voids and pores is desired. This rate will depend upon factors such as the tension and the speed of the movement of web 202, the exact geometry and flow distribution of gas through wall 118 and the thickness and density of the substrate. For a porous nonwoven web, the gas will pass through and issue from the surface of the web opposite the contactor.

Member 232 is an internal structure that divides the volume inside contactor 230 into separate chambers 214, 215, and 216. The substrate passes chambers 216, 215 and 214 in sequence. An alternative construction is possible where the wall 218 rotates while the member 232 remains stationary.

A functional liquid is supplied into chamber 215 and passes through wall 218 into the adjacent space 220 between the web 202 and member 230. The functional liquid is flowed at a rate sufficient to flush the functional gas from the volume of the web, its surfaces, its pores and its voids. For a porous nonwoven web, the liquid will pass through and issue from the surface of the web opposite the contactor.

A pressurized gas is supplied into chamber 214 and passes through wall 218 into the adjacent space 222 between the web 202 and member 230. The gas is flowed at a rate sufficient to remove some portion of the functional liquid from the volume of the web, its surfaces, pores and voids. For a porous nonwoven web, the gas will pass through and issue from the surface of the web opposite the contactor and in the process, remove a portion of the liquid from the web before the drying step.

An alternative process for removing a portion of the functional liquid is to apply vacuum to chamber 214. Additional chambers may be added in a contactor similar to that shown in FIG. 3. Such apparatus may combine the process steps of both sucking and blowing.

After contacting by device 200, the wet web continues to a drying step (not shown) to complete the conversion of the substrate into an electret substrate.

It has been discovered that improved performance may be obtained if the liquid used in hydrocharging has been degassed and is substantially free of air and other noncondensible gases. Presumably, this prevents the contamination with air during contacting steps.

Preferred fluids are pure steam, and pure water. Most preferred is water devoid of dissolved gases and entrained noncondensable gas bubbles. A method of removing gas and bubbles is described by Leonard in U.S. Pat. No. 5,505,995. Still, even more preferred is heated water devoid of bubbles and dissolved gases. The water is flowed at a rate to provide displacement of the functional gas from the substrate and to create a substrate whose free volume is filled with the liquid water, and all surfaces internal and external are covered with water even though the substrate is not wet by water.

Polar liquids and aqueous liquids may be used for the functional liquid. A functional gas produced from boiling a polar liquid may be used in combination with the liquid. The gas produced from boiling an aqueous liquid may be used in combination with the aqueous liquid for treatment If gravity drainage is used to remove functional liquid before the drying step, theoretical analysis of the liquid flow shows an important parameter controlling the drainage separation of the water from the web is the Capillary Number. It is known and defined in fluid dynamics texts. It is defined as the product of the liquid viscosity, times the web speed, times the inverse of the liquid surface tension. Drainage will be improved if the Capillary Number is minimized. This is easily done by reducing speed or more preferably, by increasing the water temperature. Raising the temperature reduces the water viscosity much more rapidly than the surface tension is diminished. Thus, heating produces a net reduction in Capillary Number. An elevated temperature of 100 degrees Celsius results in a significant reduction in the Capillary Number without changing web speed. This promotes drainage of water from the web. It also facilitates forced removal as well.

Hydrocharging Using a Two Phase Mixture

An additional embodiment of the invention simplifies the fluid contacting steps by using a two phase mixture of functional gas that is functional with respect to the functional liquid used, and the functional liquid. The contacting steps are performed by a single device. Again, the gas should be substantially free of gases that will not be absorbed by the functional liquid. This method may also use the apparatus illustrated in FIG. 3.

The two phase mixture of functional gas and functional liquid may be substituted for the gas flowing into chamber 216, or the liquid in chamber 215, or both. It flows onto and through a nonwoven web. It flushes the air from web and replaces it with functional fluid. This allows contacting all surfaces without the interference of the air. If the web is a film the mixture is flowed onto its surface.

A two phase mixture contains regions of gas and regions of liquid. Forcing these through the substrate will create at least one sequence of flushing the void volume with the functional gas, followed by displacement of this gas with functional liquid. The gas-liquid interface is moved through the substrate. In fact, use of a large volume of the two phase mixture will generally insure this takes place multiple times. Depending on the characteristics of the substrate, it may be desirable to flush the substrate first with a gas rich two phase mixture, followed by a liquid rich mixture. Gas rich mixture means more than fifty percent of the volume is gas. Liquid rich mixture means more than fifty percent of the volume is liquid.

It is preferred that the two phase mixture not be in equilibrium. Or if it is, the equilibrium is destroyed after contacting the substrate. In this manner the gas may be absorbed by the liquid. It is also a teaching of this invention to follow the two phase flushing step with flushing with a functional liquid. This may be accomplished by flowing this functional liquid in chamber 214 and through the adjacent wall of member 230. Using liquid cooler than the mixture helps promote complete condensation and absorption of all gas.

It should be recognized that multiple devices may be used simultaneously or sequentially. The two phase mixture may be flowed onto each side of the web simultaneously or sequentially. Following the air displacement and the flushing with the mixture, the liquid is dried from the web. Water and steam mixtures are preferred for the two phase mixture.

Alternative Embodiment of Hydrocharging

A third embodiment of this invention uses a process or method wherein air is displaced or flushed from the substrate, by a condensable functional gas which in turn is flushed from the substrate by a functional liquid. When the gas condenses to a liquid, that liquid and the functional liquid produce a functional liquid mixture. Any residual functional gas trapped within or on the substrate is absorbed by the liquid.

Figure 4:
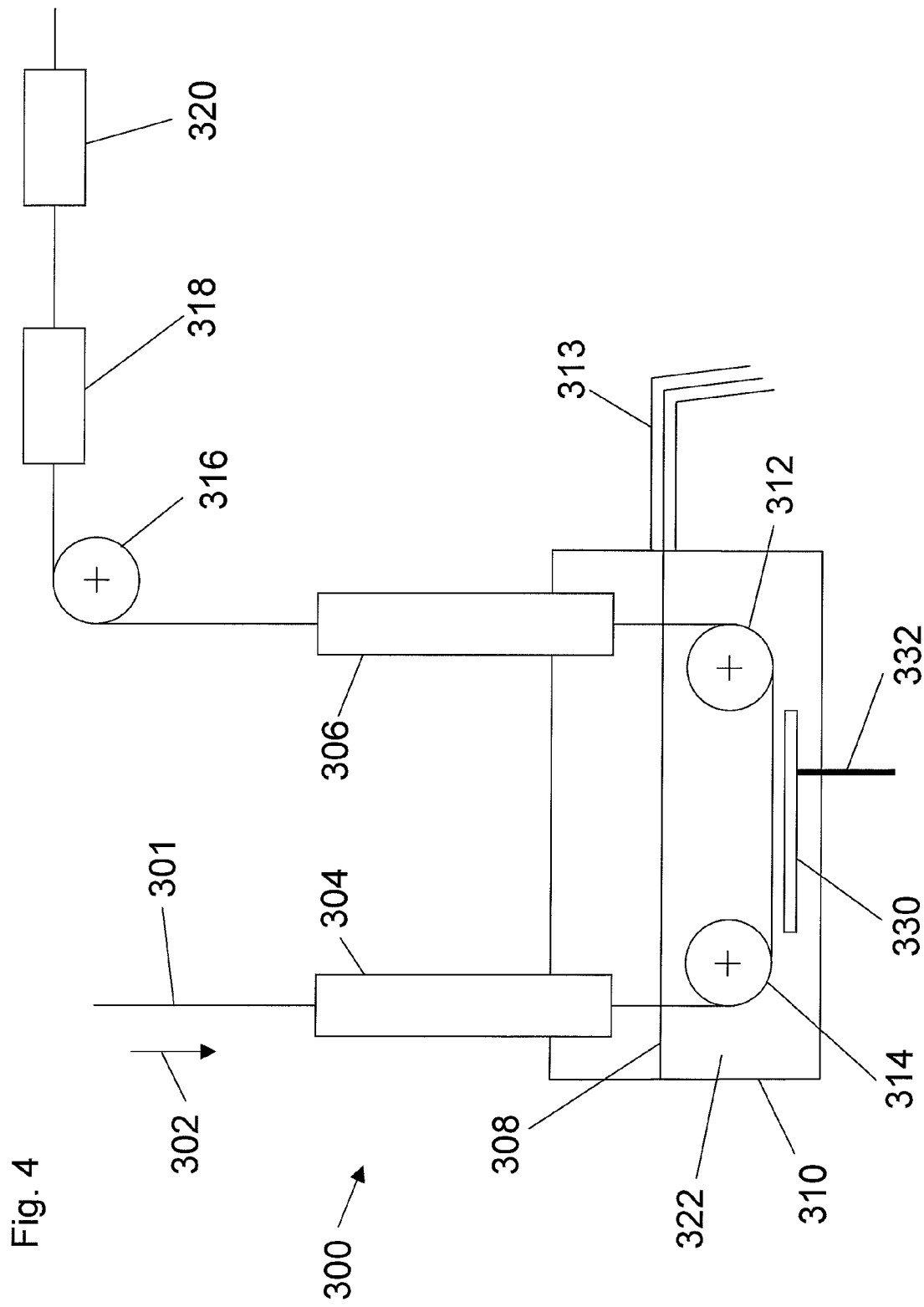
FIG. 4 illustrates yet another embodiment of the apparatus, including a chamber and manifold.

FIG. 4 illustrates another apparatus of this invention. Web 301 enters the electret treatment station 300 with the direction of motion shown by arrow 302. Tank 310 is partially filled with functional liquid 322 to a level indicated by the liquid gas interface 308. Idler rolls 314, 312 and 316 direct the web through the treatment apparatus. Tank 310 contains a functional gas distributing manifold 330 which receives gas from a source not shown through a process pipe 332. It is preferred that the gas be heated. It is discharged into the tank 310 and provides a heating means for the liquid 322. Functional gas collects in the top of the tank at a pressure that is positive relative to the air outside the tank, and it is discharged through condensers 304 and 306.

The purpose of the condensers is to provide a means of cooling fluids exiting from the tank. The condensers are to provide a means of recovering any functional liquid evaporated in the tank. They also provide a restricted entrance for the web 301 to the tank. In the condensers the gas flows from the tank end toward the air end at its top. This prevents any air from entering the process tank 310.

The condensers have the appropriate internal structure that anyone ordinarily skilled in the art of condenser design, may specify to provide cooled condensing surfaces and a path way for the web 301 to pass through it. The passage of the web through the functional gas in the condenser 304 and head space of tank 310 will cause the web to be heated. The air in the void spaces of the web is flushed and purged from the web by the upward flow of the gas into condenser 304. Functional liquid displaces the functional gas when the web moves below the liquid level 308 in the tank.

The gas entering the liquid 322 from manifold 330 creates a flow of a two phase mixture of the functional fluids above the manifold. This provides heating and a cleaning process for the web. The mixture also provides the contacting and flushing actions of the functional fluids. It may substitute or augment the above mentioned flushing step. The web leaving the tank through condenser 306 will contain functional liquid or a mixture of functional fluids.

Liquid is added as needed to the tank by a means not shown. Any excess accumulation is drained by the level overflow drain 313. This drain removes surface liquid from the tank. It is preferred that a constant flow from the drain be maintained. This will carry away process contaminants collecting on the liquid surface 308.

Passing from the condenser 306, the web is directed to a mechanical liquid removal device 318. This may include one or more devices such as, but not limited, to devices for blowing, sucking, scraping, draining, or sonic treatments. From 318 the web passes to a drier 320 where the remaining functional liquid is substantially dried. Many methods of drying are known and are selected so as to be most appropriate for the material being processed.

At some position between the liquid surface 308 and the exit of the drier 320, the continuous film of functional liquid covering the substrate surfaces will break down and drops will form on the surfaces. This happens even though the liquid does not have wetting properties relative to the substrate at the processing conditions. Pure dihydrogen oxide is preferred for the functional gas and functional liquid.

Passing web into a chamber which contains both a gas created by boiling a functional liquid and a functional liquid followed by emersion in a functional liquid, is also a teaching of this invention. This method is very simple to implement. Here, the condensers are not necessary if the gas is nonhazardous and the gas may be vented to the atmosphere. In its simplest form an apparatus the condensers 304 and 306 of FIG. 4 are removed. Functional gas issues from the openings where the web enters and leaves the tank. It is supplied at a rate sufficient to prevent air from entering the tank. The gas is supplied at a rate sufficient to flush air from the web. After removing the web from the tank, the functional liquid is dried from the web.

Still another variation of this invention would include operating tank 310 with condensers and with a functional liquid level below the horizontal path of the web 301 through the tank. Here the web 301 would only be contacted by a stream of functional gas.

Figure 5:
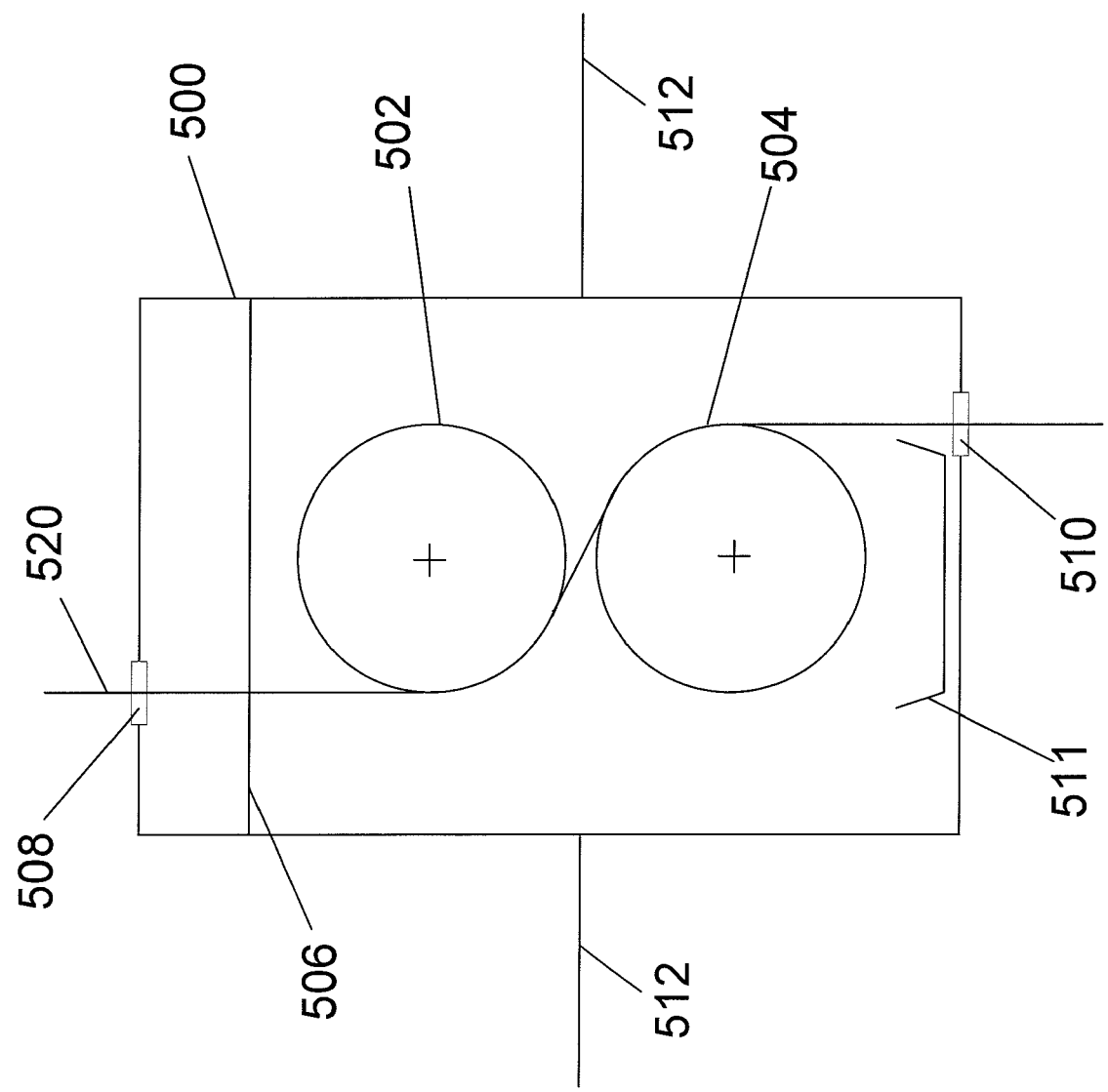
FIG. 5 illustrates an alternative embodiment of a portion of the chamber, including condenser for continuously flushing air from a substrate and continuously replacing steam with water.

Once air has been flush from the substrate by the gas, the functional gas in and functional gas near a cold condenser surface is condensed to functional liquid and contacted to the web. Sufficient functional gas is condensed to treat and cover all the web surfaces with functional liquid. Here, as with all other functional gas contacting steps in this invention, functional gas should not contain noncondensible gases or air. Although there are many ways to accomplish this, a simple condenser for purpose of continuously flushing air from the substrate and continuously replacing that steam with water is illustrated in FIG. 5. This condenser could replace condenser 306 of FIG. 4 or condensers 304 and 306.

Providing functional liquid by condensing functional gas has the advantage of providing distilled pure functional liquid to the contacting process. Pure, uncontaminated contacting liquid resulting is useful in flushing contaminants from a substrate.

Web 520 enters condenser 500 through opening 510, and exits from it by exit opening 508. Opening 510 is directly within the tank 310 of FIG. 4. Only a section of the top of tank 310 of FIG. 4 is shown in FIG. 5 and labeled 512. In the contacting condenser 500 are mounted two cooling rolls 502 and 504. Coolant is supplied internally to these at a controlled rate by a means not shown. These rolls cool a portion of the functional gas entering with the web and the functional gas in the web, and condense it to functional liquid. Enough functional liquid is produced to cover all the surfaces and fill all the voids and pores of the web. Functional liquid on the cooling rolls displaces the functional gas to leave the surfaces covered with a water film. Any inadvertently trapped functional gas is absorbed by the functional liquid.

Excess functional liquid flowing off the cooled surfaces is collected by pan 511 and drained away for recycling or disposal.

The web is guided by the rolls 504 and 502 and the substrate runs in contact with them. Coolant is supplied at a controlled rate and functional gas is provided via entrance 510 at a rate such that pure functional gas is maintained below position indicated by line 506. Above the line a mixture of air and functional gas and a fog of droplets may exist. Preferred functional gas is applied at a rate sufficient to prevent air entering exit 508.

Those skilled in the art will recognize that many variations of the condenser 500 of FIG. 5 may be used for processing. All are within the scope and teaching of the invention. Additionally, the tank which has a top 512 shown in FIG. 5 may be eliminated. In its place an air displacing functional gas applicator may be substituted at the entrance 510. Such a functional gas applicator flushes air from the web with functional gas and prevents air from entering the condenser through opening 510. Still another simple modification would be to supply the condenser 500 internally with functional gas. This supply would be at a sufficient rate and supplied in a manner so as to prevent air from entering the entrance 510. This supply would also be at a sufficient rate and supplied in a manner so as to flush air from the web at or before entrance 510.

Cleaning Surface Contamination from Electret Substrates

Those skilled in the art of air filtration and electret media performance recognize that oil collected from a fluid stream destroys the long term performance of the filters. Much effort has been devoted to producing oil tolerant formulations for filter media, but there has been no recognition of the importance of minor amounts of contamination from the web formation and electret forming processes themselves.

Such contamination may be removed by the method and apparatus of this invention with and without the creation of electrets. Often fiber sizing, lubricants, polymer degradation products, surface active agents and antistatic compounds will be present on filter media and fibers. These are often used to facilitate or occur in the production of fibers, webs, cloths, yarns and films used in the production of filter substrates. These generally have negative effects on filter media and electret filter media formation, life and performance. Contaminants have been discovered to create conditions for the mobility of charge species allowing neutralization of electret properties. Surface active contamination and oil contamination of the substrate during its formation is one notable problem. Incredibly small amounts of contaminants may degrade electret performance.

It is a teaching of this invention to include the step of washing, flushing in general or contaminant removal prior to processing substrate into an electret substrate. It is also a teaching of the invention to include a washing step in the making of other filter substrates.

It is also a teaching of this invention to provide that the additional step of cleaning of the substrate during electret processes. It is a teaching of this invention to include a washing or contaminant removal step in the methods of making an electret employing wetting or nonwetting liquids. Surprisingly, flushing with nonwetting washing liquids removes contaminants.

Figure 6:
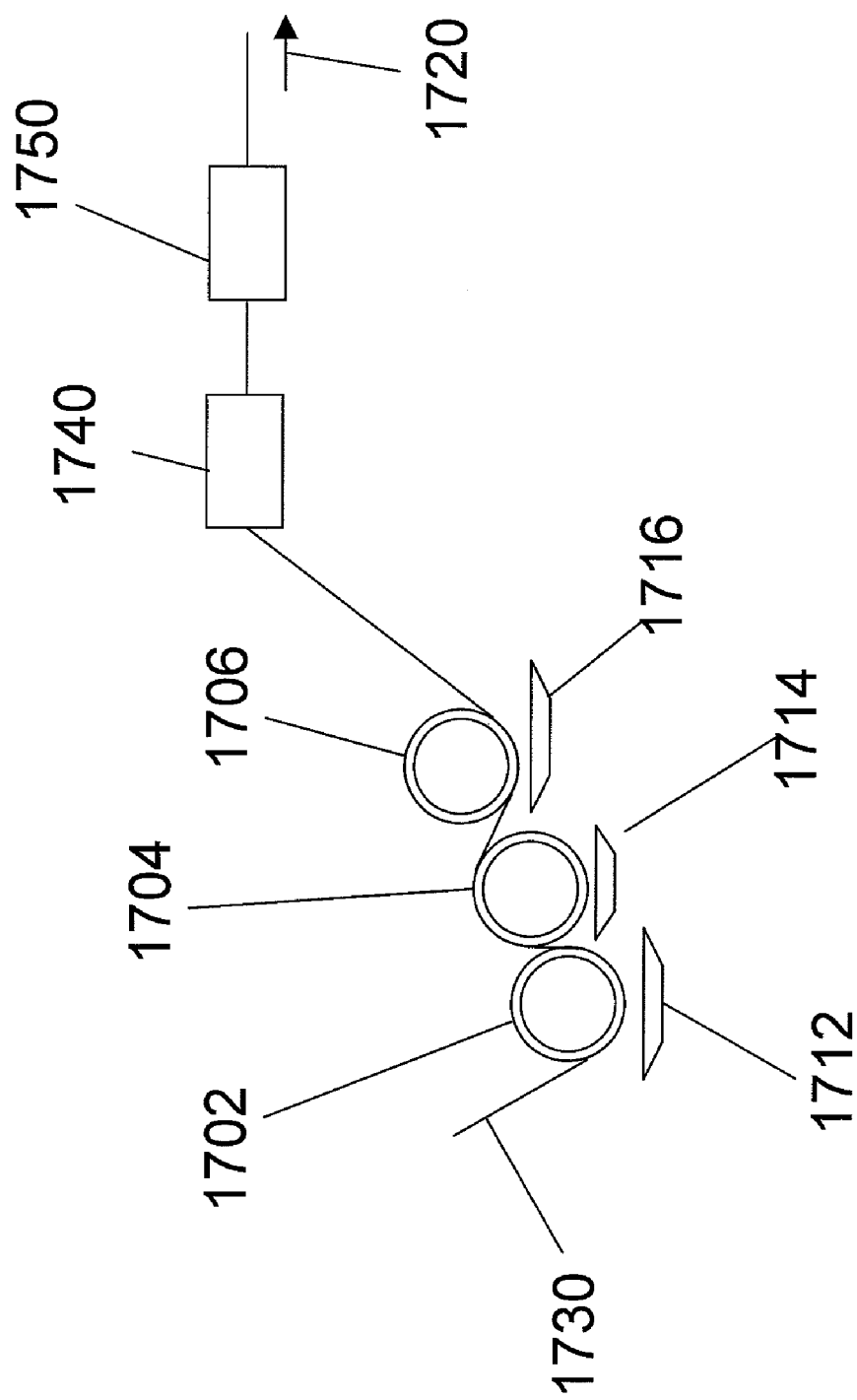
FIG. 6 illustrates another embodiment including a washer element.

The washing step is further illustrated by FIG. 6. Here, melt blown microfiber precursor electret web 1730 is transported around a fluid floatation and treatment devices 1702, 1704, and 1706. The first device 1702 is fed internally by a means not shown with a functional gas that is functional with respect to the washing liquid applied by device 1704. It flushes air from the surfaces of the fibers in the web. From this device, the web then passes around a washing treatment liquid applicator 1704. This applicator is fed internally by a means not shown.

The flushing of air, the functional gas, and the washing liquid combination allows contacting all surfaces of the substrate including the surfaces of pits voids, pores and internal spaces with a washing liquid that does not wet the substrate. Washing liquid is flushed away and replaced by a functional liquid at applicator 1706. In the process, all surfaces of the substrate are contacted by the functional liquid. Using a washing liquid miscible with the functional liquid is preferred.

A washing liquid is chosen that will not wet the web, and that will absorb, dissolve, emulsify, suspend or by any other means, displace or remove surface contaminants from the substrate. The washing liquid will absorb any trapped functional gas. Still further, a washing liquid is chosen that is flushable with a functional liquid.

From the functional liquid flushing step taking place on device 1706, the web passes for further processing to form an electret. Its direction of movement is shown by arrow 1720. From the flushing step at device 1706, the substrate passes to a functional liquid removal device 1740, and then to a drier 1750.

Another alternative is to choose a washing liquid that has all the above mentioned properties except that it wets the web. In this case, the applicator device 1706 flushes the wetting liquid from the web, leaving behind nonwetting functional liquid. This and the other applicators may be of the porous tube type and are fed internally by a means not shown. Liquids flowing from the applicator devices and through and over the web are collected in pans 1712, 1714 and 1716.

The spacing of the applicators 1702, 1704 and 1706 is sufficiently close so as to prevent infiltration of air and reintroduction of air back into the substrate. Of course, many other apparatus geometries and types may be used to accomplish these washing and flushing and contacting steps. Additional processing may also be included for improving the electret making method.

It is also a teaching of this invention to provide a method of cleaning of the substrate during electret processes in combination with one or multiple flushing steps. It has been discovered that contacting the substrate with heated fluids, and contacting the substrate with functional gas in the gas displacement steps described in the various embodiments of this invention, will remove contaminants. Flushing of air from the substrate with heated functional gas alone will remove contaminants. Contaminants and especially oily, surface active, volatile and soluble contaminants may also be cleaned from the media during the functional liquid flushing step and facilitated by use of heated liquids. The removed contaminants must not recontact and redeposit upon the substrate.

While the exact details of the cleaning processes are not known, it is believed that cleaning occurs because the contaminants are volatile, soluble or dispersible in the large volume of treatment fluids, especially heated fluids. The use of hot fluid phases raises the vapor pressure of very low volatility contaminants. This combined with the contacting, flowing and flushing of volumes of functional fluids over and through the substrate, produces a thermodynamic driving force to evaporate, desorb, wash, dissolve, displace and in general, remove contaminants from the substrate or article. Additional unknown removal mechanisms may also play a role. Heat provides energy for phase and state transitions, for surface creation, for desorption, for state changes, and for activations. Use of heated fluids is the preferred mode of operation.

It has been found that if a pure gas free of contaminants is passed over and through a contaminated substrate, the contaminant will move into the gas. A preferring gas is heated. Although the exact details of this cleaning action are not known, it is known that the equilibrium concentration will be directly related to the temperature of the phase. So large volumes of gas processed through the media will strip very low volatility materials from the media in an effort to produce an equilibrium concentration in the gas phase. Vapor pressures increase dramatically with higher temperatures for volatile contaminants.

When the contacting and flushing processes of this invention for making electret substrates are used with fluids at temperatures elevated above the temperature of the substrate entering the process station, contaminants are cleaned from the substrate. FIGS. 1, 2, 3, and 4 illustrate such processes and process apparatus. Those skilled in the art will recognize that fabricated articles may be cleaned and tested in a similar manner as the electret substrate and precursor substrate.

Contaminant removal by the functional gas may be verified by the presence of oily surface films or contaminant layers on the liquid collected by condensing the gas in the apparatus illustrated in FIG. 5 and FIG. 4. Common and harmful contaminants lower the liquid-air interfacial surface tension, especially if the condensed phase has a high surface tension. It is preferred that the functional gas have a high surface tension when condensed. Steam is a preferred functional gas for this purpose. The analytical tests for liquid purity described below may be used to test the condensed gas.

Contaminant removal by the functional liquid may be detectable by measuring the surface tension and comparing it to pure functional liquid. Because of contamination it is not always desirable to recycle the collected liquid without purification. Surface films of contaminants will collect on liquid surfaces such as 308 in FIG. 4 when they are less dense or have lower surface energy than the liquid. For this reason, it is preferred to provide any liquid process tank or reservoir with surface skimming devices or liquid over flow drains. The constant addition of liquid to the tank and the use of a level control overflow drain 313 serve this purpose.

Methods where the process fluids are treated to remove contaminants and where the processing takes place in a manner to prevent the buildup of contaminants originating from the substrate are taught here. Removal of contamination from other sources is also taught.

The presence of oily contaminants on electret media and their potential for removal may be indicated by the following test. Place a sample of triple distilled, pure functional liquid water in a clean glass retort and reflux condenser apparatus that has been thoroughly rinsed with the pure water. Known cleaning processes are employed for the apparatus. Into or onto this water, place a large sample of the media. Vigorously boil the liquid at atmospheric pressure for 1 hour. Cool and decant the surface volume of the water and place it in a clean Langmiur tough apparatus and measure surface tension as a function of surface area. The trough is available from Nima Technology Ltd, University of Warwick Science Park, Coventry, England. Examine the condenser surfaces for contamination.

Perform the same test by adding pure functional liquid only to the retort. Perform the pure liquid test in the cleaned apparatus before and after the web sample test. A comparison of decanted sample surface tensions will indicate the presence of removable liquid surface tension modifying contaminant agents. Contaminants generally will lower the surface tension.

Another test for contamination is to place freshly cleaned, gold test slides in the fluids. The gold surfaces will adsorb organic contaminants. When adsorbed, organic contaminants will change the wetting characteristics. The contact angle of water will change from zero to a positive angle. The presence of absorbed contaminants may also be detected with ellipsometry.

Clean glass surfaces and gold surfaces may be prepared by immersing them in fresh piranha solution for two minutes. Piranha solution consists of 3 parts of 50% hydrogen peroxide and 1 part concentrated sulfuric acid. It oxidizes organic compounds. It is also extremely corrosive to skin. Wear appropriate gloves, face shield, and apron when working with this. Rinse the solution from the surfaces thoroughly with pure water and dry with pure dry nitrogen. Note water will wet these clean surfaces.

Cleaning the substrate or article, combined with air removal or displacement with a functional gas, gas displacement with a functional liquid and liquid removal by drying, creates an electret media with reduced contamination.

Extension of Methods to Sheets, Piece Parts and Fabricated Articles

Those skilled in the art will recognize that the method of this invention may also be carried out with sheets, parts or fabricated articles. Examples of such articles would be filter cartridges, face masks or others that employ electrets to improve functionality. Such piece parts may be treated singularly or in groups. Articles may include fabricated filter elements which are composed of filter media and support and positioning structures. If these additional structures are composed of electret chargeable materials, they can be transformed into electret surfaces and enhance the overall function or utility of the article.

In treating piece parts, they are first subjected to a flow of functional gas to displace air, followed by displacement of the functional gas by functional liquid, followed by mechanical removal and drying of the functional liquid on or in the article. The piece parts process may be carried out continuously by the use of continuous movement apparatus such as carrier chains or belts transporting pieces from one processing position to the next. The piece parts may be treated discontinuously, singularly or in batches by sequentially carrying out the steps of the process. This may be done by placing the part first in one apparatus for one step, then placing the part into additional apparatus for additional steps. This alternatively may be done by adapting an apparatus to sequentially subject the part to the process steps.

The emersion of the piece in a vented vat containing a two phase mixture of pure functional gas and hot functional liquid, followed by removal from the mixture, mechanical removal and drying, or just drying is a simple method of this invention. The two phase mixture may be created by vigorously boiling a functional liquid so that bubbles are visibly present in the liquid. An alternative is to sparge functional gas from a generator directly into the vat. It is preferred that this vat has a vented but confined head space and the piece part enters the vat through the vent opening. The rate of flow of the functional gas is sufficiently high to prevent air from entering the vent. That is the head space above the liquid in the vat will have a pressure higher than the air outside of the vat.

Placing a filter constructed of materials that may be modified into electret materials in a vat, and continuously exposing each small increment of its volume to a flowing or agitated two phase mixture of functional gas and liquid, has the following characteristics. Each volume will be repeatedly exposed to flushing gas followed by flushing liquid. Removing the nonwetting functional liquid from the substrate by mechanical means, followed by drying will create an electret filter. Removing the nonwetting functional liquid from the substrate by drying alone will create an electret filter.

Processing the filter with the functional fluid and providing for the removal of contamination from the media and removal of contamination from the functional fluids is also a teaching of this invention.

The above described vat system may be adapted in many ways to treat continuous webs and piece parts. A rolled up long length of web may be processed as a unit. A stock roll of web is known in the converting industries as a "jumbo". It consists generally of a ribbon of web characterized by a width, a web thickness and a length. The ribbon is wound around a core which is generally a cylinder with one ribbon end next to the core, and the other end terminating at the outer wrap of the jumbo. This stock roll or jumbo generally contains a large amount of web from which many individual pieces may be cut. Processing the jumbo as a piece part has great economic advantage over any process requiring the jumbo to be unwound, processing each unit length of web separately, and then rewound. Even carrying out only part of the process with the web in a wound roll form can be advantageous. An example is the flushing of noncondensible gas with a functional gas and liquid in the jumbo form, followed by unwinding and drying as a stretched out web.

Extension of Methods to Treatment of Free Fibers

In another embodiment of the inventive method and apparatus, an electric charge may be imparted to one or more precursor fibers used in constructing a web or to electret precursor elements. This is carried out by first displacing air from the surface of the free-fiber with a functional gas, then following this by displacing the gas with a functional liquid. This surface treatment of free-fiber takes place as they exit a fiber forming device. The fibers are of a non-conductive polymeric electret precursor material. Functional liquid is deposited upon them, preferably while they are not substantially assembled into a web. The liquid contacted fibers are collected and dried. The resulting fibers are thus electrets as is any web formed from them.

Those skilled in the art will recognize that the methods of this invention may be applied to fibers singly or in collections prior to the formation of articles or intermediate or final substrates. The methods may be applied to granules, particles and other solid forms prior to the formation of articles, substrates or intermediates.

In a refined embodiment of the method of making an electret web, a stream of fibers is formed by extruding the fiber forming material into a high velocity gaseous stream of a functional gas. This process, absent the functional gas of this invention, is commonly referred to as a melt blown fiber process. The apparatus of the type described in Van A Wente, Superfine Thermoplastic Fibers, Industrial Engineering Chemistry, vol. 48, pp. 1342-1346. The gaseous stream typically transports free-fiber away from the fiber extrusion die. The length of the fiber is indeterminate. The free-fibers become randomly entangled at, or immediately in front of, a collector. The fibers typically become so entangled that the web is transportable as a web. The method further requires the displacement of the functional gas with functional liquid and drying the liquid.

The partial displacement with functional liquid also produces functioning electret materials.

This process may be understood in detail by reviewing the method Kubik et al. described in U.S. Pat. No. 4,215,682. Here, the melt blown process and the improvement using an electrical charging apparatus are incorporated here by reference. As shown in this patent, high velocity air streams exit from the fiber die essentially coaxially with the molten polymer. This air flow is key in producing the thin fiber characteristic of melt blown fibrous webs. In the method of this invention the air is replaced by a functional gas of which the most preferred are steam and superheated steam.

In its preferred embodiment for melt blown fibers, super heated steam is used as the processing gas in the melt blown fiber die. Additionally, pure water is deposited onto the fibers while the steam surrounds the fibers. This provides the maximum surface contact of the water to the fiber without the interference of the air. The water deposition step may be carried out in many ways. It may be sprayed; it may be jetted on as cylindrical jets or sheet jets, or the fibers may be directed by the gas onto a stagnant or flowing pond of water or falling curtain of water, or a water flooded collection screen, or a flowing stream of water, or a nip of water covered rolls or belts, or a water wet suction fiber collection device, or a water wetting suction water removal device. The water deposition step may employ a two phase mixture of water and steam. The water contacting step is followed by drying.

The wetting of the fiber forms a more consolidated web than air laid blown fiber.

An alternative fiber production process is the spun bond process in which one or more continuous polymeric free-fibers are extruded onto a collector, see, for example, U.S. Pat. No. 4,340,563. Free-fibers might also be produced using an electrostatic spinning process as described in U.S. Pat. Nos. 4,043,331, 4,069,026, and 4,143,196, or they may be produced by exposing a molten polymeric material to an electrostatic field as in U.S. Pat. No. 4,230,650. During the functional gas contacting step, functional gas surrounds the fibers during their extrusion. After surrounding the fiber with the functional gas, it is contacted with a functional liquid. During the step of contacting with the functional liquid, the free-fibers may be in a liquid or molten state, a mixture of liquid and solid states (semi-molten), or a solid state. Drying functional liquid from the fibers produces an electret.

A fiber may be formed by directly extruding the molten polymer in to a functional liquid without allowing any contact with air. If this is followed by liquid removal and drying, electret fibers will be formed.

Hydrocharging with Electrically Charged Liquid

Another embodiment of this invention is the method and apparatus of hydrocharging using electrostatically charged functional liquids. This liquid is deposited on the substrate which is electrically isolated. The liquid is electrically charged to an elevated potential. The liquid is dried while maintaining the wet substrate electrically isolated from electrical ground and maintaining a conductive path from the charge applying device to the drying zone though low conductivity liquid.

Figure 7:
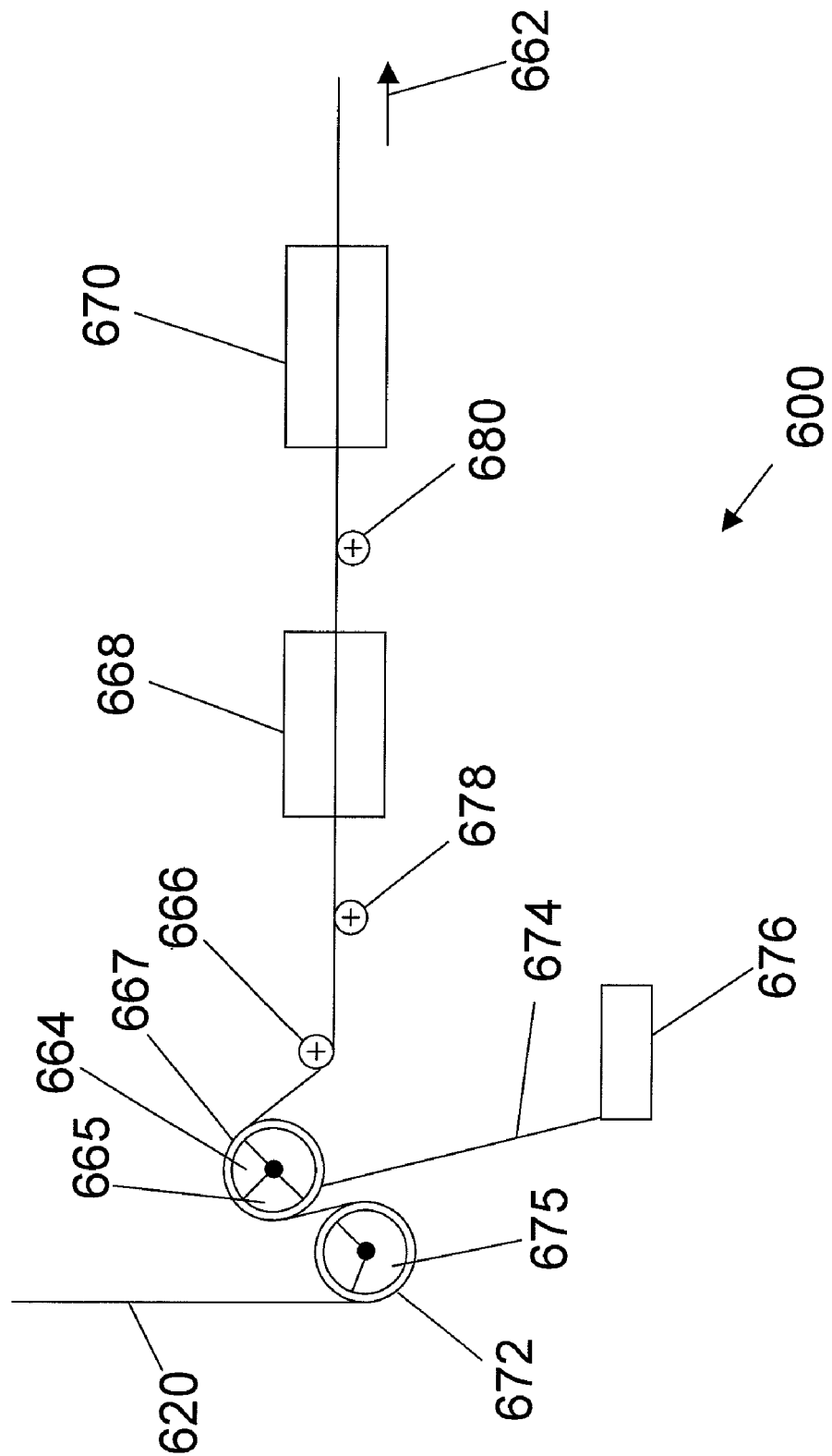
FIG. 7 illustrates an embodiment of an apparatus of hydrocharging using electrostatically charged functional liquids.

Details of this invention are illustrated in FIG. 7. The treatment station 600 processes web 620 whose direction of motion is indicated by arrow 662. The web first passes around cleaning apparatus, porous tube 672. It may have at least some of the internal features of that illustrated by member 230 in FIG. 3. Illustrated in FIG. 7 is chamber 675. Into this chamber, heated gas is introduced to clean the web. Cleaning apparatus chamber 675 is supplied by gas, preferably a functional gas, by a means not shown. The gas may be replaced by a two phase mixture of gas and liquid or a cleaning liquid. The gas exits through the exterior surface and flows through and over the substrate 620. This flow strips contaminants from the web. The flow of the gas flushes air from the substrate. Cleaning tube 672 is constructed in such a manner so that the web and any liquid on the web are electrically isolated from electrical ground.

The web then passes to fluid contacting and charging apparatus 667 which has features similar to device 230 in FIG. 3. Or, some other apparatus may be used for performing the function of flushing air from the substrate with a functional gas. This is followed by replacement of the gas with liquid. The functional gas is functional with respect to the liquid. A preferred liquid is a functional liquid. Examples of preferred fluids are gaseous and liquid dihydrogen oxide. As shown, gas is introduced into chamber 665 and liquid into chamber 664. The fluid contacting and charging apparatus 667 is constructed in such a manner so that the web and any liquid on the web are electrically isolated from ground. Apparatus 667 is also connected by wire 674 to an electrostatic power supply 676. It enables electrical charging of the liquid applied to the web with an elevated electrical voltage. The power supply 676 may be an AC or DC voltage source. Charging may involve alternating the applied charging between on or off, positive or negative charging, or combinations of these. Electrical charge may also be varied in time.

Many liquids have some finite but very small electrical conductivity, or are semiconductors, and the cross sectional area of the mass of the liquid applied to the web is large. The conductive or semiconductive fluid path is maintained between the charge application position and the drying zone. Because the electrically conductive structures of 667 are structurally positioned in contact to the liquid on the web, the liquid covered web will leave apparatus 667 electrically charged by the applied electric potential.

The functional gas-liquid combination flushing process allows covering and treating all substrate surfaces with the liquid. The covering with functional liquid includes pits, voids, pores and all surfaces of internal spaces of the substrate.

From the charging apparatus 667, the web passes over idler rolls 666, 678 and 680. These rolls direct the web to a mechanical liquid removal device 668 and then onto a drying device 670. The mechanical removal device is not required. All apparatus contacting the web must be electrically isolated so as not to bleed off the electrostatic charge applied at substation 667. The electrical isolation requires that all grounded surfaces must not touch the liquid wet web. Additionally, electrically isolation requires that all grounded surfaces must also be separated by electrically insulating material, or sufficiently large air gaps with sufficiently high break down voltages. This prevents electrical spark discharges. Such discharges will dissipate the electrostatic charge applied to the web.

Electrical isolation of high voltages is often difficult in a wet and humid environment. For this reason, redundancy is preferred for electrical isolation means and mountings.

Idler roll 680 is electrical isolate from ground. Its potential may be allowed to float and seek its own voltage level. It is preferred that 680 be maintained at an electrical potential by connecting it to an electrostatic power supply. Drying removal of the liquid will produce charged electret substrate. If the liquid dried from the web in drier 670 is a nonwetting functional liquid, the process of deposition of the liquid onto the web and drying will produce charged web by itself without using electrostatic charging.

At some point in the drying process, the nonwetting liquid will cease to form a continuous coating on the surfaces of the substrate. Charge is then isolated within the drops and no continuous liquid film will be present to allow mobility of charge species. Mechanical removal of the liquid may be employed to assist the drying process.

This process differs in several important ways from airless electrostatic spraying of charged drops of a nonwetting liquid onto the web in air. The drops will initially deposit upon the uncharged web. As they accumulate on the web, charge will accumulate. This charge accumulation will be self limiting. The charge on the web will be identical in sign to the atomized drops approaching it. These like charges will repel additional drops directed at the web. In this case, then only part of the surface of the web will be covered with nonwetting liquid. The presence of air also prevents complete surface coverage with the liquid. The spraying does not force air from the surfaces and void spaces on and in the web, and does not produce complete displacement of air and its replacement with nonwetting liquid.

In the process of FIG. 7, many liquids may be used. Wetting liquids may be used. Pure liquids and functional liquids are preferred. When functional liquids are used hydrocharging also may occur. It will produce electret web even if the active electrostatic supply system powered by voltage source 676 should fail. It will produce electret web even if some apparatus or operational failure electrically shorts out the charged liquid on the web. In this manner, functional electret substrate is produced even when the active charge application from the electrostatic power supply fails. It is preferred that the functional liquid be an aqueous liquid. It is most preferred the liquid be pure water.

Unique electret substrates may be made by contacting a precursor substrate with a functional liquid and drying it to produce an electret when the electrostatic charging process is employed. Alternating the applied charge from on to off, from positive to negative, and any combination of these, can create alternating charge characteristics across the electret. As noted above, when the charge is off, the hydrocharging process produces an electret.

Processing with a wetting liquid and flushing with a functional gas and functional liquid combination allows all surfaces including those in pits, voids, pores and internal volumes of the substrate to be treated with the liquid. Note that even though a liquid wets the substrate, air is commonly trapped on and within the substrate. The flushing process of this invention removes it.

Electrostatic charging of the liquid on the substrate may also be employed at any point prior to drying. The charging may be achieved by direct contact with an electrode or electrodes, or by deposition of charged species directly on the liquid including charged drops, electrons or ions.

Electret Substrates for Filtering Liquid Mists

Electret substrates have within them electrically charged points, areas, or locations. This charge is important for efficient filtration in that it attracts and holds particulates and aerosols contaminating gas streams. The targeting of electret surface properties to various filtration challenges is another teaching of this invention. Also taught is how to use of filtration additives to modify substrate properties to target specific mist or liquid aerosol challenges, and how to choose filtration media to meet a specified mist filtering challenge.

Previous inventors have found through experimentation and trial and error, that using additives in the polymer of the substrate improves mist resistance for dioctyl phthalate (DOP) mists in air at room temperature. Unfortunately, all prior art teaches improving an electret filter's resistance to oily aerosols in terms of filtration characteristics defined by the performance with dioctylphthalate (DOP) mists only, and only in air streams at room temperature and pressure. For example, in U.S. Pat. No. 6,802,315, samples were evaluated using a DOP loading test. The DOP test challenge was on NIOSH standards as codified in 42 C.F.R. sctn. 84 for filter classes where the three levels of filter efficiency are 95%, 99% and 99.97%.

All prior art teaches only how to improve filtration of DOP mists based upon experimental observations of the effects of various constituents in the substrate. While this is certainly useful when filtering DOP mists in air at room temperature, and it might be useful for the problem of filtering mists of identical properties in air, it has little bearing on modifying substrates for other filtration challenges or for picking optimum filter media for use in other circumstances.

The DOP filtration challenge test does not have utility for choosing workable or economically optimized filters for other challenges. Examples are inorganic salt water mists, liquid metal mists, silicone oil mists, fluorocarbon oil mists, synthetic lubricant mists, contaminated motor oil mists, and an almost infinite number of other possible mists generated by nature and industry.

The oily mist and liquid aerosol descriptive terms of the prior art do not define and quantify the true nature of the multitude of filtering challenges that these general terms really include. For example, the terms oily mist or liquid aerosol describe a huge range of liquid materials that may form drops suspended in a gas. Surface tension is but one important property characterizing the wider variability of the mist filtering challenge.

This variability is partially identified by the National Advisory Committee for Aeronautics, Technical Note 2030, "Variation with temperature of surface Tension of Lubrication Oils" by Sydney Ross, February 1950, page 7. It lists "oil" surface tensions ranging from 60.9 to 29.5 dynes per centimeter at room temperature and pressure in air. The surface tension of DOP is 31.1 dynes per centimeter. An electret filter that meets the DOP-air challenge is over designed for the "oil mist" with a surface tension of 60.9 dynes per centimeter.

Furthermore, surface tensions for potential mists vary over a wide range from 2 dynes per centimeter for liquid hydrogen to 1880 dynes per centimeter for molten iron. Surface tensions for common industrial liquids in air at 20 degrees C. in units of dynes per centimeter are perfluoroheptane 11.0, perfluoromethyl cyclohexane 15.7, heptane 19.7, methanol 22.6, toluene 28.4, propylene carbonate 41.1, dimethylsulfoxide 43.5, pure water 72.2, and mercury 476. Various oils have widely varying surface tensions in air: new lubricating oil 35, used lubricating oil 20, Castor oil 35.6, and silicone oil (Power Chemical polydimethylysiloxane PCC silicone oil) 15.9 to 21.5.

Another problem with the DOP-air test performed at one atmosphere pressure is that it is not relevant when the gas is not air. It is not relevant when the gas is uranium hexafluoride, nitrous oxide or Freon®. It is not relevant when the gas pressure is 0.01 atmospheres or 100 atmospheres. Note that the water-carbon dioxide gas interface experiences a change in surface tension of 0.7 dynes per centimeter for every 1 atmosphere pressure increase at room temperature. (See Adamson, Physical Chemistry of Surfaces, Second Edition, Interscience Publishers, New York, 1967, page 61)

The DOP-air test at room temperature is not relevant when the temperature is drastically raised or lowered from room temperature. Surface tension commonly decreases by 0.1 to 0.2 dynes per centimeter for each degree Celsius rise in temperature, and the surface tension approaches zero near the critical temperature. See Adamson, Physical Chemistry of Surfaces, Second Edition, Interscience Publishers, New York, 1967, page 57.

Mists and aerosols of many differing and complex chemical compositions present challenges to gas filtration media. These range from cooking oils, incomplete combustion products, commercial and home product aerosols and a never ending list of industrially generated mists of chemicals, ranging from liquefied gases to liquid metals. Mists and aerosols of many differing and complex chemical mixtures present filtration media challenges in a wide variety of different industrial gas streams. The gases range from organic gases (methane, dichloroethane, Freons®), elemental gases (fluorine, helium, oxygen), inorganic gases (nitrogen dioxide, ammonia, hydrogen disulfide), vaporized inorganics (steam, silicon hydride, hydrogen disulfide), and vaporized compounds (ethanol, carbon disulfide, gasoline, chloroform).

The problems of filtering any mist from any gas have been studied. Careful research and study of liquid drop contamination of filtration substrates has identified a mechanism of charge neutralization by liquid contaminants. Past inventors have not determined the mechanisms creating poor or improved performance. They have only tested filters against the DOP-air challenge.

I have found that efficient electret filtration may be achieved if the filter substrate surface is not covered by liquid. Liquid allows charge mobility which allows canceling or modifying of the effective charges of electret media. The mobility occurs even if the liquid is characterized as a non-conductive. I have found that efficient electret filtration of mists may be achieved if a filter substrate in a gas is chosen, so that it is not wet by the mist contaminant in the gas. Wetting of a solid in a gas by a liquid is controlled by the surface energies of the solid-gas, liquid-gas and liquid-solid interfaces. These vary greater with household and industrial materials.

Improved economics may be achieved if the filtration substrate is selected for a specific mist challenge at the conditions of the filtering process. This includes the temperature, pressure and the material of the mist.

Contaminating drops or mists of water, or aqueous liquids will either wet or spread upon the substrate or collect as discrete drops upon the substrate. When they spread, electret charge is neutralized in the liquid contact areas. When they remain as drops, electret charge neutralization is very limited. Another key factor that correlates with wetting is the contact angle the liquid makes at the three phase contact line on the substrate. As with wetting the contact angle is also effected by the surface energy of the solid-gas surface, the surface tension of the liquid-gas surface, and the surface energy of the liquid covered solid surface. A high contact angle is preferred to prevent poor electret performance.

For any water mist filter challenge, the results of a DOP challenge are not meaningful. Any media that fails the DOP test may or may not fail a water mist test.

Electret performance may be improved by adjusting a combination of surface and gas properties to prevent wetting of the substrate. Generally, this corresponds to adjusting the interface properties to achieve large contact angles. Contact angles greater than forty five degrees are preferred. Contact angles greater than ninety degrees are most preferred. The angle may be increased by lowering the surface energy of the substrate in the gas or increasing of the surface tension of the contaminant mist in the gas.

To understand the detrimental wetting of filter media, it should be noted that wetting is a process that is primarily influenced by the surface energies and thermodynamics of all the phase interfaces present. These may be changed in many subtle and sometimes unexpected ways. Many variables can influence wetting and an exhaustive list is impossible to prepare. Luckily, wetting can be defined by practical tests that are easily preformed to determine if the filter media is preferred for a specific mist challenge.

Preferred wetting tests are described below. All tests are performed at the temperature and pressure at which the filtration process will be carried out. All tests are performed with the actual gas being filtered.

For porous filtration media, a small drop of the mist forming liquid is placed on the media. If it is absorbed into the media this is evidence of wetting. The time scale for absorption will vary depending upon the liquid viscosity since the absorption process requires flow of the liquid. High viscosity liquids have higher resistance to flow and flow more slowly than low viscosity liquids under the same circumstances. Liquids like water, if they wet the media, may be absorbed in the matter of seconds to minutes. Liquids of high viscosity like honey, if they wet the media, may take minutes to hours to be absorbed.

On a solid, nonporous surface wetting may be defined by placing a small drop on the surface and observing its behavior with time. If the area of contact one minute after the depositing step is larger than the area of contact later, then the liquid has spread over and has wet additional surface areas of the substrate. For a given surface material, given physical surface characteristics and thermodynamic state of the material, the spreading is at least dependent upon both the chemical composition and thermodynamic state of the gas phase, solid phase and liquid phase present. Modifying any of these states or conditions or compositions can change whether the liquid spreads on or wets the substrate or does not wet. Changing, among other things, the gas mixture, the gaseous chemical make-up, contaminants on the solid, the gas temperature or the gas pressure can modify the process conditions to the extent that spreading occurs or does not occur.

Those skilled in the art will recognize that many variations of spreading or wetting tests may be used. They may include, but are not limited to measurements on scales from microscopic to macroscopic, naked eye observation and instrument assisted observation, tests of bulk media, or tests of specific surfaces of the media including individual fibers and elements of the media.

Modification of Electret Media to Avoid Wetting by Mist Liquids

It is a teaching of this invention to modify the filtration media by a means to achieve nonwetting. That is the modified filter media is not wet by the liquid of a target mist-gas challenge. Modification may be made in many ways.

One method of making a substrate for filtering a gas containing a liquid mist at a given set of conditions comprises the steps of using a substrate; and, selecting the surface properties of the substrate such that the substrate is not wet by the liquid at the conditions (including temperature and pressure).

It is a preferred teaching of this invention that filtration additives be added to the gas or liquid streams contacting the electret precursor substrate or the solid material of the filter substrate during the electret making process. The purpose of this addition is to modify the wetting characteristics of the electret substrate filter so that it is not wet by the liquid of a target mist-gas challenge. These additives may be dispersed, dissolved or entrained in the fluid as solids, liquids, gases or supercritical fluids. These are present in small amounts preferably below 1 percent by weight in the fluids used for treatment. It is preferred that the additives be solid or non-mobile before the charge implanting step. If hydrocharging is used it is preferred that the additives be solid or non-mobile before final evaporative drying step. If the additive is liquid when applied to the substrate additional process steps which produce solidification are used. These steps may include cooling, curing, absorption, radiation processing, etc. The process of the solidification step will depend upon the individual composition and characteristics of the additive.

It is another teaching of this invention that the surface of the filter media be chemically changed to modify the wetting characteristics of the electret substrate filter so that it is not wet by the liquid of a target mist-gas challenge. Chemical modification may take place by chemical reaction with a solid, liquid, gas or supercritical fluid. The chemical reaction may be activated or forced to proceed by application of electromagnetic radiation, heat, pressure, plasma processes or corona processes or any other means of applying any form of energy. An example would be the plasma fluorination of the substrate surface. Another example would be the reaction and attachment of polyethylene-like materials from reactive gases.

It is another teaching of this invention that the surface of a filter media may be modified by combing the major component material of the filter media with another solid material to form a new material. This new material is a macroscopic or microscopic blend of solid materials that it is not wet by the liquid of a target mist-gas challenge. It is within the scope of this teaching that this combining may include two or more physical solid forms of the same chemical material. Examples would include blown polypropylene microfibers combined with Telfon® powder, polyolefin fiber with Teflon® fibers, and polyester fibers with polyester powders.

The polyester surfaces may be modified by functionalized perfluoroethers. The surface of one or more components of a heterogeneous blend may be modified by an additive such as a polyether modified fluoroalkylsiloxane described in U.S. Pat. No. 5,908,598.

It is another teaching of this invention that the surface of a filter media may be modified by coating it with another substance to form a surface that it is not wet by the liquid of a target mist-gas challenge. Coating of liquids or solids may be used. It is preferred that the liquids be solidified by some means. It is within the scope of this invention that liquids may be volatile and contain nonvolatile compounds. An example of such a liquid would be a solvent in which a silicone polymer is dissolved or dispersed.

Electret Modified with Particles

It is another teaching of this invention to modify the surfaces of a filter media by attaching to or placing on the surface particles, particles of a different material, particles of an additive or particles containing additives as discrete particles or islands of particles or areas of a differing solid material to form a composite electret substrate, or electret precursor substrate.

These particles may be used to modify the surface energy of the original filter media. It is useful to make the surface energies of the composite surfaces non-uniform. It is useful to create a composite which is not wet. It is useful to create a composite which has a modified surface area per unit volume. It is useful to create a composite with surface properties that are heterogeneous where these properties include, but are not limited to, chemical, thermodynamic, electrical, magnetic, radiationally interactive and physical. It is useful to create a composite which has modified filter properties.

FIG. 15 illustrates the utility of the invention. The surface plane of a portion of a base substrate is illustrated by line 1550. On this are deposited particles like particle 1555. The surface region identified by dashed line 1570 is heterogeneous. Liquid droplets like droplet 1560 in the gas above the surface 1550 may be attracted to the surface 1570. When the particle 1555 and its companions are not wet by the liquid of the mist, the composite heterogeneous surface assumes the property of nonwetting.

Mist droplets such as 1565 when deposited upon the composite surface, only contact the particles which they do not wet. They remain droplets and do not spread upon the composite surface. Because of this, the composite surface is not wet by the mist even if the liquid of the mist wets and spreads upon the material of the base substrate 1550.

Particles are useful for modifying the filtration and wetting characteristics of the electret substrate. These particles may be prepared from polymer that contains electret charge stabilizing additives or performance improvement additives. This non-uniformity on a small scale can produce a media which is not wet by the liquid of a target mist-gas challenge.

It is a further teaching to attach or place solid particles on the substrate surfaces to obstruct the advancement of liquids, and to obstruct the movement of three phase contact lines. Additionally, it is a teaching to modify the substrate surface physical or chemical structure to obstruct, prevent or retard the movement of liquid and wetting of the substrate by liquid. Making the surface properties heterogeneous is an effective means of accomplishing this. This is illustrated in FIG. 16.

FIG. 16 is a plane view looking down upon a substrate surface region 1660. On the base substrate are multiple oval regions like that identified as 1680 which have lower surface energy than the base substrate. These have an energy such that they are not wet by the mist liquid. Additionally, the 1680 like regions enclosed areas of base substrate 1675, 1670, and 1665. The base is wet by the liquid of the mist, and this liquid will spread upon its surface. Liquid from the mist is trapped in the areas 1675, 1670, and 1665, and is prevented from further migration by the heterogeneous nature of the composite surface. The nonwetting properties of the 1680 regions trap and curtail unwanted migration of liquid.

Generally, melt process fibrous polymeric electret substrates tend to be smooth surfaced fibers. The creation of substrate surface structure by appending particles may produce or improve nonwetting properties. For nonwetting purposes these locally change the surface energy, surface area per unit mass, surface chemistry and surface roughness. It is believed that all of these pin three phase contact lines and retard their movement and thus, produce useful nonwetting or antimigration properties.

For electret enhancing additive modification of a substrate, the addition of particles increases surface area and structure. A string of spherical particles of a given diameter has more surface area than a fiber of the same diameter and mass.

Irregular shaped particles generally have greater surface area than spherical ones per unit mass. Increased active surface area helps produce improved filtration.

Examples of enhancing additives are described in U.S. Pat. No. 5,645,627. Other examples are the perfluoroalkylacrylate resins of U.S. Pat. No. 5,935,303 and the dibloc wax from Mammut Sports Group, AG of Seon, Switzerland. The particles may contain additive contents ranging from 0.1% to 100%. The particles may be fibrous, acicular, spherical or any other shape.

An advantage of diluting media wetting characteristic modifying additives with polymer, and modifying the substrate with such particles is economic. Additives are often very expensive chemicals.

The polymers used to form the fibers of the web can be selected from among many suitable polymers. Examples of these polymers include polypropylene, polyethylene, polyester, polyamide, polyvinyl chloride, and polymethyl methylacrylate. The fiber diameter of the polymer used to form the polymer fiber web generally is in the range of 1 to 20 micrometers. Depending on the intended application, a more preferred polymer fiber diameter is in the range of 3 to 12 micrometers. Modifying particles may range in size from submicron to tens of microns.

One useful charge stabilizing additive is a fatty acid amide. Examples of preferred fatty acid amides include stearamide and ethylene bis-stearamide. An exemplary stearamide is commercially available as UNIWAX 1750, available from UniChema Chemicals, Inc. of Chicago, Ill. An exemplary ethylene bis-stearamide is commercially available as ACRA-WAX™ which is commercially available from Lonza, Inc. of Fair Lawn, N.J.

Another suitable charge stabilizing additive is a nonionic, oleophobic fluorochemical surfactant. One example of such a compound is a fluorochemical urethane derivative such as a fluorochemical oxazolidinone. Such compounds are described in U.S. Pat. No. 5,025,052, which is hereby incorporated by reference. An example of a suitable fluorochemical oxazolidinone is commercially available as SCOTCH-BAN™ Protector FX-1801 from Minnesota Mining and Manufacturing Company of St. Paul, Minn.

The stearic esters of perfluoroalcohols can also serve as suitable nonionic, oleophobic fluorochemical surfactants that are useful as charge stabilizing additives. Such compounds, which can be fluorochemical intermediates, can have the general structure $R_f CH_2 CH_2 OOCC_{17} H_{26}$ where $R_f$ is $CF_3 [CF_2]_n$ where n is from 3 to 17. An example of such a compound is ZONYL™, commercially available from E.I. du Pont de Nemours & Co., of Wilmington, Del.

Particles are supplied by contacting the substrate with an appropriate medium. Examples are dilute latex formulations, dilute emulsions, dilute suspensions, fluids containing colloidal particles, solids suspended in fluidized beds, fluids containing dusts, solids suspended in gas streams and solids suspended in supercritical fluids.

The process steps of filtering targeted additive particles with an electret media to form a particle enhanced electret media is another teaching of this invention. It is preferred to contact the particle modified media with a liquid and remove liquid with a drying step. It is preferred to recharge the solid particle modified media to form a final electret media. It is most preferred to produce the final media by flushing air from the particle modified media with a functional gas, flush the functional gas with a functional liquid, and then dry the functional liquid from the media.

Substrate Modification by Adsorption of Additives from a Fluid

It has been discovered that the surface of an electret substrate or a precursor substrate may be modified by adsorption of an additive from a fluid to form a new functional substrate. Adsorption is the process of physical or bonding attachment of additive molecules, colloidal particles, aggregations, latex particles, dissolved species, colloidal or dispersed phases from a liquid or fluid onto a solid surface from a dilute concentration.

In the process, the additive species migrates from the bulk fluid and deposits upon the media surface. In the case of particles, surface structure then becomes heterogeneous when observed at a microscopic level where the discrete particle can be observed. In the case of molecules, the modified surface may be homogeneous or heterogeneous.

Various problems with other means of modifying a porous electret substrate of measurable thickness exist. Additives introduced to polymer prior to forming the sheets or fibers must be added to the entire mass of substrate not just the areas forming surfaces. This requires much greater quantities of expensive modifying chemicals adding to the cost. Additionally, these must be stable during melt processing.

Coating functional additives from solutions on the surfaces of the thick porous electret substrates also has problems. Drying occurs from the outer dimensions and concentrates the dissolved additives there. As drying proceeds more and more solution is brought to these outer layers. When the solvent evaporates, it concentrates the dissolved additives there.

Reactive chemical surface treatments are difficult to achieve uniformly throughout the thickness of a porous fabric. If the reaction is activated by radiation, more extensive treatment on the outermost exposed surfaces commonly results. Treatment of the inner surfaces is deficient. The radiation is shielded and often unable to penetrate the inner spaces. Without the teachings of this invention, the preferred modification of all surfaces of the substrate surface, including the surfaces of pits, pores, voids, and internal volumes, is problematical.

In the adsorption from dilute active species in a fluid medium, migration occurs from the bulk fluid to the surface because the additive prefers to adsorb at the fluid-solid interface. Active species move to the solid surfaces from the bulk fluid by a diffusional process, and the flushing of fluid through the substrate insures equal treatment of all surfaces internal and external. When adsorption from a liquid is used, the teaching of this invention may be employed to insure all surfaces of pits, voids, pores, and internal volumes are contacted by the additive containing liquid, rather than being prevented by pockets of trapped gas. In these cases, the contacting occurs even through the process liquid may not wet the substrate.

Preferred additives are those which may be prepared in dilute concentrations in the fluids of these inventive processes. Dilution allows the treatment fluid to penetrate the total thickness of the substrate for treatment of the total mass of the substrate. With surface adsorption, the rate of the process and degree of treatment is generally controlled by the bulk concentration of the adsorbing species in the fluid, and the adsorption driving forces.

Rinsing steps may be employed after the adsorption step to recover excess additive from the surfaces. Rinsing steps may be employed to replace a treatment liquid composition with a liquid without additive prior to drying. The best sequence and selection of processing steps prior to the final drying step will depend upon the use of and the choice of additives. Depending upon the details of the modification materials, two drying steps may be required: a first drying to fix the additive to the surfaces of the substrate and a second to produce hydrocharging. Often, only one is needed.

Figure 17:
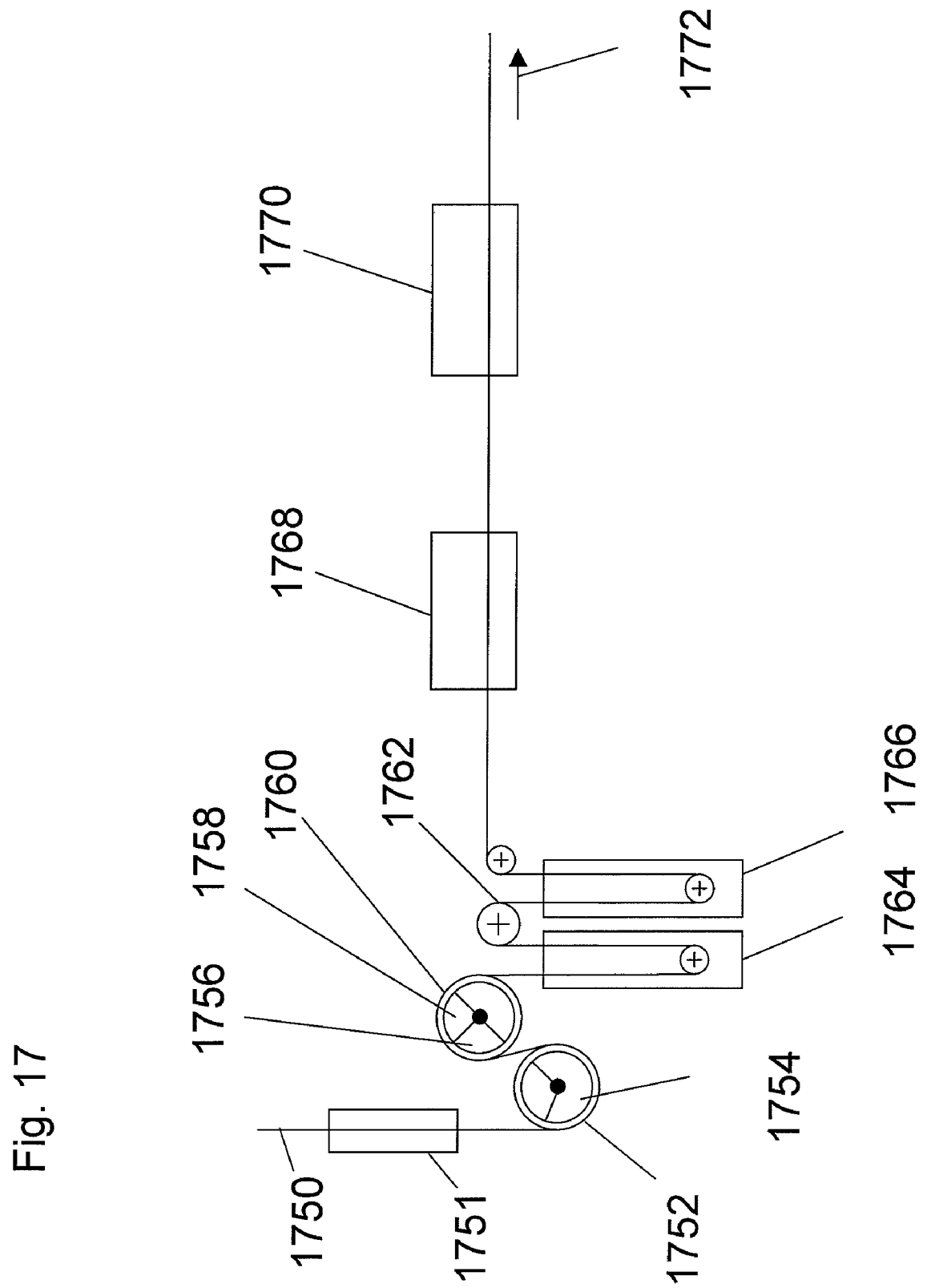
FIG. 17 illustrates absorption modification of a substrate surface.

FIG. 17 illustrates a process using absorptive modification of the substrate surfaces. Porous web 1750 is transported through a web cleaning processor 1751. From there it is brought to a porous tube functional gas contactor. The gas is supplied to internal baffled region 1754 and exits through the porous wall of the contactor. Upon exiting, it flows through the substrate displacing and flushing air from the volume of the substrate. From the gas contactor, the web passes to a functional liquid and gas contactor 1760. A two phase mixture of functional liquid and functional gas is flowed into internal region 1756. This mixture then is directed into contact with and through the substrate. Functional liquid is introduced into internal region 1758 of the contactor 1760 and from there it is directed so as to complete the replacement of gas from the substrate. The web issues from the liquid contacting device saturated with liquid and devoid of substantially all gas pockets. It directly enters absorption treatment tank 1764.

Tank 1764 is filled with liquid containing a dilute concentration of a filtration enhancing additive chosen so that it will adsorb onto the surfaces of the substrate. Preferred is a liquid that is miscible with the liquid applied by device 1760. Most preferred is a liquid identical to that used in 1760. From the absorption tank 1764 the web passes to a rinse tank 1766 of functional liquid.

From the rinse tank 1766 the web passes to a mechanical liquid removal device 1768 and onto a drier 1770 to complete the process of cleaning, surface treatment, and conversion of the substrate to an electret material.

Many suitable filter surface additives are known. The additives may be capable of altering the characteristics of the electret by improving the ability of a polymer substrate treated therewith to maintain a charge after being hydrocharged (i.e., increasing the charge stability of a treated electret relative to an untreated electret), increasing the amount of charge exhibited by a treated substrate after hydrocharging relative to the untreated substrate, change the wetting characteristics of the treated surface, change the performance against mist challenges and combinations thereof to make a enhanced electret filter.

suitable additives include fluorochemical additives including, e.g., fluorinated oxazolidinones, fluorinated piperazines, perfluorinated alkanes and fluorochemical additives disclosed in U.S. Pat. No. 5,411,576. One useful commercially available charge additive is poly[[6-(1,1,3,3,-tetramethylbutyl) amino]-s-triazine-2,4-diyl]][[(2,2,6,6-tetramethyl-4-piperidyl)imino]hexamethylene[(2,2,6,6-tetramethyl-4-piperidyl)imino]], which is available under the trade designation CHIMASSORB 944 from Ciba Spezialitatenchemi AG (Basil, Switzerland). Still other additives include fluoroalkylsiloxanes, fluorinated waxes, alkyl waxes, n-docosane, n-octacosane, n-hexatriacotane, silicone polymers, silicone containing chemicals and UV polymerizable fluids such as an acrylic functional perfluoropolyether as described in U.S. Pat. No. 4,472,480 as compound 11.

Adsorbed additives may be liquids. These liquids are converted to solids by any of the known or previously described methods.

It has been found that the addition of adsorbed particles and additives that have very low surface energies to a filtration substrate will improve the filters constructed from these substrates. Examples include particles which have compositions that include some fluorinated carbons atoms in their molecular structure or materials known under the registered trade marks of Teflon™, Viton™, KelF™, and Florel™. These materials are generally prepared by emulsion polymerization. The intermediate or final emulsions may be used for electret modification.

Articles

Nonwoven webs of this invention may be used in filtering masks that are adapted to cover at least the nose and mouth of a wearer. Generally, a cup-shaped body portion is adapted to fit over the mouth and nose of the wearer. A strap or harness system may be provided to support the mask on the wearer's face. Although a single strap is common, a harness may be employed with more than one strap and may come in a variety of configurations—see, for example, U.S. Pat. No. 4,827,924 to Japuntich et al., U.S. Pat. No. 5,237,986 to Seppalla et al., and U.S. Pat. No. 5,464,010 to Byram.

Examples of other filtering face masks where nonwoven fibrous electret webs may be used include U.S. Pat. No. 4,536,440 to Berg, U.S. Pat. No. 4,807,619 to Dyrud et al., U.S. Pat. No. 4,883,547 to Japuntich, and U.S. Pat. No. 5,374,458 to Burgio. As shown in these patents, the nonwoven fibrous electret web is used as a filter in the cub-shaped mask body. The electret filter media also may be used, for example, in a filter cartridge for a respirator, such as the filter cartridge disclosed in U.S. Pat. No. 5,062,421 to Burns and Reischel.

The applicant believes that the hydrocharging method without the use of applied electric voltages creates both positive and negative charge onto the substrate, such that the positive and negative charge is randomly dispersed throughout the web. Random charge dispersal produces an unpolarized web. Thus, a nonwoven fibrous electret web produced in accordance with this group of teachings of the present invention, may be substantially unpolarized in a plane normal to the plane of the web. "Substantially unpolarized trapped charge" refers to a fibrous electret web that exhibits less than 1 .mu.C/m.sup.2 of detectable discharge current using TSDC analysis, where the denominator is the electrode surface area. This charge configuration can be shown by subjecting the web to thermally-simulated discharge current (TSDC).

Thermally-stimulated discharge analysis is detailed in U.S. Pat. No. 6,824,718 and its references, and they are incorporated here by reference.

Charge Neutralization and Control of Charge on Substrates

The control and elimination of substrate electrostatic charge is another branch of electrostatic substrate processing. It differs from electret making in that here it is desired to remove electrical charge from a substrate, instead of producing charges in a media or on a substrate. The known art of neutralizing charge on a web suffers from its inability to achieve near total neutralization.

For the purposes of the present invention, the following terms used in this application are defined as follows:

"removal of electrical charge from a surface" means the reduction of the force exerted by electrical charge on or in a substrate on any electrically charged object near the surface;

"an electric field" is said to exist in any region of space in which an electric charge would experience an electrical force;

"electric field intensity" means the vector force quantity having the direction of force that would be exerted on a small positive test charge placed at a point, and the magnitude is equal to the force divided by the magnitude of the test charge;

"neutralization of electrical charge on a substrate" means the reduction of the average electrical field intensity at or above the substrate surface;

"web" means a sheet of material having a dimensional width in one direction, and an indeterminate length in the orthogonal direction, and a thickness in a third direction, which is orthogonal to both the width and length;

"treatment fluid" means a fluid that facilitates the transfer of electrical charge to or from the target substrate surface to or from an electrically grounded conductive member.

Figure 8:
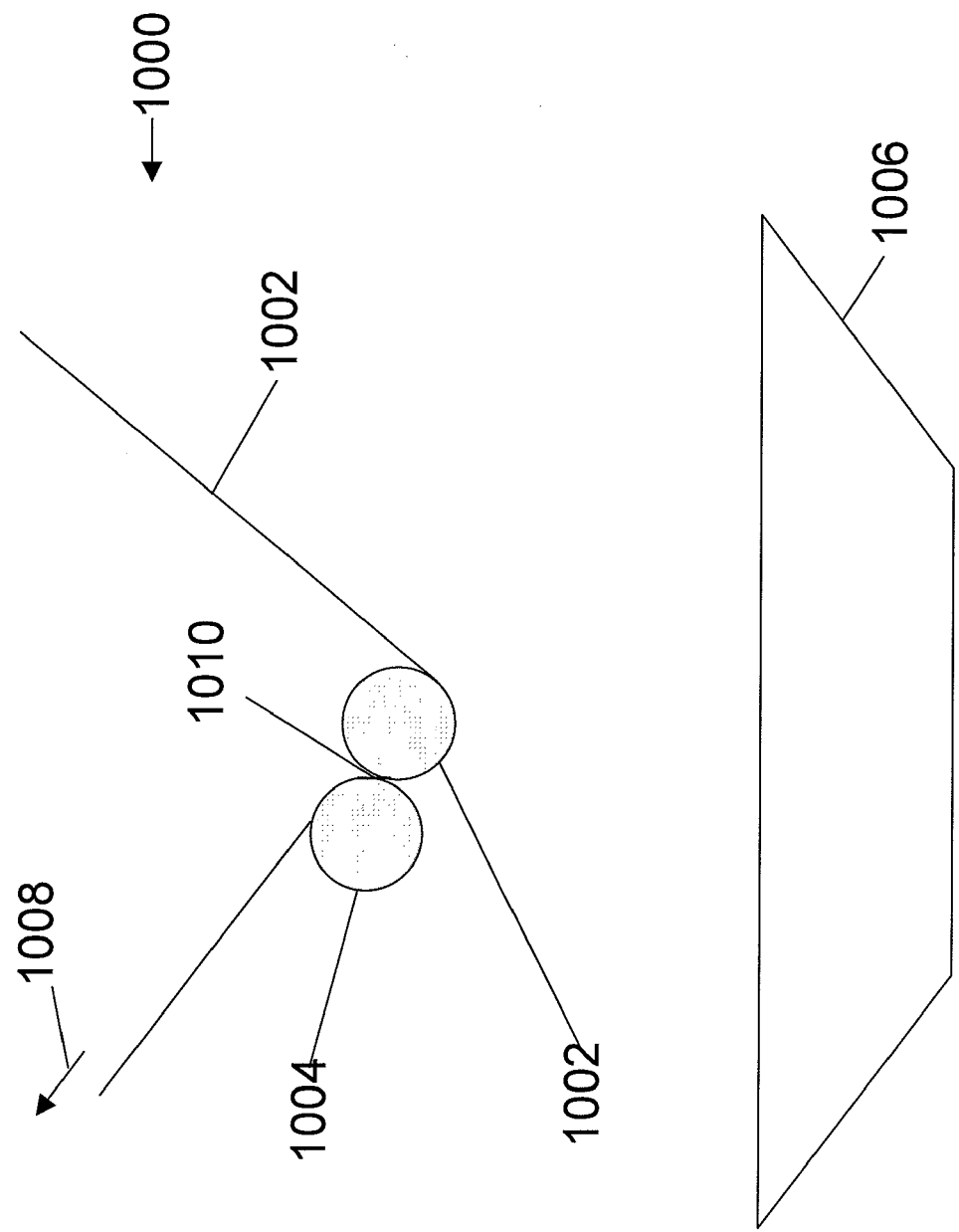
FIG. 8 illustrates a substrate charge neutralization apparatus of the invention.

Charge Neutralization with a Nonwetting Fluid substrate charge neutralization is carried out in the apparatus illustrated in FIG. 8. In this station 1000 the substrate is a film web 1002 moving in the direction indicated by arrow 1008. Devices 1002 and 1004 apply a conductive fluid to the web. A useful fluid is filtered tap water with a minimum of dissolved solids. A useful fluid is one that is at least semiconductive with a conductivity greater than 500 pico-Siemens per meter. It is inexpensive, non-hazardous and readily available. More preferred is water with a minimum of dissolved gases that may form bubbles and a minimum of entrained air bubbles. Small bubbles may attach themselves to flow surfaces and to the substrate and cause disturbances in the flow patterns and distribution of the water. Purity of the water required will be dictated by product or intermediate being processed.

Devices 1004 and 1002 may be any devices that apply a continuous film of water to the side of the substrate 1002 to which it abuts. The devices are constructed so that an electrically conductive path exists from the applicator surface contacting the water to three phase separation lines, where water is rejected from the surface. An electric conductor (not shown) is provided between the contacting applicator surface and an electrical ground.

Figure 9:
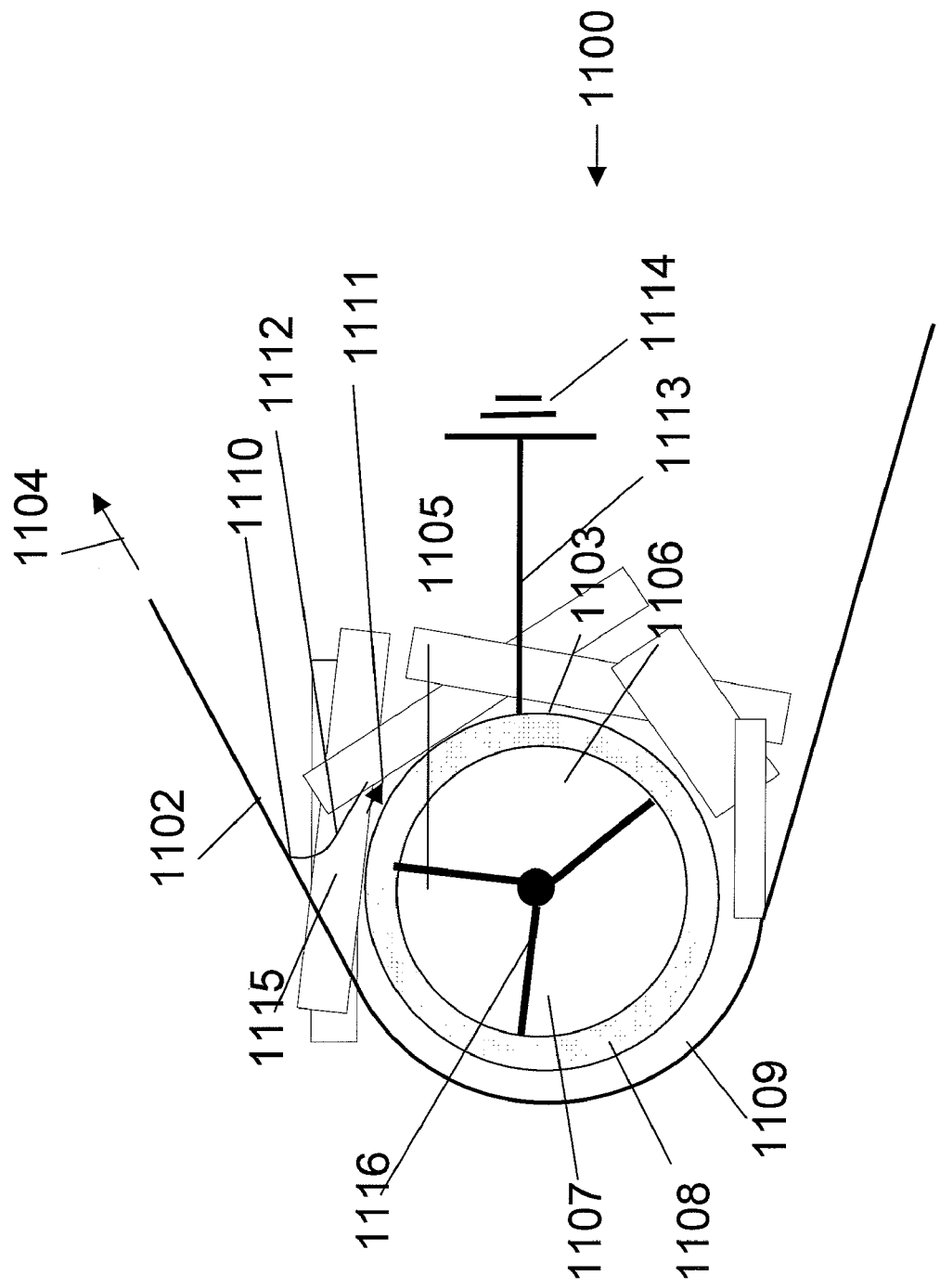
FIG. 9 illustrates another embodiment of the charge neutralization including a single fluid support and dispensing element.

The preferred 1004 device is a fluid support and dispensing element illustrated in FIG. 9.

Referring to FIG. 9, fluid is flowed to chamber 1107 and passes through wall 1108 into the space 1109 between the nonporous web 1102 and member 1103. It is preferred that 1103 be constructed from an electrically conductive material and be grounded. Wire 1113 connects member 1103 to an electrical ground indicated symbolically by 1114. This provides a short and direct path between the surface of 1102 and ground for the efficient movement of charged species. Water is supplied to space 1109 at a rate sufficient to allow web 1102 to pass around member 1103 without excessive friction. A rate sufficient to fully support web off the applicator member and prevent touching is desired.

This rate will depend upon the tension and the speed of movement of web 1102 and the exact geometry and flow distribution of water through applicator wall 11108.

When treating nonwetting webs, water will pond in the gap 1115 between the member 1103 and the web. As additional water is brought to gap 1115, it will flow by gravity down the right hand side of 1103 as indicated by arrow 1111. A dynamic three phase contact line 1110 will be maintained on the surface of web 1102. The surface of the water 1112 is indicated in FIG. 9. At the contact line, water will be rejected from the surface of the web and be retained in the liquid pool in gap 1115. In this way, substantially dry web will leave the top of 1103. At the three phase contact line, surface tension and gravity act to remove the water from the web while the viscosity acts to retard the separation.

since the substrate is moving away from the contact line, the contact angle is a receding contact angle. It is preferred that this angle be as large as possible.

Theoretical analysis of the liquid flow shows an important parameter controlling the separation of the water from the web at low speeds is the Capillary Number defined as the product of the liquid viscosity, times the web speed, times the inverse of the liquid surface tension. Here low speed means speeds at which inertial effects do not dominate the fluid flow. Furthermore, at low speeds, separation will be improved if the Capillary Number is minimized so the dewetting surface tension forces can dominate the process. This is easily done by reducing speed or more preferably, by increasing the treatment fluid temperature. It is found raising the temperature when using water reduces the water viscosity much more rapidly than the surface tension is diminished, thus it produces a net reduction in Capillary Number. Elevating the temperature from 10° C. to 80° C. results in a significant reduction in the Capillary Number without changing web speed. This promotes drainage of water from the web. Free drainage from a contact line proceeds best if the dimensionless Capillary Number is below 0.02. Below 0.002 is most preferred.

The use of heated water is also advantageous in that it increases the mobility of charged species to and from the web surface. The electrical conductivity of pure water is found to increase by a factor greater than 100 over the range of 25 C. to 100 C. Furthermore, heated water enhances the cleaning of and particulate removal from the web surface. It provides heat energy for more rapid removal of absorbed and adsorbed contaminants. The heating can in some instances improve the mobility of charges imbedded within the web so as to improve the ability to neutralize them.

Heated water promotes cleaning of the substrate surfaces. Heated water provides energy for removal of the adsorbed and absorbed contaminants.

Particles attached to the surface have a high probability of trapping drops of liquid on the surface when they leave the contact line. These should be avoided. It is a teaching of this invention to clean contaminant particles from the substrate surface prior to or during the process of charge removal.

With the geometry of FIG. 9, water is brought into intimate contact with both a grounded member 1103 and the charge on the web 1102. This allows positive and negative species to be exchanged between the web and the water, and the water and ground. In this manner, charges on the web surface facing member 1103 may interact with the water and be neutralized. It is believed that negative charge is drained from the web surface by removal of electrons to the ground and positive charges are neutralized by the flow of electrons from the ground. Charges within the web and on the opposite side are counterbalanced by charged species attracted to the wet side of the web. These come from the water creating a net balance of zero when sensed from a distance. However, on the scale of the dimensions of the web thickness, an electric field still exists at the surface of the web. For this reason, it is preferred to simultaneously treat both sides of the web with devices providing contact with water where the water contacts a grounded surface.

Tap water rather than pure triple distilled water is preferred. However, for some applications a high dissolved mineral content with some water supplies will not be desirable. It is to be noted that even distilled and deionized water are conductive enough to function in this inventive charge removal process. Other preferred fluids are polar fluids with a specific gravity greater than 0.5. More preferred are these types of polar fluids that do form a three phase contact line when dewetting from the target substrate. Still other preferred fluids are those with a specific gravity greater than 0.5 and are at least semiconductive with an electrical conductivity of greater than 500 pico-Siemens per meter.

Advantage in operation may be obtained by segmenting the fluid flow into two or more regions. FIG. 9 shows three internal chambers 1107, 1105 and 1106 within member 1103. These are formed by internal partition 1116. Fluid may be flowed at different rates into each. Different fluid compositions may be flowed into each chamber. The liquid which first contacts the web 1102 is that which flows from chamber 1107, and the initial separation gap 1109 is set by the flow from 1107. The initial primary contacting fluid maintains contact with the web until it approaches the separation line 1110. An additional secondary fluid added by chamber 1105 is introduced between the initial fluid and the wall 1108. The initial contacting fluid may have a composition or purity that differs from the secondary fluid. It is preferred that the primary fluid have a higher purity than the secondary.

A preferred method of neutralizing and removing charge from a web at low Capillary Number conditions is illustrated in FIG. 8. Here, devices 1004 and 1002 are arranged in close proximity to each other. The web 1002 passes between them in region 1010 where water is provided on both sides of it. Preferably, there exists at least one plane where water contacts simultaneously both sides of the web and where that extends across the web and is perpendicular to the web surface. It is preferred that both devices 1002 and 1004 be of the type of water dispensing devices described above and illustrated in FIG. 9.

Water flowing from the station 1000 will be caught in pan 1006 and may be recycled. The viscous shear flow of liquid between the applicators and the web washes the surface. Stresses are exerted upon any particulates on the surfaces. Adsorb contaminant molecules diffuse into the liquid thus cleaning the substrate. Since the washing action of the applicators removes contaminants, purification and filtering is preferred before reuse in this process.

When the water does not wet the web, the dewetting of the web at the three phase contact line provides removal of the water without an evaporative drying step.

In air charged contaminating particles on the surface of a web are held tenaciously by the attractive electrostatic forces at their contact points. By surrounding them with conductive water these charges are neutralized and the particles are more easily removed. The liquid flow shear stress existing in gap 1109 will act to dislodge such particles. Once entrained in the water, they will tend to be rejected with the water from the film surface at the contact line 1110.

Figure 10:
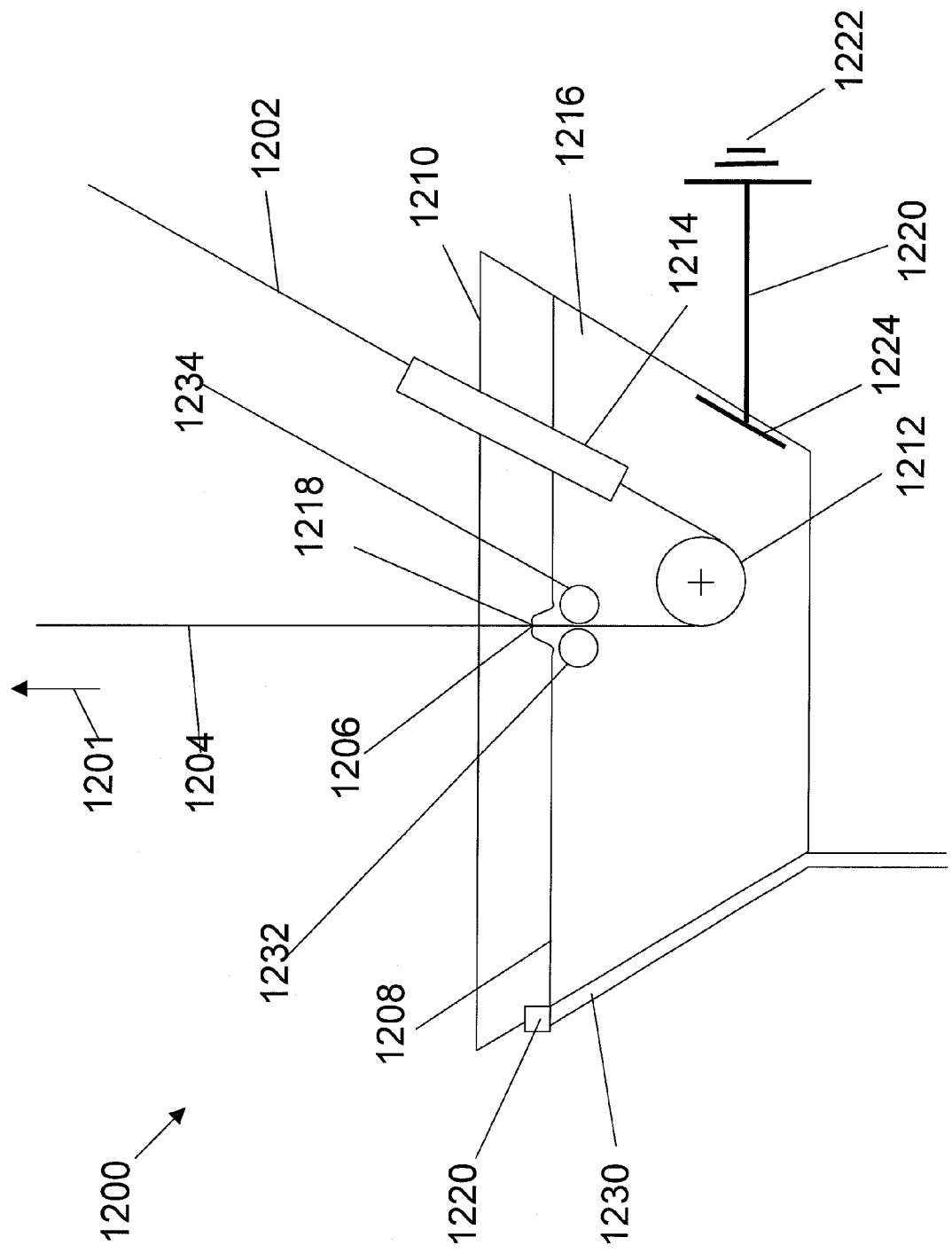
FIG. 10 illustrates a further embodiment of the charge neutralization apparatus including a dip treatment station.

Other devices may be used to contact the substrate with water. These include, but are not limited to roll applicators, slot die applicators, curtain coaters, and jet coating applicators. The simple dip contacting device of FIG. 10 is an embodiment of this invention. Traditional dip coating is described in Schunk, Hurd and Brinker in Chapter 13 of Liquid Film Coating, ISBN 0412064812, editors Kistler and Schweizer, published by Chapman and Hall. In traditional dip coating the liquid wets the substrate. The liquid need not be electrically conductive and is often an organic solution. Grounding of the liquid is not required. The method of this invention provides liquid free web leaving the applicator device. This is not like coating where the purpose is to provide a liquid covering on the web leaving the device.

FIG. 10 is a cross sectional view of a dip treatment station 1200 of this method. Web 1202 which is not wet by the treatment fluid 1216 is directed into a vessel 1210. It enters the fluid surface 1208 through a disturbance suppression baffle 1214. This baffle surrounds the web on its sides and is open ended to allow free passage of the web and the fluid. Web leaves the station 1200 in a vertical direction indicated by arrow 1201.

The baffle prevents disturbances and entrained air bubbles created by the entrance of the web into the fluid from disturbing the two three phase contact lines 1206 and 1218. The web, after entering the fluid, is redirected by roller 1212 to pass vertically out of the free surface 1208 of the fluid 1216. The web locally distorts the free surface 1208 as it exits the liquid pool. Three phase contact lines 1206 and 1218 are formed as the nonwetting fluid is rejected by the web. Electrically conductive plate 1224 submerged in the fluid 1216, is connect by an electrical conductor 1220 to an electrical ground 1222. The grounded fluid allows charge carrying species to pass to and from the web surface so that the surface of the web is discharged, and embedded charged species within the web are neutralized.

It is also a teaching to flush air from the surfaces of substrates with a gas that is highly absorbable by the treatment liquid. The methods are described in the electret processing teaching of this application. This allows a substrate that is not wet by water or treatment fluid to be completely covered with all surfaces treated by the water without air or gas remaining attached to the surfaces or within the media.

It is preferred that a means also be used to periodically or continuously provide clean water to the tank 1210. It is preferred that this liquid is provided in the vicinity of the substrate exiting from the vessel through porous conductive tubes 1232 and 1234. Water is pumped to these by a means not shown. These tubes are also electrically grounded. When water is supplied it will overflow through opening 1220 and exit down drain 1230. This overflow removes contaminates collected on the surface of the water along with those in the bulk. All the bulk and surface water is thus replaced in time.

While FIG. 10 shows a device for the treatment of web, the device may be used to treat individual sheets of substrate when the roll and baffle are removed, and replaced by sheet handling means to submerge the sheet in the fluid and withdraw it from the fluid. Examples of sheets that may be treated are plastic film sheets, glass plates, semiconductor wafers, and metal plates. One skilled in the art will recognize that this treatment method is also useful for treatment of items other than sheets, such as blocks of a cylindrical shape, tubular shape, rectangular shape, and any shape that allows the formation of a fluid rejecting three phase contact line and the rejection of fluid from its surface, or a portion of its surface by a three phase contact line.

Figure 11:
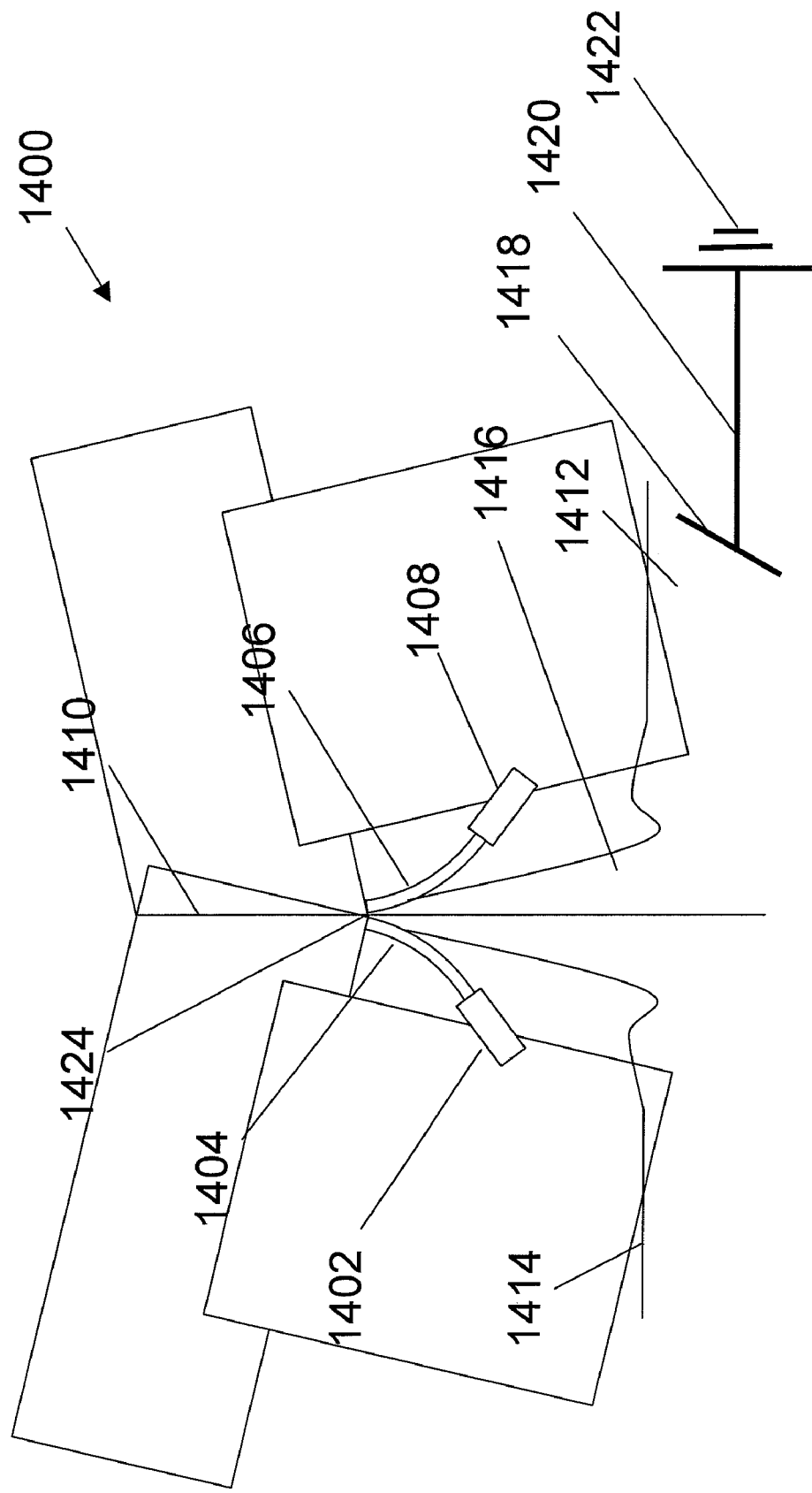
FIG. 11 illustrates an alternative embodiment of the apparatus for removal of treatment liquid from the surface of the web.

FIG. 11 illustrates another method of removal of treatment liquid from the surface of the web. The free drainage of liquid is replaced with a wiping apparatus 1400. Rubber wiping blades 1404 and 1406 are mounted in fixtures 1402 and 1408. These are manipulated so as to bring the edges of the wiping blades to bear against the surface of the web 1410 on opposite sides of the web at liquid removal point 1424. It is preferred that the blades contact the web directly opposite each other. The working contact pressure must be determined by trial as it will depend upon web speed and surface along with treatment liquid properties.

The action of the blades blocks the upwards movement of the electrically grounded treatment liquid 1412. They cause the liquid to form a continuous flowing cascade 1416 back into the surface 1414 of the ponded liquid 1412. By this means, a continuous liquid path is maintained between the removal point 1424 to the electrical grounded electrode 1418. Electrode 1418 is connected by wire 1420 to an electrical ground 1422. Surprisingly, the removal of the liquid by the wiping blades by a rubbing wiping contact does not itself produce static charge on the web. The high shear of the rubbing contact is also efficacious in removing particulate surface contaminants.

Urethane rubber squeegee material is preferred for the rubber wiping blades 1404 and 1406. These are known in the printing industry and widely available from such suppliers as UV Process Supply, Inc. of Chicago, Ill., USA.

Figure 12:
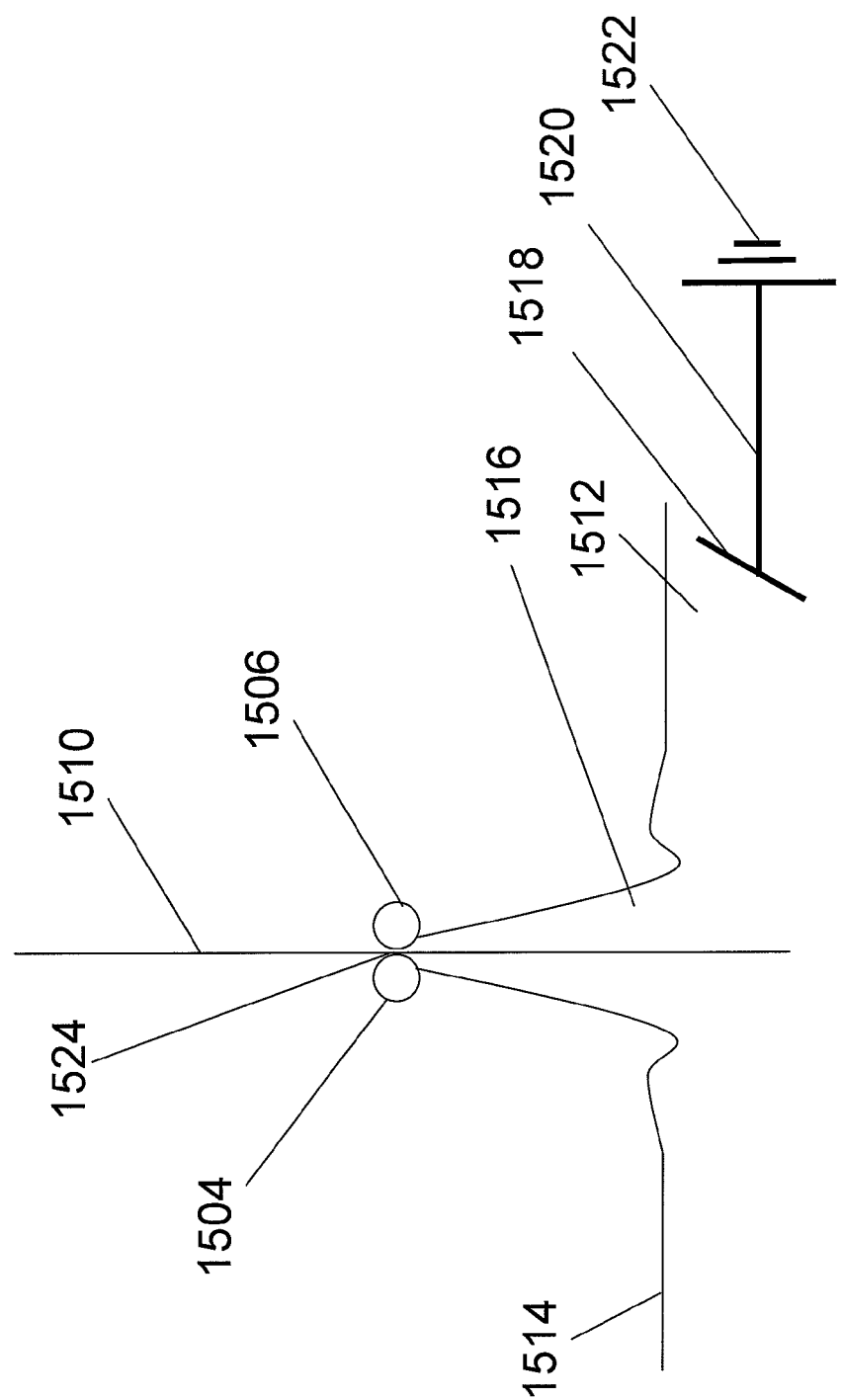
FIG. 12 illustrates another embodiment of the apparatus including opposing air doctors to effect the removal of a treatment liquid.

Apposing air doctors may be used as illustrated in FIG. 12 to remove the treatment liquid. Air doctors 1504 and 1506 are positioned on opposite sides of the web 1510. These doctors are porous metal tubes into which high pressure air is injected by a means not shown. They are positioned across the width of the web with a small gap 1524 maintained between them. Gaps of 0.2 to 2 millimeters greater than the web thickness are preferred. Air issues from the porous wall of the tubes around their circumference. In the constricted space of the small gap 1524 the air flow from the air doctors creates a high pressure zone. This pressure and the air flow from this zone sweeps the liquid 1512 from the surfaces of the web 1510. This action blocks the upwards movement of the electrically grounded treatment liquid 1512 when the web moves past them. A continuous flowing cascade 1516 of liquid back into the surface 1514 of the ponded liquid is formed. By this means a continuous liquid path between the removal point in gap 1524 and the electrical electrode 1518 is maintained. Electrode 1518 is connected by wire 1520 to an electrical ground 1522.

Those skilled in the art will also recognize that other air nozzle devices may also be used to sweep the treatment liquid from the web. Nozzles designed according to the teachings of U.S. Pat. No. 2,135,406 are useable.

It is also within the scope of this invention to perform other functions within the treatment fluid within the treatment station. These include but are not limited to cleaning, heating, chemical adsorption, sonic or ultrasonic treatment, or irradiation with electromagnetic radiation. Those skilled in the art will recognize that tank 1210 of FIG. 10 may be partitioned to perform one or more of these functions. These additional functions may also be performed in a separate apparatus prior to entering the neutralization process.

FIG. 1 of U.S. Pat. No. 4,363,070 illustrates a great failing of known technology. The charge removal bristles of its teaching contact the web 10 (of this FIG. 1) as it is supported on a contacting roller 16 (of this FIG. 1). As the web translates around this roller and leaves it, triboelectric charging takes place creating a new charge on the web. The recharging of the web is further exacerbated by the additional contacting of the other side of the web by roller 18. FIG. 1 of U.S. Pat. No. 4,831,488 also illustrates the same failing. The "removal" device rolls generate static charge on the web by the action of separating the web from their surfaces. Whitmore in U.S. Pat. No. 3,671,806 teaches the same failing in his FIG. 1. Grarovsky in U.S. Pat. No. 5,394,293 illustrates the same failing in his FIG. 2. Carter, et al. in U.S. Pat. No. 5,041,941 illustrates the same failing in their FIG. 1. Chapman in U.S. Pat. No. 878,273 illustrates the same failing in his drawing.

Alternatively, sacrificial areas on the substrate may be provided for physical touching while other critical areas are not touched. Web may be transported by touching only the edges. This known technology includes web edged with sprocket holes and sprocket gear drive systems. An example is the transport of 35 millimeter photo film through processors.

Another inventive teaching of this application is to transport the substrate from the static removal station without contacting the surface with a solid object. Directional displacement, web transport and handling are accomplished with fluid flotation devices. Useful fluids have a density less than 0.5 grams per centiliter at 0 degrees Celsius and 1 atmosphere pressure. Other useful fluids include a polar fluid, an aqueous fluid or a conductive fluid with a specific gravity greater than 0.5, when used in conjunction with a ground. Contacting a web with a fluid of a specific gravity greater than 0.5 may cause static charging when the fluid is nonconductive. Additionally, the creation of drops of liquid on the web surface, followed by the removal of the drops will leave behind electrical charges on the web. Therefore, any contacting device using fluids of a specific gravity greater than 0.5 is preferred if it is operated as a charge removal device as describe previously.

The physical touching of the substrate is nearly unavoidable when manufacturing articles. However, there are often very critical intermediate steps that require very low or near zero surface charge for their execution. The method and apparatus of this invention allow the accomplishment of crucial manufacturing steps with neutralized substrate surfaces.

Those skilled in the art of treatment will recognize that fluids other than water may be used for this treatment. These will be characterized by forming a three phase contact line and having a preferred electrical conductivity equal to or greater than distilled water. Additionally, polar fluids or fluids that will absorb water from the atmosphere may be used if the conductance at the three phase contact line is greater than 10000 pico-Siemens per meter and more preferably greater than 1 micro-Siemens per meter.

Charge Neutralization with a Wetting Fluid

Figure 13:
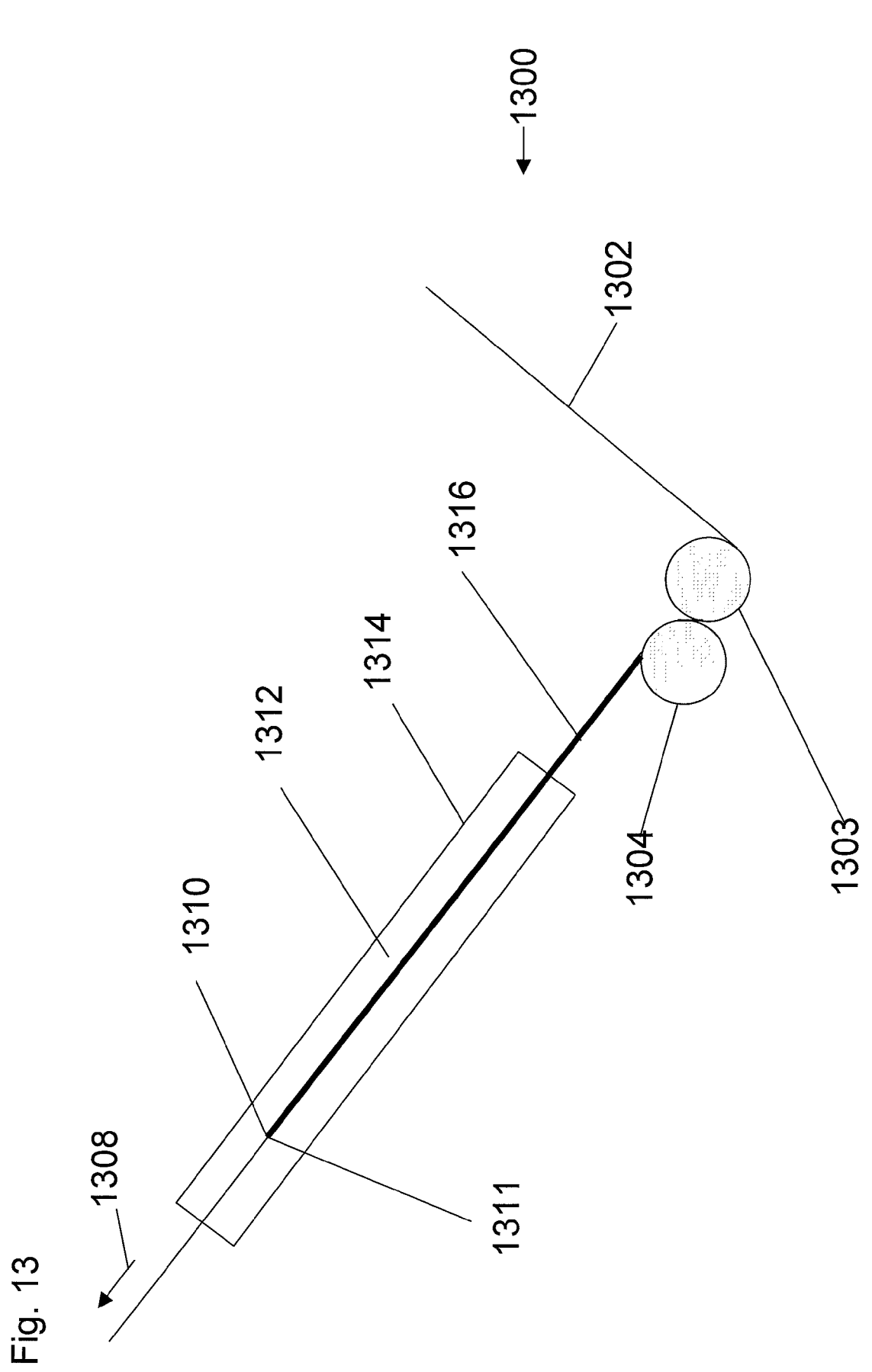
FIG. 13 illustrates yet another embodiment of the apparatus including a drying station.

The method previously described must be modified if the treatment liquid wets the substrate, is absorbed by the substrate, or is entrained by the substrate. Here, removal of the substrate from a liquid surface or separation from a liquid application device will carry with it entrained liquid. No three phase contact line will form. FIG. 13 illustrates a station 1300 for removing electrical charge from a web which is wetted by the treatment liquid. Applicators 1304 and 1303 are liquid applicators that apply conductive liquid to both sides of the web 1302. The liquid in or on these devices 1303 and 1304 is electrically connected to an electrical ground by means not shown. Additionally, the treatment liquid is required to be volatile. Volatile means that a phase change from liquid to gas can be forced to occur in the drying region indicated by dashed line 1314.

Many different types of applicators may be used. The direction of movement of the web is indicated by arrow 1308. A portion of the liquid applied to the web is retained as a liquid film coating, indicated by heavy line 1316, and is carried away from the applicators 1304 and 1303. The web and coating on it proceeds to a drying step which takes place in region 1314. Here, the liquid is evaporated by a means not shown. In order to produce neutralization of the web surfaces leaving station 1300, drying lines 1310 and 1311 are maintained on their respective sides of web 1302. The drying line is where the volatile mass of liquid on the surface is exhausted. From near this point back to the liquid applicator and to the liquid electrical grounding means, a conductive fluid path is provided. This allows exchange of charged species with the web until the final molecular layers of liquid are removed.

It is has been found that the evaporation of water from a dielectric web may leave behind surface charge. It is most intense when many small drops of nonwetting liquid are evaporated. When a wetting and conductive liquid forms a continuous liquid film and is evaporated, the charging is zero or near zero. When small drops of a nonwetting liquid are evaporated, charging of the web may occur although it is not always detectable with conventional static meters. Since positive and negatively charge areas may be created and interspersed, the net charge sensed by a field meter one inch distant from the surface is zero or near zero.

It is preferred that the volatile liquid not change from wetting to nonwetting during drying. This could occur when the volatile material absorbs a second volatile from the gas in the drier.

static charge removal treatment with a wetting fluid is achieved in the following manner. First, if the web is nonporous, applicators 1304 and 1303 are used to apply equal coatings of the treatment fluid to both sides of the web. These coatings are uniform across the width and length of the substrate. Uniformity is preferred in drying. Drying in region 1314 is best carried out so as to produce a single curvilinear drying line on each side of the substrate. This gives a continuous electrical connection of the wetted surface from the drying lines to electrical ground. Straight drying lines are most preferred.

It is undesirable to create surface areas on the substrate wetted by liquid that are not connected by liquid to ground. Such areas are likely to contain unbalanced electrical charge. This will be left behind when this area is dried.

Pure wetting treatment liquids are preferred. It is found that most preferred of these are liquids that have surface tensions that decrease with increasing temperature at the conditions of drying.

It is preferred to shield the drying substrate with conductive and grounded electrodes during the drying process to avoid inductive charging during drying.

If the wetting liquid is a mixture of chemical species, the more volatile species when incrementally removed should leave behind a mixture that is lower in surface tension.

If the web is porous and is wet by the treatment fluid, then it is preferred to apply a uniform fluid coating to one side of the substrate.

The wiping and sweeping devices of FIGS. 11 and 12 may be used with both wetting and nonwetting liquids. In the case of wetting liquids, these devices act as coating devices that apply thin coatings to the web with minimized drying requirements. Other methods of applying thin coatings of conductive, wetting liquids are also useful for static charge elimination.

Figure 14:
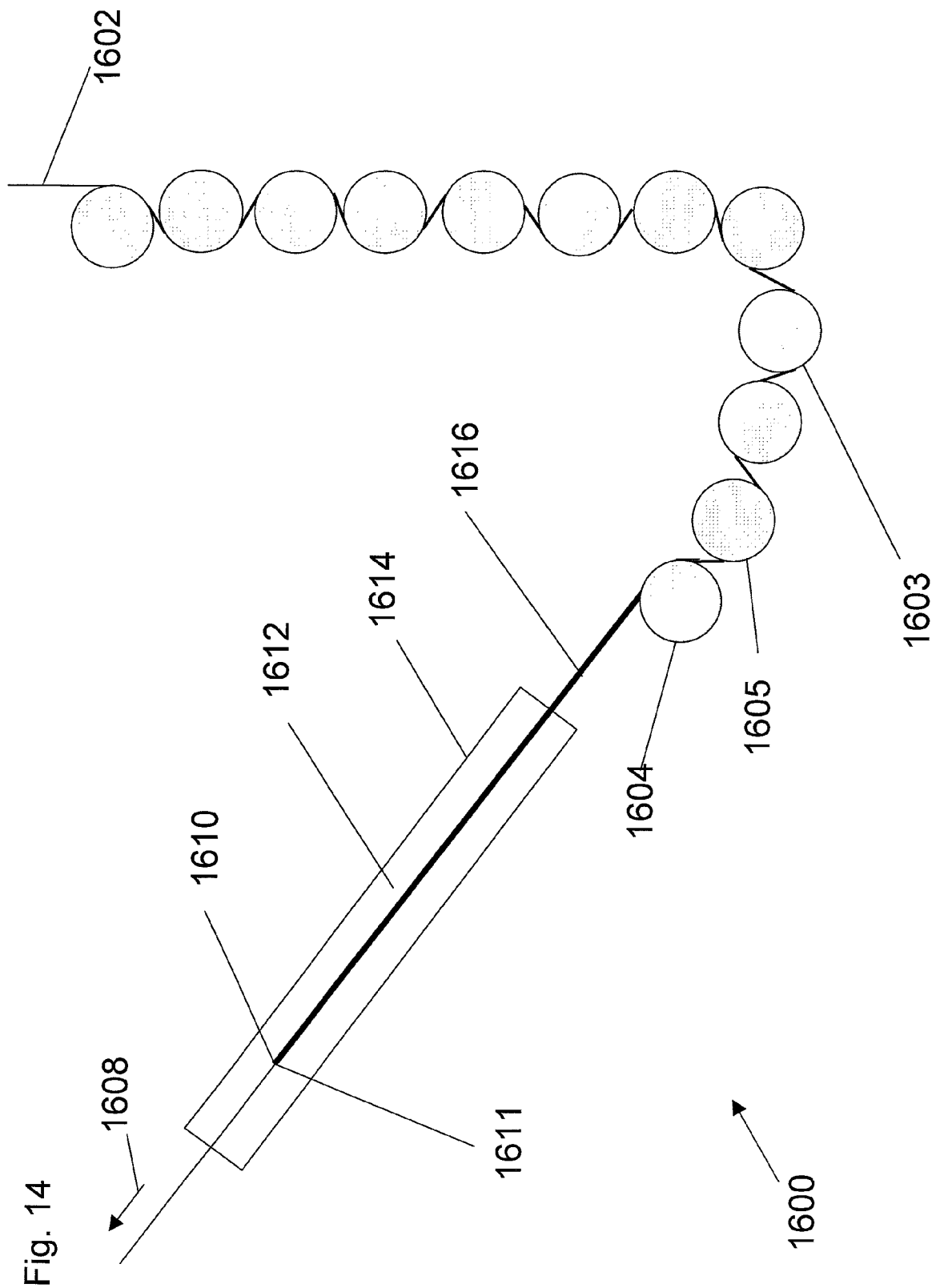
FIG. 14 illustrates another embodiment of the apparatus for applying wetting liquid to both sides of a film web while maintaining an electrical path from a drying line to a ground.
Figure 15:
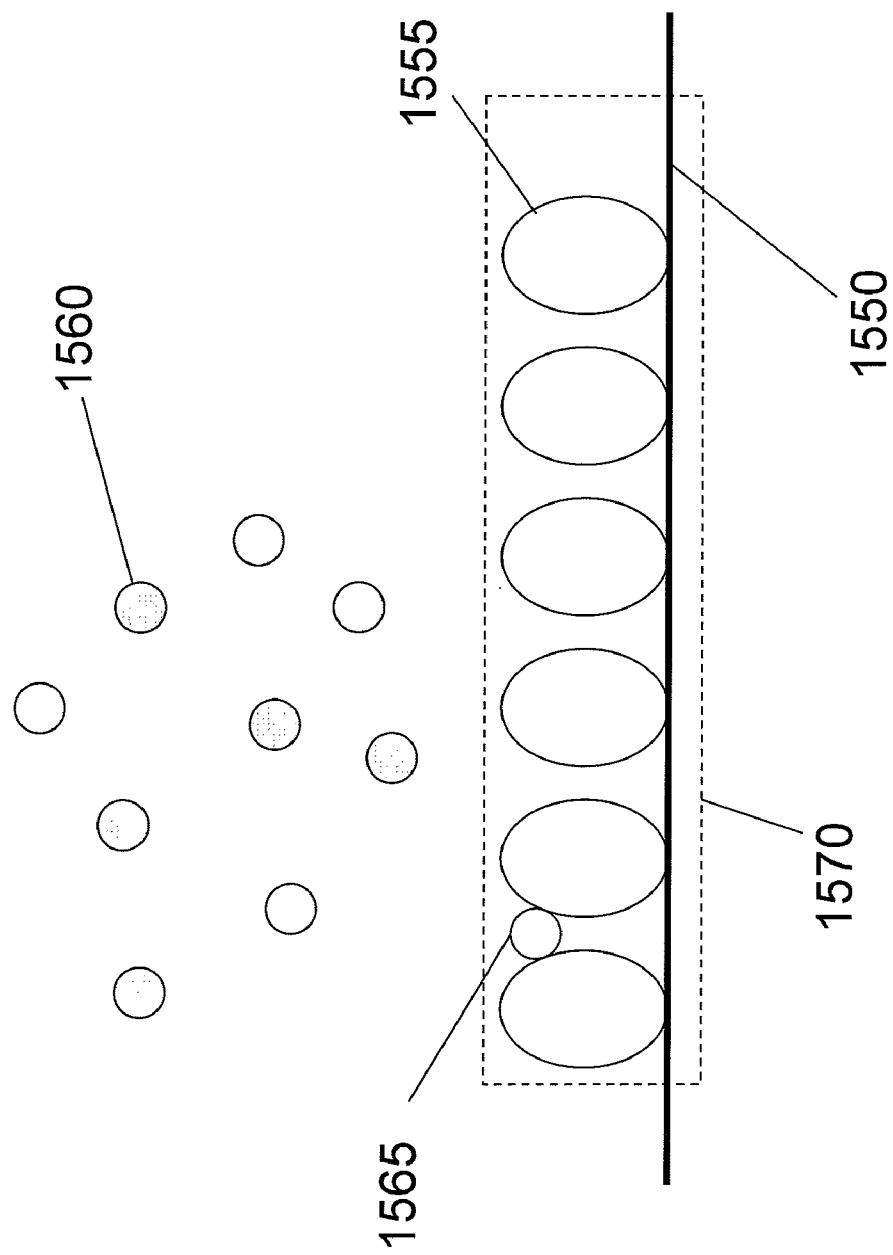
FIG. 15 illustrates the surface plane of a portion of a base substrate with deposited particles and droplets.
Figure 16:
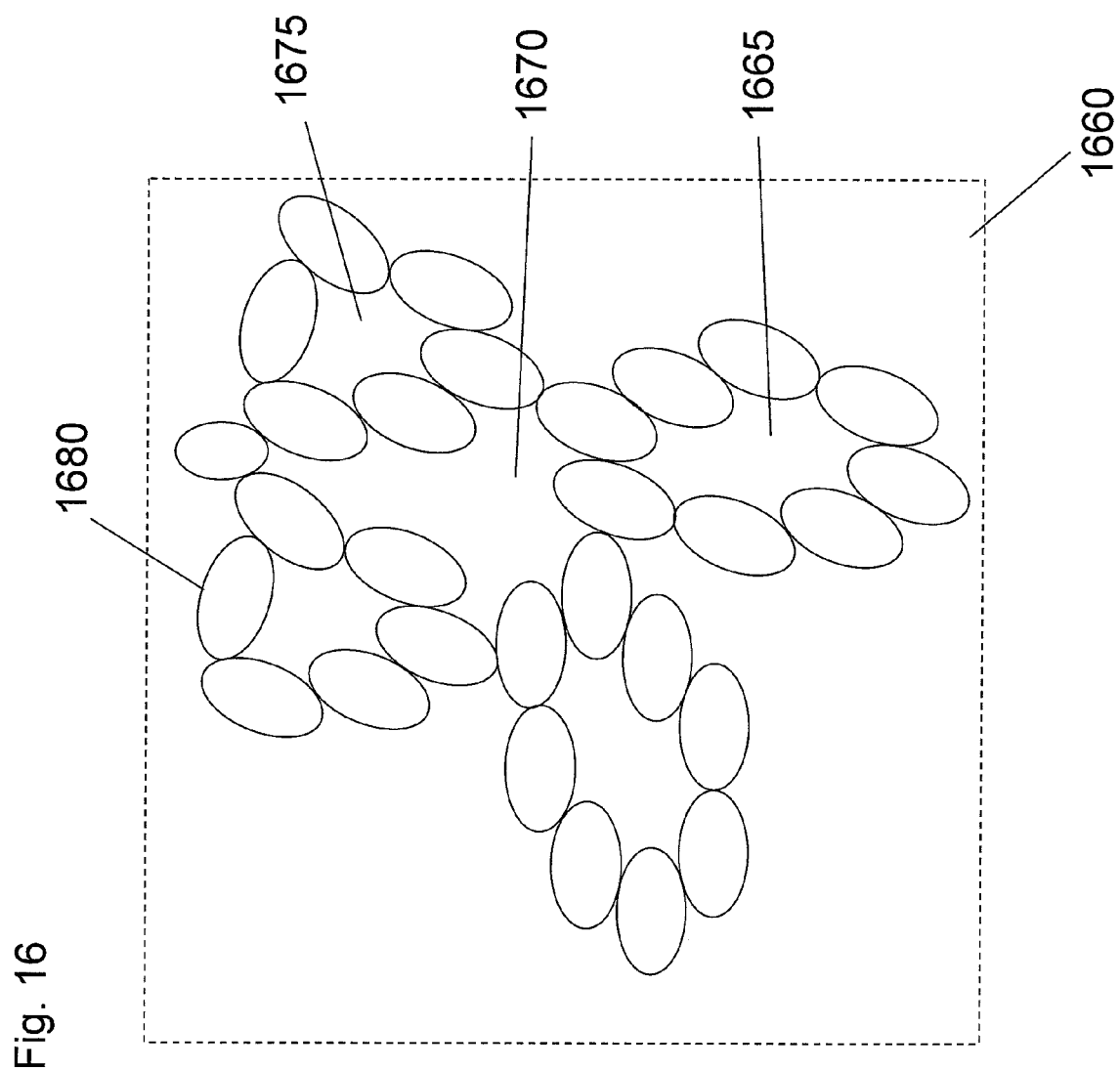
FIG. 16 illustrates regions on a substrate.

One of the simplest methods for applying wetting liquid to both sides of a film web while maintaining an electrical path from the drying line to a ground is illustrated in FIG. 14. Web 1602 enters the charge removal station 1600 and encounters a train of contacting rolls 1603. Wetting treatment liquid is intermittently placed on both sides of the web or onto the surface of the first two rolls of the train. The roll train spreads the liquid into a coating on each side of the web that is uniform in the down web direction, but not necessarily in the cross web direction as the web leaves rolls 1604 and 1605. The apparatus and methods are described in detail by Leonard et al. in U.S. Pat. No. 6,737,113 and U.S. Pat. No. 6,878,408, the contents of which are included here by reference.

The roll surfaces of 1604 and 1605 are electrically conductive and connected to an electrical ground. The web then proceeds from these rolls with a conductive layer of liquid which is electrically connected to a ground. From the roll train the web passes untouched to a drier zone 1614 represented by dashed lines.

A portion of the liquid applied to the web is retained as a liquid film coating indicated by heavy line 1616. It is on both sides of the web and is carried away from the applicators 1604 and 1605. The web and coating 1616 on it proceeds to a drying step which takes place in a region defined by dashed box 1614. Here, the liquid is evaporated by a means not shown. In order to produce neutralization of the web surfaces leaving station 1600, drying lines 1610 and 1611 are maintained on their respective sides of web 1602. The drying line is where the volatile mass of liquid is exhausted. From this point back to the liquid applicator and to the electrically grounded rolls 1604 and 1605, a conductive fluid path is provided. This allows exchange of charged species with the web until the final molecular layers of liquid are evaporated.

Charge Neutralization with a Porous Substrate

The previously described method and apparatus need modification for the treatment of porous or nonwoven webs.

The hydrocharging of nonwoven substrates has been taught in a previous section of this application. The application of nonwetting liquid to a nonwoven will generally create hydrocharging. The most effective charge removal from a porous web uses treatment with a wetting fluid and uses of the procedures described above. It is preferred that the treatment liquid remain a wetting liquid throughout the drying process.

Those of ordinary skill in the art will know, or be able to ascertain, using no more than routine experimentation or process simulation, many equivalents to the specific embodiments of this invention as described herein. These and all other equivalents and combinations of the embodiments are intended to be encompassed by the claims. All publications and references cited herein, including those in the background section, are expressly incorporated by reference in their entirety.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function, it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. An apparatus for making an electret, comprising:
    a. a gas applicator for applying a second, functional gas to a substrate to remove a first gas from the substrate;
    b. a liquid applicator operatively connected to the gas applicator for applying at least one, functional liquid to the substrate; and
    c. a dryer operatively connected to the liquid applicator for removing the functional liquid from the substrate.

2. The apparatus for making an electret of claim 1, whereby removing the first gas involves the gas displacing substantially all of the first gas from the substrate.

3. The apparatus for making an electret of claim 1, whereby adding a functional liquid replaces substantially all of the functional gas from the substrate and creates a substantially continuous, covering layer of functional liquid on the substrate.

4. The apparatus for making an electret of claim 1, whereby removing the functional liquid breaks down the functional liquid into a distribution of drops and subsequently completely removes the drops.

5. The apparatus for making an electret of claim 1, wherein the substrate is an element selected from the group of elements consisting of a sheet, a piece part, an article, free fibers, free particles, and a web.

6. The apparatus for making an electret of claim 1, wherein the substrate is a polymer is selected from the group consisting of polyolefin, polyester, polycarbonate, polystyrene, polyphenylenesulfate, fluorine-based resin, parylene and mixtures thereof.

7. The apparatus for making an electret of claim 1, wherein the substrate is selected from the group consisting of porous and non-porous substrates.

8. The apparatus for making an electret of claim 1, wherein the first gas is air.

9. The apparatus for making an electret of claim 1, wherein the functional gas is steam.

10. The apparatus for making an electret of claim 1, wherein the functional liquid has a conductivity of equal to or greater than 500 pico-Siemens per meter.

11. The apparatus for making an electret of claim 1, wherein the functional liquid is degassed water.

12. The apparatus for making an electret of claim 1, wherein the gas applicator is a chamber having a gas inlet and a gas outlet.

13. The apparatus for making an electret of claim 1, wherein the liquid applicator is a chamber having a liquid inlet and a liquid outlet.

14. The apparatus for making an electret of claim 13, wherein the gas applicator is a chamber and combined with the liquid applicator chamber, gas being disposed above the liquid.

15. The apparatus for making an electret of claim 14, wherein the substrate is first disposed in the gas for a predetermined period of time, the substrate is then immersed into the liquid for a predetermined period of time, and the substrate is then moved from the chamber and placed into the dryer for a predetermined period of time.

16. The apparatus for making an electret of claim 14, further comprising a heat sink operatively connected to the chamber for cooling the chamber.

17. The apparatus for making an electret of claim 1, further comprising a heat source.

18. The apparatus for making an electret of claim 14, wherein the chamber is sealed.

19. The apparatus for making an electret of claim 15, further comprising at least one guide for guiding a web of substrate into the chamber, through the functional gas, through the functional liquid, and out of the chamber.

20. The apparatus for making an electret of claim 14, wherein the functional gas is supplied via a manifold disposed in the functional liquid.

21. The apparatus for making an electret of claim 14, further comprising a contacting condenser operatively connected to the chamber for cooling the substrate.

22. The apparatus for making an electret of claim 1, further comprising at least one mechanical device selected from the group consisting of a blower, a centrifuge, a vacuum, a gravity drain assembly, a vibrator, and a squeezing mechanism.

23. The apparatus for making an electret of claim 1, further comprising at least one mechanical device.

24. The apparatus for making an electret of claim 23 wherein the mechanical device is at least one selected from the group consisting of a blower, a centrifuge, a vacuum, a gravity drain assembly, a vibrator, and a squeezing mechanism.

25. The apparatus for making an electret of claim 1, wherein the dryer is at least one passive drying device selected from the group consisting of a freeze dryer and an evaporating assembly.

26. The apparatus for making an electret of claim 1, wherein the dryer comprises at least one mechanical device removing a portion of the functional liquid from the substrate, and at least one passive device operatively connected to the mechanical device for removing any remaining portion of the functional liquid from the substrate.

27. The apparatus for making an electret of claim 1, wherein the gas applicator is a contactor having a gas inlet and a gas outlet.

28. The apparatus for making an electret of claim 1, wherein the liquid applicator is a contactor having a liquid inlet and a liquid outlet.

29. The apparatus for making an electret of claim 1, wherein the gas applicator is a tubular contactor having a gas inlet and a gas outlet, and wherein the liquid applicator is a tubular contactor having a liquid inlet and a liquid outlet, and wherein the substrate is a web moving into contact with the gas applicator and then moving into contact with the liquid contactor.

30. The apparatus for making an electret of claim 29, wherein the gas and liquid outlets are provided by porous media.

31. The apparatus for making an electret of claim 29, further comprising a drip pan disposed below the liquid applicator roller for catching any liquid expelled from the web.

32. The apparatus for making an electret of claim 29, further comprising an electrostatic power source connected to at least one contactor for applying an electric charge.

33. The apparatus for making an electret of claim 1, wherein the gas applicator and liquid applicator are disposed in a unitary contactor having an exterior contact surface and at least two internal fluid flow chambers communicatively connected to predetermined regions on the contact surface, at least one chamber communicating functional gas and at least one chamber communicating functional liquid, whereby at least one predetermined region on the contact surface delivers functional gas to the substrate and at least one predetermined region on the contact surface delivers functional liquid to the substrate.

34. The apparatus for making an electret of claim 33, wherein at least one chamber communicates blowing gas, whereby at least one predetermined region on the contact surface delivers blowing gas to the substrate for drying.

35. The apparatus for making an electret of claim 33, wherein the contactor has a substantially tubular configuration with a curvilinear contact surface.

36. The apparatus for making an electret of claim 33, further comprising a partition disposed in the contactor to form the at least two fluid flow chambers.

37. The apparatus for making an electret of claim 33, wherein the liquid chamber and gas chamber are coextensive to provide a 2-phase functional gas and functional liquid mixture.

38. An apparatus for making an electret, comprising:
  a. a substrate input mechanism for providing a substrate selected from the group consisting of a sheet, a piece part, an article, free particles, free fibers, and webs;
  b. a gas applicator, operatively connected to the substrate input mechanism, for applying a functional gas to the substrate to remove air from the substrate;

c. a liquid applicator operatively connected to the gas applicator for applying at least one, functional liquid to the substrate; and
d. a dryer operatively connected to the liquid applicator for removing the functional liquid from the substrate, whereby removing air involves the functional gas replacing substantially all of the air from the substrate and creates a substantially continuous, covering layer of functional liquid on the substrate, and whereby removing the functional liquid breaks down the functional liquid into a distribution of drops on the substrate and subsequently completely removes the drops.

* * * * *